US012351379B2

(12) United States Patent
Kawasaki et al.

(10) Patent No.: US 12,351,379 B2
(45) Date of Patent: Jul. 8, 2025

(54) TUBE CONTAINER

(71) Applicant: TOPPAN INC., Tokyo (JP)

(72) Inventors: Minoru Kawasaki, Tokyo (JP); Kaho Sakamoto, Tokyo (JP); Shunsuke Yajima, Tokyo (JP); Takeshi Saito, Tokyo (JP); Seiki Miyoshi, Tokyo (JP); Naoya Urakawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 122 days.

(21) Appl. No.: 17/902,784

(22) Filed: Sep. 2, 2022

(65) Prior Publication Data

US 2023/0020804 A1 Jan. 19, 2023

Related U.S. Application Data

(63) Continuation of application No. PCT/JP2021/009577, filed on Mar. 10, 2021.

(30) Foreign Application Priority Data

Mar. 10, 2020 (JP) .................................. 2020-041091
Mar. 11, 2020 (JP) .................................. 2020-041831

(Continued)

(51) Int. Cl.
*B65D 3/06* (2006.01)
*B65D 3/20* (2006.01)
(Continued)

(52) U.S. Cl.
CPC ............ *B65D 75/5883* (2013.01); *B65D 3/06* (2013.01); *B65D 3/20* (2013.01); *B65D 3/28* (2013.01); *B65D 75/08* (2013.01); *B65D 75/26* (2013.01)

(58) Field of Classification Search
CPC ...... B65D 75/5883; B65D 75/08; B65D 75/26; B65D 3/06; B65D 3/20; B65D 3/28
(Continued)

(56) References Cited

U.S. PATENT DOCUMENTS 2,401,784 A 6/1946 Zahara
3,260,411 A 7/1966 Dobson
(Continued)

FOREIGN PATENT DOCUMENTS

AU 673399 B2 8/1994
DE 2301582 A1 8/1973
(Continued)

OTHER PUBLICATIONS

"New Value Creation NAVI—Environmental Management Research Institute Co., Ltd. Alternative materials for disposable plastic products and new technology and new materials MAPKA and ER made in Japan.", Youtube <https://www.youtube.com/watch?v=6xnGdPffnZM>, 0:24-1:17, Official channel of small and medium enterprise organization (SMRJ : Organization for small & medium enterprises and regional innovation, Japan), uploaded on Feb. 27, 2020, with partial transcription (0:24-1:17).

(Continued)

*Primary Examiner* — Peter N Helvey
(74) *Attorney, Agent, or Firm* — Squire Patton Boggs (US) LLP

(57) ABSTRACT

A tube container with a reduced resin usage amount compared to the prior art, and having the stiffness necessary for self-support of the container is provided. The tube container includes a tube-like body portion that is closed at one end and a spout portion mounted at the other end of the body portion, and the body portion is formed by a material composed mainly of paper.

16 Claims, 33 Drawing Sheets

(30) Foreign Application Priority Data

| | | |
|---|---|---|
| Mar. 25, 2020 | (JP) | 2020-054487 |
| Jul. 31, 2020 | (JP) | 2020-130339 |
| Jan. 20, 2021 | (JP) | 2021-007150 |
| Feb. 22, 2021 | (JP) | 2021-026353 |
| Feb. 24, 2021 | (JP) | 2021-027296 |
| Mar. 1, 2021 | (JP) | 2021-031592 |

(51) Int. Cl.
  *B65D 3/28* (2006.01)
  *B65D 75/08* (2006.01)
  *B65D 75/26* (2006.01)
  *B65D 75/58* (2006.01)

(58) Field of Classification Search
  USPC .......................................................... 383/80
  See application file for complete search history.

(56) References Cited

U.S. PATENT DOCUMENTS

| | | | | |
|---|---|---|---|---|
| 3,260,777 | A * | 7/1966 | Brandt | B29C 66/7234 |
| | | | | 264/262 |
| 3,669,323 | A * | 6/1972 | Harker | B65D 47/2031 |
| | | | | 222/490 |
| 3,958,721 | A | 5/1976 | Kushida et al. | |
| 4,621,763 | A | 11/1986 | Brauner | |
| 5,277,508 | A * | 1/1994 | Gueret | A45D 40/06 |
| | | | | 401/78 |
| 5,421,932 | A | 6/1995 | Fujio | |
| 5,656,346 | A * | 8/1997 | Hirt | B65D 35/10 |
| | | | | 220/DIG. 7 |
| 6,210,766 | B1 * | 4/2001 | McLaughlin | B65D 35/08 |
| | | | | 428/36.6 |
| 2006/0043106 | A1 * | 3/2006 | Pottish | B65D 35/44 |
| | | | | 222/92 |
| 2008/0138550 | A1 * | 6/2008 | Takahashi | B32B 7/06 |
| | | | | 428/41.3 |
| 2008/0311327 | A1 * | 12/2008 | Pasbrig | B32B 1/08 |
| | | | | 428/36.6 |
| 2009/0236063 | A1 | 9/2009 | Onozuka et al. | |
| 2014/0203027 | A1 * | 7/2014 | Planeta | B65D 35/08 |
| | | | | 138/140 |
| 2014/0364547 | A1 * | 12/2014 | Iwasaki | C08G 63/672 |
| | | | | 524/127 |
| 2015/0096957 | A1 * | 4/2015 | Etesse | B65D 1/02 |
| | | | | 264/531 |
| 2017/0312994 | A1 * | 11/2017 | Miller | B32B 27/32 |
| 2018/0099787 | A1 | 4/2018 | Yoshida et al. | |
| 2021/0292049 | A1 | 9/2021 | Miyoshi et al. | |

FOREIGN PATENT DOCUMENTS

| | | | |
|---|---|---|---|
| EP | 3792055 | A1 | 3/2021 |
| FR | 883559 | A | 7/1943 |
| JP | S46-015356 | B1 | 4/1971 |
| JP | S48-072243 | | 9/1973 |
| JP | S53-113684 | A | 10/1978 |
| JP | S56-006981 | A | 1/1981 |
| JP | H05-124643 | A | 5/1993 |
| JP | H05-310259 | A | 11/1993 |
| JP | H06-001363 | A | 1/1994 |
| JP | H06-99504 | A | 4/1994 |
| JP | H06-247454 | A | 9/1994 |
| JP | H06-297599 | A | 10/1994 |
| JP | H07-076355 | A | 3/1995 |
| JP | H07-019139 | U | 4/1995 |
| JP | H07-45311 | Y2 | 10/1995 |
| JP | H08-151056 | A | 6/1996 |
| JP | H10-297673 | A | 11/1998 |
| JP | H11-198950 | A | 7/1999 |
| JP | 2001-213430 | A | 8/2001 |
| JP | 2003-049530 | A | 2/2003 |
| JP | 2005-179446 | A | 7/2005 |
| JP | 2006-021816 | A | 1/2006 |
| JP | 2006-265346 | A | 10/2006 |
| JP | 2008-308191 | A | 12/2008 |
| JP | 2012-025471 | A | 2/2012 |
| JP | 2014-231372 | A | 12/2014 |
| JP | 2016-199280 | A | 12/2016 |
| JP | 2018-162082 | A | 10/2018 |
| JP | 2019104518 | A | 6/2019 |
| JP | 2012-162283 | A | 8/2021 |
| WO | WO 2020/080507 | A1 | 4/2020 |

OTHER PUBLICATIONS

International Search Report and Written Opinion mailed May 25, 2021, for International Application No. PCT/JP2021/009577, with English translation, 10 pages.

* cited by examiner

FIG. 23A
FIG. 23B
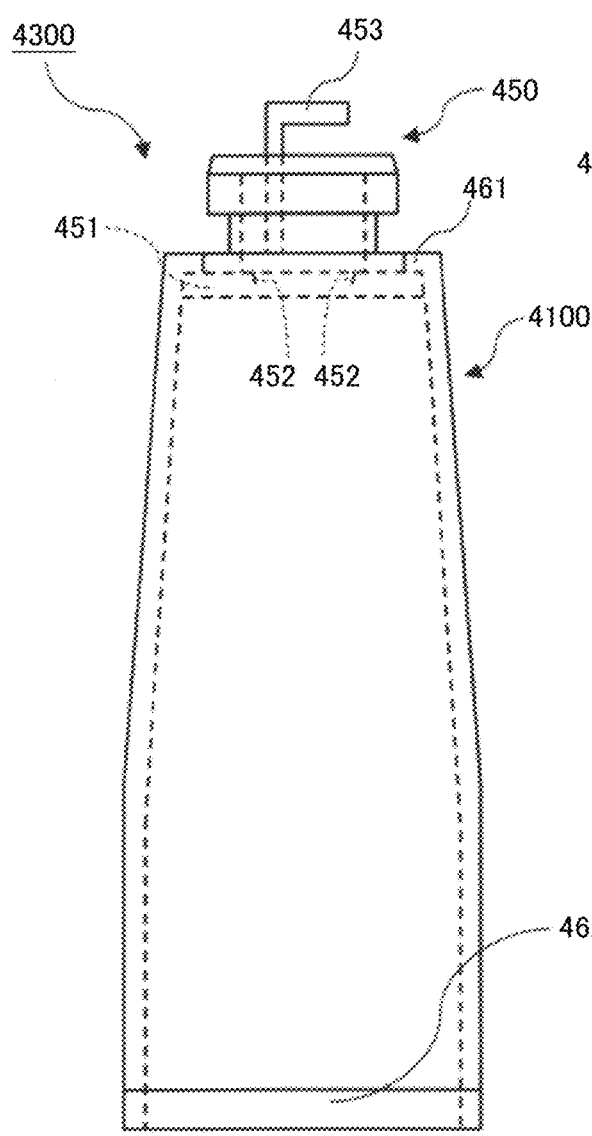
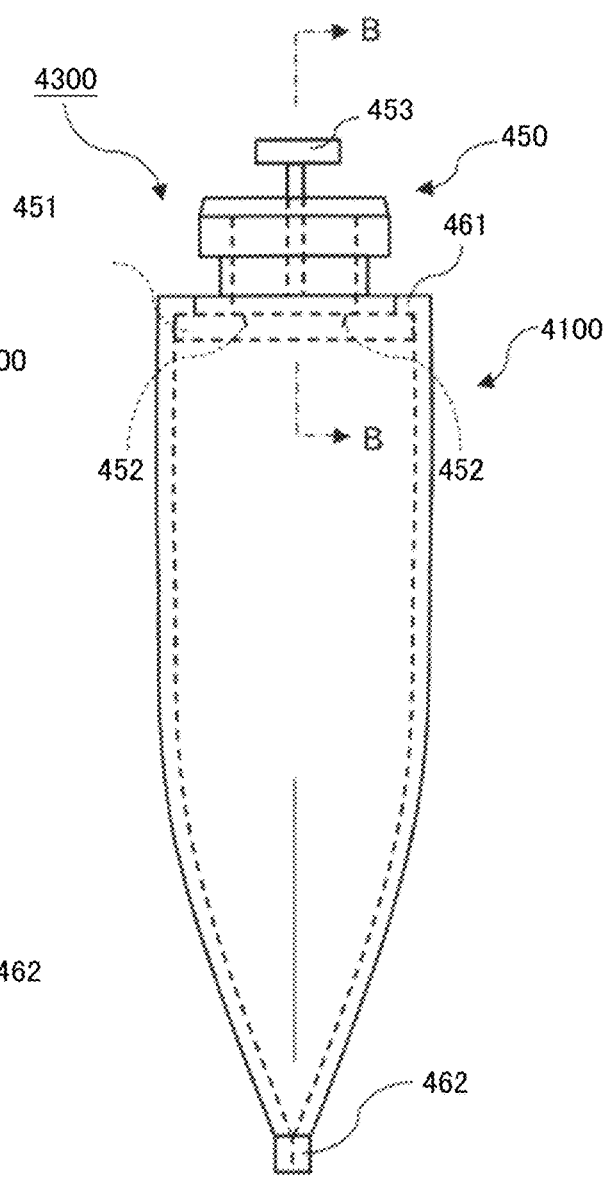

FIG. 32A
FIG. 32B
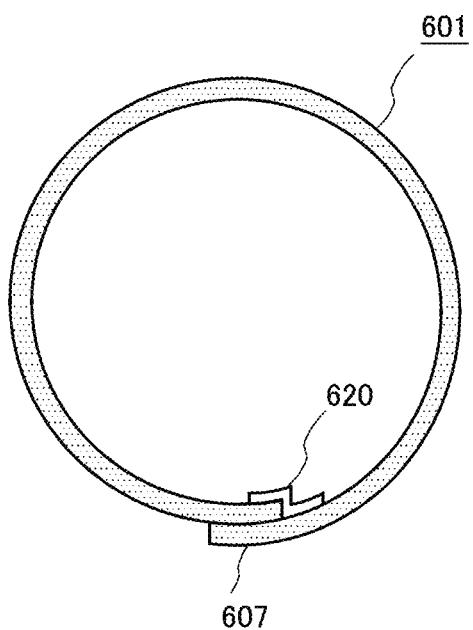
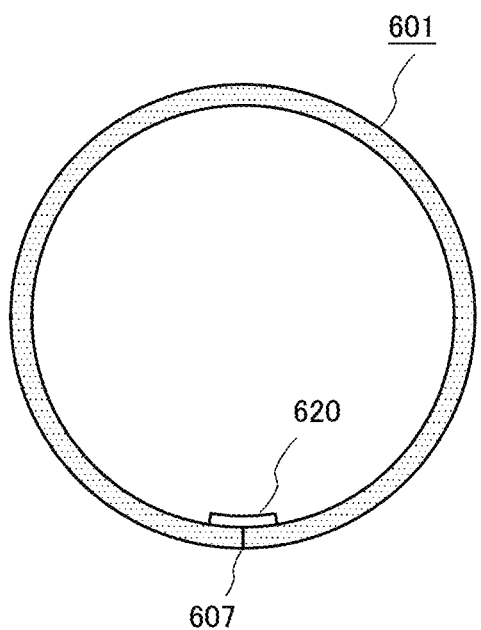
FIG. 33
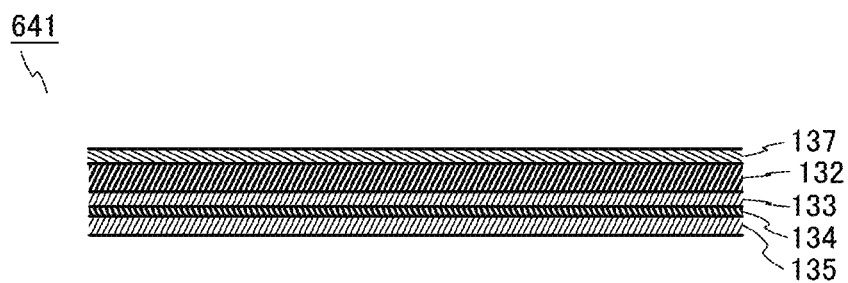

FIG. 38A
FIG. 38B
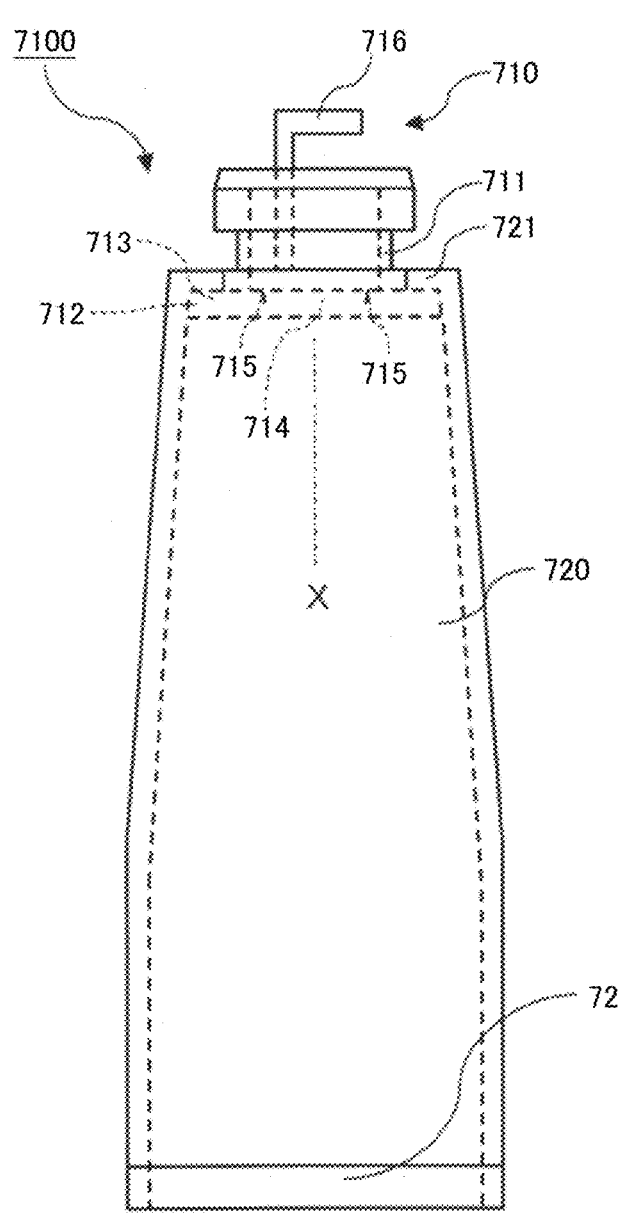
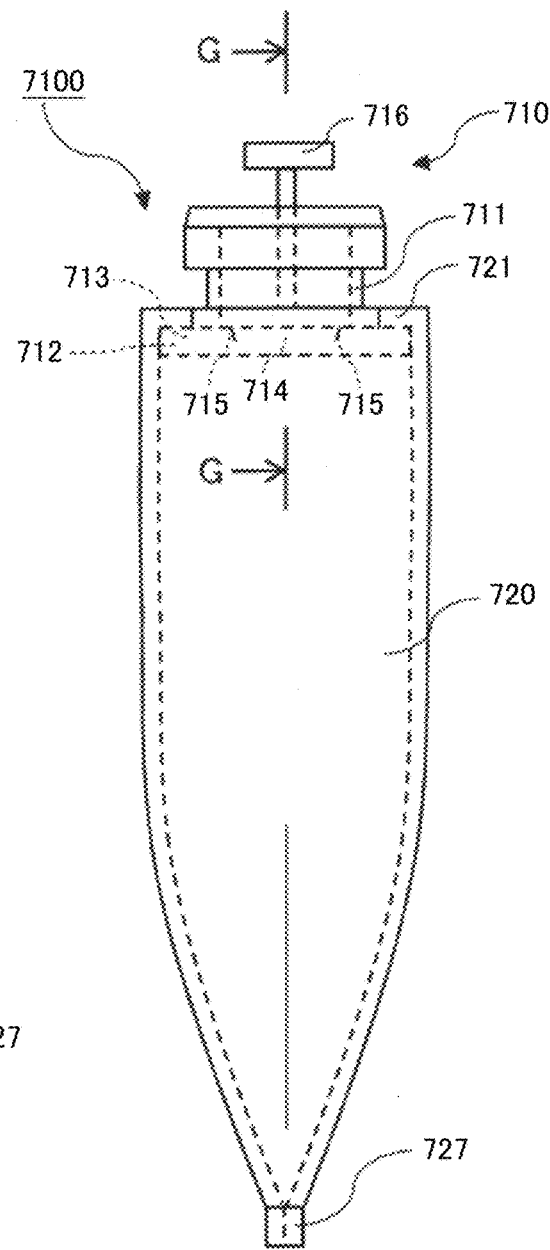

TUBE CONTAINER

CROSS REFERENCE TO RELATED APPLICATION

This application is a bypass continuation application of International Application No. PCT/JP2021/009577 filed on Mar. 10, 2021, claiming the priority based on Japanese Patent Application No. 2020-041091 filed on Mar. 10, 2020, Japanese Patent Application No. 2020-041831 filed on Mar. 11, 2020, Japanese Patent Application No. 2020-054487 filed on Mar. 25, 2020, Japanese Patent Application No. 2020-130339 filed on Jul. 31, 2020, Japanese Patent Application No. 2021-007150 filed on Jan. 20, 2021, Japanese Patent Application No. 2021-026353 filed on Feb. 22, 2021, Japanese Patent Application No. 2021-027296 filed on Feb. 24, 2021, and Japanese Patent Application No. 2021-031592 filed on Mar. 1, 2021. The disclosures in these applications are incorporated in the present specification by reference.

BACKGROUND

Field

The present disclosure relates to a tube container.

Description of the Related Art

Tube containers made of materials composed mainly of resins are widely used as packaging materials for pharmaceuticals, cosmetics, food products, etc. For example, Japanese Laid-Open Publication No. 2016-199280 describes a tube container constructed with an extraction unit that extracts contents, and a body portion welded to the extraction unit that houses the contents.

SUMMARY

In recent years, there has been increased demand for reducing the amounts of resins used in packaging containers, from the viewpoint of reducing environmental load and conserving resources. In the resin tube container described in Japanese Laid-Open Publication No. 2016-199280, the film forming the body portion can be reduced in thickness, for example, in order to reduce the resin usage amount.

However, simply reducing the thickness of the film forming the body portion results in weaker stiffness of the body portion, reducing the self-supporting property of the container.

It is therefore an object of the present disclosure to provide a tube container with a reduced resin usage amount compared to the prior art, and having the stiffness necessary for self-support of the container.

The tube container of the present disclosure is a tube container including a tube-like body portion that is closed at one end and a spout portion mounted at the other end of the body portion, and the body portion is formed by a material composed mainly of paper.

According to the present disclosure, it is possible to provide a tube container with a reduced resin usage amount compared to the prior art, and having the stiffness necessary for self-support of the container.

These and other objects, features, aspects, and effects of the present invention will be further clarified from the following detailed description in light of the accompanying drawings.

BRIEF DESCRIPTION OF THE DRAWINGS

FIG. 23A is a front view of a first example of a tube-like container using the body portion of a tube-like container according to the fourth embodiment.

FIG. 23B is a side view of a first example of a tube-like container using the body portion of a tube-like container according to the fourth embodiment.

FIG. 32A is an end surface view along line XXXII-XXXII shown in FIG. 31.

FIG. 32B is an end surface view along line XXXII-XXXII shown in FIG. 31.

FIG. 33 is a cross-sectional view showing an example of the sheet constituting the body part of the tube container.

FIG. 38A is a front view of the tubular container according to the seventh embodiment.

FIG. 38B is a side view of the tubular container according to the seventh embodiment.

DETAILED DESCRIPTION

First Embodiment

Figure 1:
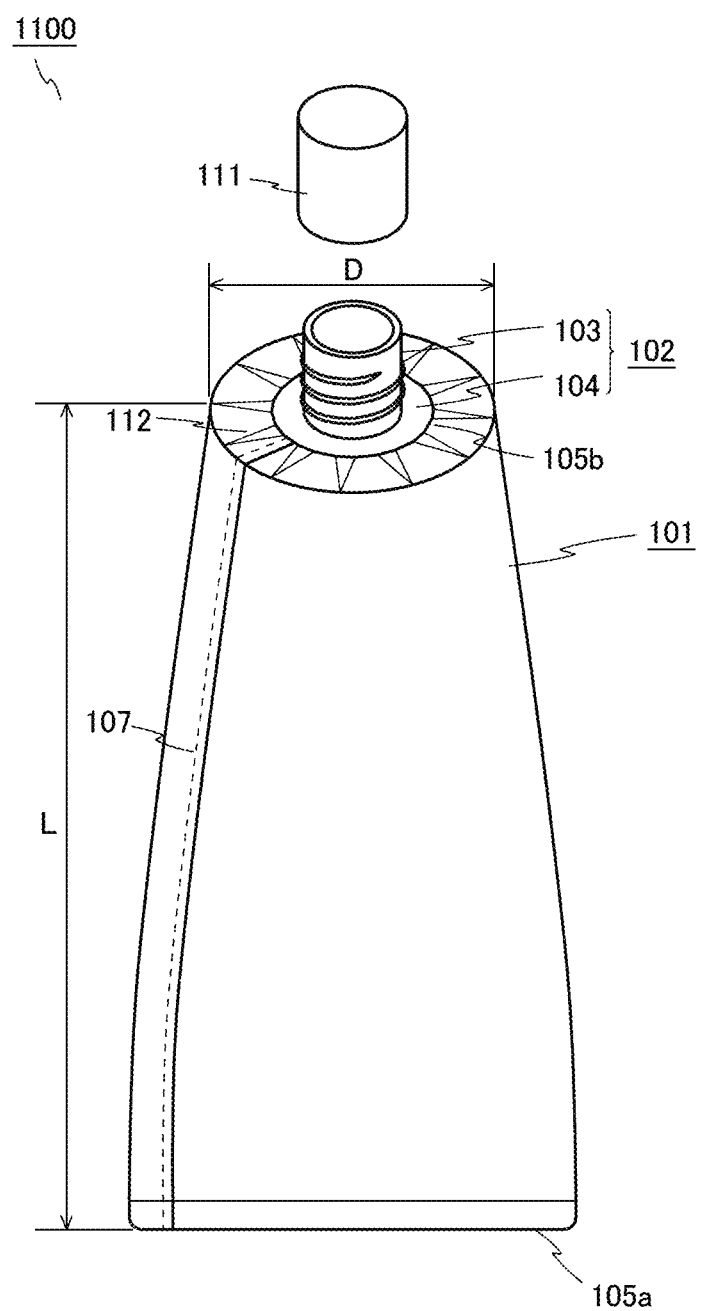
FIG. 1 is a front view showing the general construction of a tube container according to a first embodiment.
Figure 2:
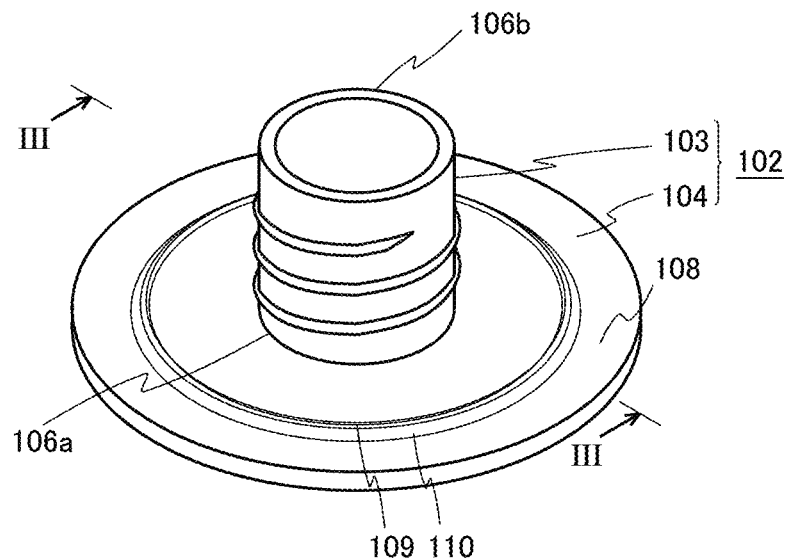
FIG. 2 is a perspective view of the spout portion shown in FIG. 1.
Figure 3:
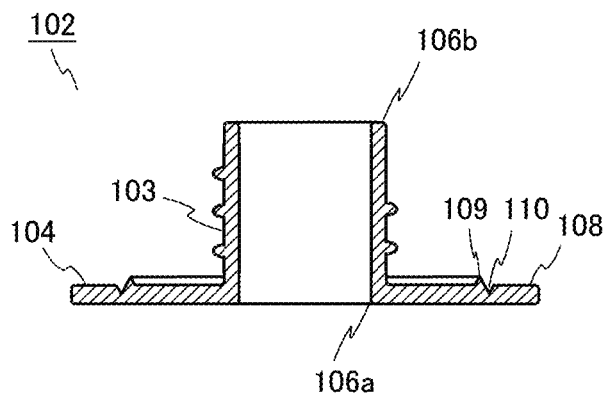
FIG. 3 is an end view along line III-III of FIG. 2.

FIG. 1 is a front view showing the general construction of a tube container according to a first embodiment, FIG. 2 is a perspective view of the spout portion shown in FIG. 1, and FIG. 3 is an end view along line III-III of FIG. 2. FIG. 2 and FIG. 3 show the state before sealing of the body portion to the spout portion.

A tube container 1100 includes a tube-like body portion 101, and a spout portion 102 mounted on the body portion 101.

The body portion 101 is a member for housing the contents, and it is formed by molding a sheet with a pair of roughly parallel end edges into a tubular form. The body portion 101 is formed into a tubular shape by, for example, butt-welding, in a butt-seam shape, the inner surfaces of a strip-shaped part that respectively includes the pair of end edges of the sheet. One end portion 105a of the body portion 101 (the lower end in FIG. 1) is sealed and closed. The part near the other end portion 105b of the body portion 101 (the upper end in FIG. 1) is sealed to an outer surface 108 of the flange portion 104 described below, in a folded state. Multiple pleats 112 are formed by folding the sheet that is to form the body portion 101 at the welded portion of the body portion 101 and flange portion 104. A bonded portion 107 formed in the body portion 101 by bonding the end edge portions of the film (the back bonded portion) may also be folded along the outer surface of the body portion 101 and bonded to the body portion 101. The method for bonding the bonded portion 107 to the body portion 101 is not particularly restricted, and they may be welded together through a heat-sealing resin provided over all or part of the surface of the film forming the body portion 101, or through an adhesive such as a hot-melt adhesive. The method of bonding the body portion 101 shown in FIG. 1 is only one example, and alternatively the outer surface of the strip-shaped region including one end edge of the film forming the body portion 101 and the inner surface of the strip-shaped region including the other end edge of the film may be bonded together.

Figure 4:
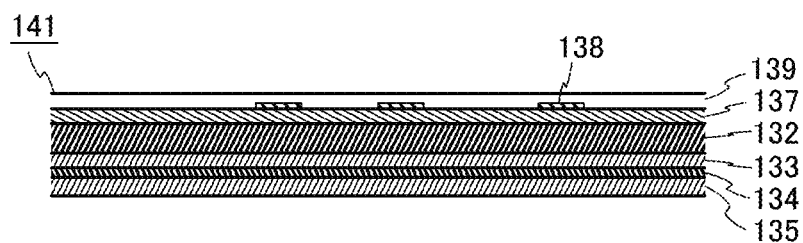
FIG. 4 is a cross-sectional view showing an example of a sheet forming the body portion of a tube container.

FIG. 4 is a cross-sectional view showing an example of a sheet forming the body portion of a tube container.

The body portion 101 of the tube container 1100 is made of a sheet 141 composed mainly of paper. The sheet 141 is a multilayer sheet having a base material film layer 133, barrier layer 134 and sealant layer 135 laminated in that order on a surface on one side of the paper layer 132, and a paper protective layer 137 laminated on a surface on the other side of the paper layer 132, as well as an ink layer 138 and overcoat varnish layer 139 laminated on the paper protective layer 137. Each layer will be described in detail below.

(Paper Layer)

The paper layer 132 is a structural layer imparting strength and stiffness to the tube container 1100. The type of paper forming the paper layer 132 is not particularly restricted, but from the viewpoint of strength, bending resistance and printing suitability, it is preferred to use single-gloss kraft paper or double-gloss kraft paper. The paper forming the paper layer 132 may also be waterproof paper, oil-resistant paper, cup base paper, or the like, if necessary. The paper layer 132 may also be paper containing 50% or greater pulp fiber (cellulose fibers), or mixed paper containing resin fiber in addition to pulp fiber.

The basis weight of the paper used for the paper layer 132 is 30 to 300 g/m$^2$ and preferably 50 to 120 g/m$^2$. If the basis weight of the paper used for the paper layer 132 is less than 30 g/m$^2$, the stiffness of the body portion 101 will be insufficient. For improved stiffness, it is necessary to thicken the resin film on the inner side with the paper layer 132, for example, but since this increases the relative amount of resin, it is not preferred from the viewpoint of reducing environmental load. If the basis weight of the paper used in the paper layer 132 is greater than 300 g/m$^2$, this is undesirable because the cylinder formability (bag formability), moldability and weldability will be impaired and production cost will increase, due to the stiffness and thermal insulation properties of the paper.

(Base Material Film Layer)

The base material film layer 133 is a layer that imparts heat resistance and physical strength including toughness to the sheet 141. The base material film layer 133 also is a layer serving as the base for the barrier layer 134. The material of the film forming the base material film layer 133 is not particularly restricted, but from the viewpoint of heat resistance and physical strength, it is preferably a stretched film of polypropylene, polyester, polyamide, etc. However, the base material film layer 133 may also be made of paper.

(Barrier Layer)

The barrier layer 134 is a functional layer that blocks oxygen, water vapor, etc., and increases the storage life of the contents. The barrier layer 134 may be composed of one or more selected from among vapor deposition films of inorganic compounds such as silica or alumina, metal vapor deposition films of aluminum, etc., metal foils of aluminum, etc., and barrier coating agent films containing laminar minerals and/or barrier resins. A barrier resin used in a barrier coating agent may be ethylene-vinyl alcohol copolymer (EVOH), polyvinylidene chloride (PVDC), or the like, with appropriate admixture of a binder resin other than the barrier resin in the barrier coating agent. The barrier layer 134 may also form a barrier film already laminated on the base material film layer 133, or it may be provided as a monolayer film.

(Sealant Layer)

The material of the sealant layer 135 is not particularly restricted, but a thermoplastic resin such as polypropylene, polyethylene, cyclic polyolefin or polyester is preferred. The sealant layer 135 uses a resin with a softening temperature of at least 20° C. lower than the softening temperature of the base material film layer 133. If the softening temperature of the sealant layer 135 is not at least 20° C. lower than the softening temperature of the base material film layer 133, this is undesirable because the base material film layer 133 will soften during sealing, increasing the potential for pinhole generation. The softening temperature of the sealant layer 135 is preferably at least 40° C. lower than the softening temperature of the base material film layer 133.

It suffices for the thermoplastic resin used in the sealant layer 135 to be one with adhesion for the thermoplastic resin forming the material of the spout portion 102 described below, but it is preferably of the same material as the thermoplastic resin used in the spout portion 102. If the thermoplastic resin used in the sealant layer 135 and the thermoplastic resin used in the spout portion 102 are the same, then the seal strength between the body portion 101 and spout portion 102 can be increased.

(Paper Protective Layer)

The paper protective layer 137 is a layer for protection against fouling of the paper layer 132 forming the sheet 141 by the contents or dirt. The material and method of forming the paper protective layer 137 are not particularly restricted, and the paper protective layer 137 may be laminated by coating a thermoplastic resin extrusion coat or a coating agent such as a water-resistant agent or oil-resistant agent. The thickness of the paper protective layer 137 is preferably 0.2 to 50 μm and more preferably 1 to 20 μm. If the thickness of the paper protective layer 137 is less than 0.2 μm, pinholes can potentially be generated in the paper protective layer 137, often making it impossible to obtain sufficient paper protection of the paper layer 132. A thickness of the paper protective layer 137 of greater than 50 μm is undesirable from the viewpoint of resin usage amount and production cost.

(Ink Layer and Overcoat Varnish Layer)

The ink layer 138 is a layer provided by printing for display, while the overcoat varnish layer 139 is a layer for imparting abrasion resistance, etc. The order of laminating the ink layer 138 and overcoat varnish layer may also be opposite from that shown in FIG. 4. The overcoat varnish layer 139 may also serve as the paper protective layer 137.

The thickness (total thickness) of the sheet 141 forming the body portion 101 is not particularly restricted but is preferably 30 to 300 μm. If the thickness of the film forming the body portion 101 is within this range, then it will be possible to easily work the body portion 101 into a tubular shape using a bag making machine, pillow stick packaging machine, etc. Since the paper layer 132 imparts strength and stiffness, it can be made thinner compared to a common laminate tube (300 to 500 μm thickness), and the resin usage amount can also be reduced.

In order to reduce the proportion of resin in the sheet 141 forming the body portion 101, the proportion of the paper layer 132 in the mass of the sheet 141 is preferably 50% or greater. A higher proportion is preferred for the paper layer 132 from the viewpoint of reducing resin usage amount.

It is noted that the sheet forming the body portion 101 suffices to have the sealant layer 135 laminated on at least a surface on one side of the paper layer 132 (the surface that forms the inner side of the tube container 1100), and it may omit one or more layers from among the base material film layer 133, barrier layer 134, paper protective layer 137, ink layer 138 and overcoat varnish layer 139 described above.

Again referring to FIG. 1 to FIG. 3, the spout portion 102 is a spout for extraction of the contents in the body portion 101 to the outside, and it includes a tubular pouring cylinder portion 103 and a flange portion 104. The flange portion 104 is connected to one end portion 106a of the pouring cylinder portion 103 (the lower end in FIG. 1), and it is a flat part extending outward from the pouring cylinder portion 103. In this embodiment, the flange portion 104 is formed so as to extend in the direction perpendicular to the axial direction of the pouring cylinder portion 103 (the left-right direction in FIG. 1). In this embodiment, the flange portion 104 is formed in a toric shape, but the shape of the flange portion 104 is not limited to this shape and may be elliptical, oblong, track-shaped, polygonal, etc., as long as it is able to attach to the body portion 101.

The spout portion 102 is molded of a material including a thermoplastic resin and a filler other than a resin. The thermoplastic resin used as the material for the spout portion 102 may be any one or a combination of two or more from among polyethylene, polypropylene, polyester, polyamide and cyclopolyolefin resins, for example. The filler may be any one or a combination of two or more from among talc, kaolin, paper dust and cellulose fibers. By using a mixture of a thermoplastic resin and a filler other than a resin as the material of the spout portion 102, it is possible to reduce the resin usage amount while maintaining moldability and heat weldability between the body portion 101 and sheet material. The method of molding the spout portion 102 is not particularly restricted, and a known molding method may be used such as thermoforming or compression molding, including injection molding, vacuum forming, hot plate compressed air molding, etc., may be used.

As shown in FIG. 2 and FIG. 3, the outer surface 108 of the flange portion 104 (surface on the end portion 106b side of the pouring cylinder portion 103) is provided with a toric raised portion 109 and a recessed portion 110. When the body portion 101 is welded to the flange portion 104 of the spout portion 102, the raised portion 109 melts first, and the melted resin spreads between the inner surface of the body portion 101 and the flange portion 104. A portion of the melted resin also flows into the recessed portion 110. As a result, the inner surface of the body portion 101 and the outer surface 108 of the flange portion 104 can be welded on their surfaces by the melted resin of the raised portion, thereby increasing the welding strength. The spout portion 102 of this embodiment includes a filler other than a resin, which tends to lower the welding strength between the body portion 101 and spout portion 102, but providing the raised portion 109 and recessed portion 110 can help ensure the necessary welding strength. The number of raised portions 109 and recessed portions 110 is not particularly restricted and may be two or more. Moreover, the raised portions 109 and recessed portions 10 do not need to be present in the same number, and for example, one raised portion 109 may be provided with two recessed portions 110, i.e., one on the inner side of the raised portion 109 and the other on the outer side of the raised portion 109. The recessed portion 110 may also be omitted.

The height of the raised portion 109 (height from the outer surface 108 of the flange portion 104) is 0.05 to 2 mm, and preferably 0.1 to 1 mm. If the height of the raised portion 109 is less than 0.05 mm, it will not be possible to obtain the effect of increased welding strength. If the height of the raised portion 109 exceeds 2 mm, on the other hand, the raised portion 109 will not fully melt during welding of the body portion 101, leaving a level difference on the outer surface 108 of the flange portion 104 and thus potentially resulting in leakage of contents.

The depth of the recessed portion 110 (depth from the outer surface 108 of the flange portion 104) is 0 to 2 mm, and preferably 0 to 1 mm. If the raised portion 109 is low, it may be possible to omit the recessed portion 110. A depth of the recessed portion 110 exceeding 2 mm is not desirable as it may lower the strength of the flange portion 104 and result in impaired outer appearance after welding of the body portion 101.

The method for welding the body portion 101 and spout portion 102 during production of the tube container 1100 may employ ultrasonic welding, high frequency welding, heat seal welding, hot air welding, body portion insert compression molding, etc., but ultrasonic welding is preferred from the viewpoint of avoiding effects by the thermal insulation properties of the paper.

If the tube length of the tube container 1100 is represented as L and the tube aperture as D, then the ratio L/D is preferably in the range of 1 to 10 and more preferably in the range of 1.5 to 8. As shown in FIG. 1, the tube length L is the length from the welding section on the flange portion 104 to the end portion 105a in the axial direction, and the tube aperture D is the diameter of the flange portion 104 if the flange portion 104 is circular, or (A+B)/2 (A: elliptical long diameter, B: elliptical short diameter), if the flange portion 104 is elliptical. If the value of L/D is less than 1, then the tube length L will be too short with respect to the tube aperture D and the shape of the tube container 1100 will not match the packaging container. If the value of L/D exceeds 10, the tube length L will be too long with respect to the tube aperture D, impairing the outer appearance of the tube container 1100, and the shape of the tube container 1100 will not match the packaging container.

As shown in FIG. 1, the tube container 1100 may further be provided with a screw cap 111 that is removable by screwing onto the pouring cylinder portion 103 of the spout portion 102. Providing the tube container 1100 with the screw cap 111 will facilitate resealing of the tube container 1100 after opening.

The tube container 1100 may also be provided with a hinge cap instead of the screw cap 111. If a hinge cap is provided, the hinge cap can be fitted onto the spout portion 102 by screwing onto the pouring cylinder portion 103 as shown in FIG. 1. Alternatively, a rib may be formed instead of a screw thread on the outer surface of the pouring cylinder portion 103 and the hinge cap may be attached to the spout portion 102 by fitting over the rib.

The end portion 106b of the pouring cylinder portion 103 may also be sealed with a film closing the pouring cylinder portion 103, with the tube container 1100 in the unopened state.

The interior of the pouring cylinder portion 103 may also be closed by a partition to ensure a closed state inside the container, with the tube container 1100 in the unopened state. When a partition is to be provided, preferably a circular half-cut is formed along the inner periphery of the pouring cylinder portion 103, and a pull ring is provided which is connected to the part surrounded by the half-cut. With such a construction, the user may pull on the pull ring to rupture the half-cut 127 part of the partition when opening the tube container 1100, thereby removing part of the partition surrounding the half-cut and forming an opening for pouring of the contents from the body portion 101 through the pouring cylinder portion 103.

As explained above, in this embodiment, the body portion 101 is composed of a sheet with paper and a sealant, and the spout portion 102 is molded of a material including a thermoplastic resin and a filler other than a resin, with the mass ratio of paper being the highest of the total mass of the materials forming the body portion 101 and spout portion 102. When the resin layer of a sheet forming a body portion in a conventional resin tube container is simply decreased in thickness, the stiffness of the body portion is insufficient and the self-supporting property and handling property of the tube container are reduced. In contrast, this embodiment uses paper as the structural material of the body portion 101, allowing the resin usage amount to be reduced while imparting stiffness to the body portion 101. Also, by including a filler other than a resin in the molding material of the spout portion 102, it is possible to reduce the resin usage amount in the tube container 1100. According to this embodiment, therefore, resin usage amount is reduced compared to the prior art, and a tube container 1100 with the stiffness necessary for the self-supporting property and handleability of the container can be obtained. Furthermore, since the basis weight of the paper used for the body portion 101 is 300 g/m² or lower, it helps to avoid problems that may occur with rounding to form the body portion 101, welding of the bonded portion 107, folding near the end portion 105b of the body portion 101 during attachment of the body portion 101 to the spout portion 102, or welding to the flange portion 104 near the end portion 105b of the body portion 101, and the moldability with a processing apparatus is satisfactory.

Also, in the tube container 1100 of this embodiment, since the flange portion 104 has a flat shape perpendicular to the central axis of the pouring cylinder portion 103 and the body portion 101 is welded to the outer surface 108 of the flange portion 104, the body portion 101 can be folded along the outer perimeter of the flange portion 104 so that the contents can be easily squeezed out when the contents of the tube container 1100 have been reduced. Since the flange portion 104 has a flat shape and no space is formed by the flange portion 104 that would lead to residue of the contents, the contents can be squeezed out without residue by folding the body portion 101 along the outer perimeter of the flange portion 104 so that the flange portion 104 and body portion 101 are in an approximately flat state.

The tube container of this embodiment is as follows.

[1] A tube container including:
a tube-like body portion including a sheet having paper and a sealant, and closed at one end, and
a spout portion made of a material that includes a thermoplastic resin and a filler composed of a material other than a resin, and mounted on the other end of the body portion, where
the basis weight of the paper is 30 to 300 g/m² and the mass ratio of the paper is highest among the total mass of the materials forming the body portion and spout portion.

[2] The tube container according to item [1], where:
the thermoplastic resin forming the spout portion is one or more types selected from among polyethylene, polypropylene, polyester, polyamide and cyclopolyolefin resins, and
the filler is one or more types selected from among calcium carbonate, talc, kaolin, paper dust and cellulose fibers.

[3] The tube container according to item [1] or [2], where the thermoplastic resin forming the body portion and the sealant of the sheet forming the body portion are the same material.

[4] The tube container according to any one of items [1] to [3], where:
the spout portion includes
a tubular pouring cylinder portion, and
a flat flange portion connected to one end of the pouring cylinder portion, outside of the pouring cylinder portion and extending in the direction perpendicular to the axial direction of the pouring cylinder portion, and
the inner surface near the other end of the body portion is joined to the surface of the flange portion that is on a surface on the other end of the pouring cylinder portion.

Second Embodiment

Tube containers using paper materials as partial materials have not been adequately studied to date. For example, since the body portion of a tube container is to be composed of a sheet-like material, it may be made of a sheet composed mainly of paper, but if the shoulder portion (spout portion) is made of plastic, this will increase the proportion of plastic in the tube container, requiring it to be disposed as plastic and difficult to be reused as a paper resource.

The embodiment provides a paper tube container formed of a sheet composed mainly of paper, with a reduced resin usage amount compared to the prior art.

Figure 5:
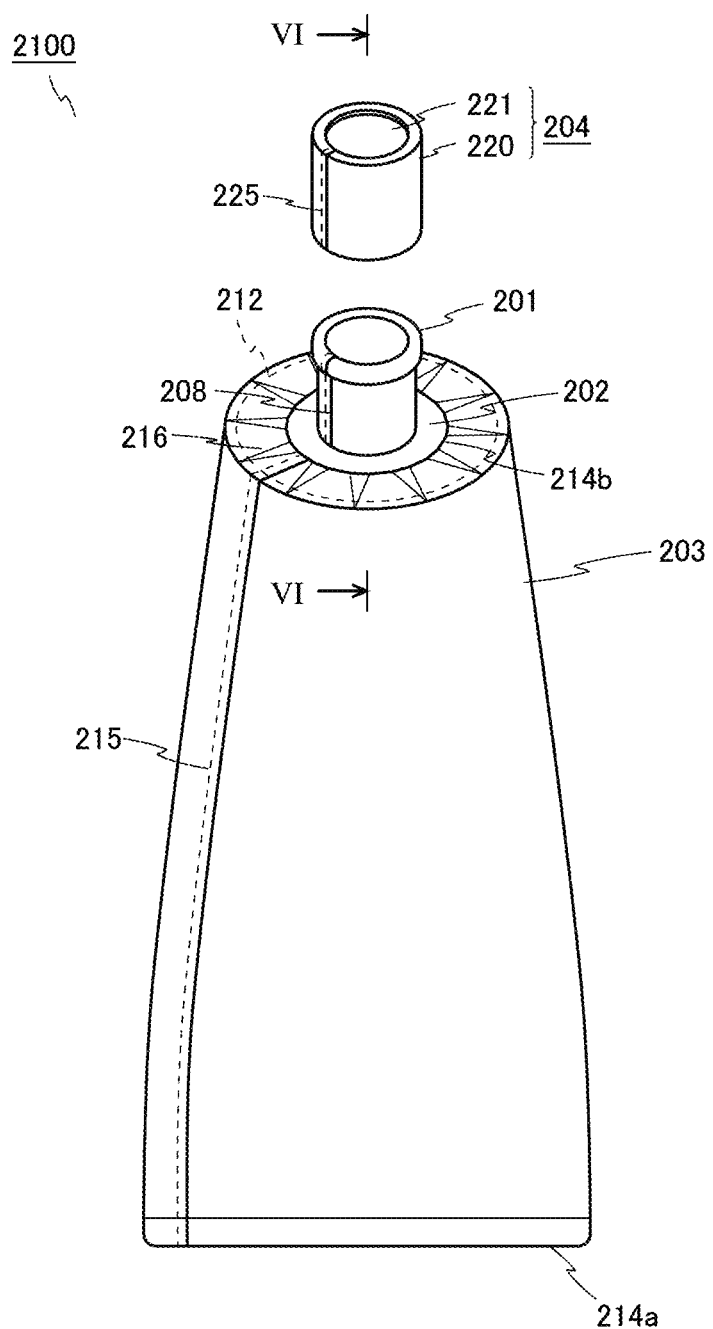
FIG. 5 is a perspective view showing the general construction of a paper tube container according to an embodiment.
Figure 6:
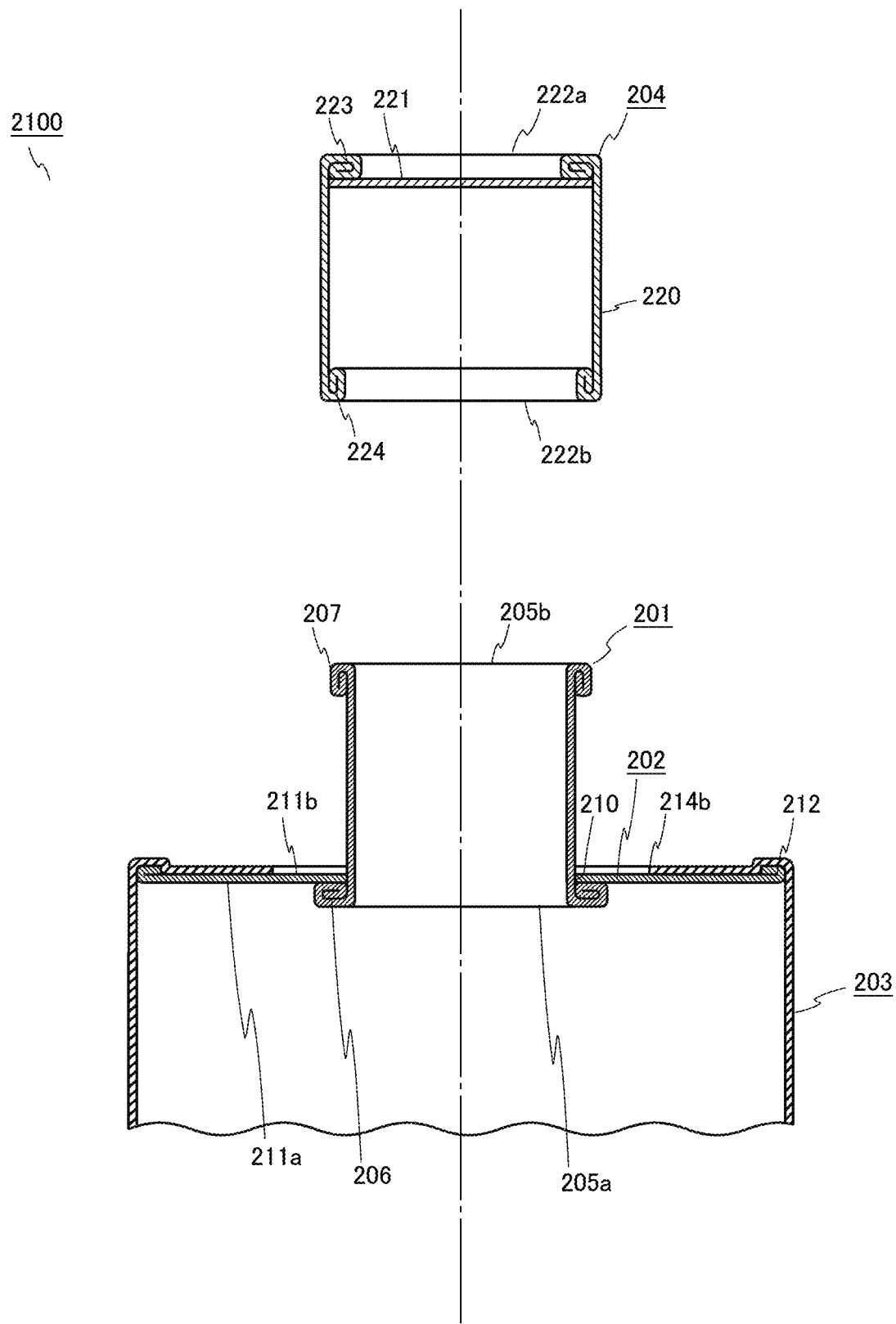
FIG. 6 is an enlarged cross-sectional view along line VI-VI shown in FIG. 5.

FIG. 5 is a perspective view showing the general construction of a paper tube container according to this embodiment, and FIG. 6 is an enlarged cross-sectional view along line VI-VI of FIG. 5.

A paper tube container 2100 includes a cylinder portion 201, a flat portion 202 and a body portion 203. The cylinder portion 201, flat portion 202 and body portion 203 are all formed of sheets composed mainly of paper.

The cylinder portion 201 is a member for pouring out of the contents housed in the body portion 203, and it has a tubular shape. As shown in FIG. 6, a flange 206 is provided at one end portion 205a in the axial direction of the cylinder portion 201 (the vertical direction in FIG. 6), with an outer perimeter portion 207 formed at the other end portion 205b. As described in detail below, the flange 206 is formed by rolling the blank for formation of the cylinder portion 201 into a tube shape and curling a predetermined area from one open end (end edge) toward the outside, and then compressing the thus formed curled portion vertically. The flange 206 is the part used for sealing to the flat portion 202. The outer perimeter portion 207 is formed by curling a predetermined area from the other open end (end edge) of the blank for formation of the cylinder portion 201 that has been rolled into a tube shape, toward the outer side, and then compressing the thus formed curled portion along the outer peripheral surface of the cylinder portion 201. The outer perimeter portion 207 is the part that protects the end surface of the blank (sheet) forming the cylinder portion 201 and imparts strength to the end portion 205b of the cylinder portion 201. As shown in FIG. 5, a bonded portion 208 is formed on the cylinder portion 201, being sealed by overlapping the areas near the pair of end edges of the blank rolled during formation of the cylinder portion 201. The shape of the cylinder portion 201 is not particularly restricted and may be circular, elliptical, oblong, track-shaped, polygonal, etc.

When the contents of the paper tube container 2100 are poorly permeable through paper, it is not necessary to provide the outer perimeter portion 207 on the end portion 205b of the cylinder portion 201. Alternatively, depending on the type and form of the contents, instead of providing the outer perimeter portion 207 on the end portion 205b of the cylinder portion 201, a predetermined area from one open end (end edge) of the blank for formation of the cylinder portion 201 that has been rolled into a tube shape may be curled toward the inner side, and then the thus formed curled portion may be compressed along the inner peripheral surface of the cylinder portion 201.

The flat portion 202 is a flat member for connection between the cylinder portion 201 and body portion 203. An opening 210 having essentially the same shape as the cross-section of the cylinder portion 201 may be formed in the flat portion 202, the flat portion 202 having an annular shape as a whole. A surface 211a on one side of the flat portion 202 inserted into the opening 210 provided in the flat portion 202 so that the cylinder portion 201 runs through it, and facing the flange 206, is sealed to the flange 206 of the cylinder portion 201. A fold-over portion 212 is also formed on the outer periphery of the flat portion 202, by folding over the annular part including the entire outer perimeter of the blank for formation of the flat portion 202, onto a surface 211b. The shape of the flat portion 202 is not particularly restricted as long as it is able to seal the body portion 203, and it may be circular, elliptical, oblong, track-shaped, polygonal, etc.

The cylinder portion 201 and flat portion 202 form a spout by being integrated via the flange 206. Both the cylinder portion 201 and flat portion 202 are formed by a sheet composed mainly of paper, thereby allowing the resin usage amount to be reduced compared to a conventional resin spout.

The body portion 203 is a member for housing the contents, and it can be formed by molding a sheet with a pair of roughly parallel end edges into a tubular form. The body portion 203 is formed into a tubular shape by, for example, butt-sealing, in a butt-seam shape, the inner surfaces of a strip-shaped part that respectively include the pair of end edges of a long sheet. One end portion 214a of the body portion 203 (the lower end in FIG. 5) is sealed and closed. The portion near the other end portion 214b of the body portion 203 (the upper end in FIG. 5) is sealed to the outer surface of the flat portion 202, i.e. the surface 211b on the end portion 205b side of the cylinder portion 201 among both surfaces of the flat portion 202, in a folded state. Multiple pleats 216 are formed by folding the sheet that is to form the body portion 203 on the outer surface of the flat portion 202. A bonded portion 215 is formed in the body portion 203 by overlapping and attaching the portions near the end edges of the sheet during formation of the tubular shape. The bonded portion 215 may also be attached to the body portion 203 by folding along the outer surface of the body portion 203. The method for bonding the bonded portion 215 to the body portion 203 is not particularly restricted, and they may be welded together through a heat-sealing resin provided over all or part of the surface of the film forming the body portion 203, or through an adhesive such as a hot-melt adhesive.

As shown in FIG. 5 and FIG. 6, the paper tube container 2100 may also be provided with a removable screw cap 204 on the cylinder portion 201. Providing the paper tube container 2100 with the cap 204 makes it possible to reseal the paper tube container 2100 after opening.

The cap 204 of the embodiment includes a cylinder portion 220 and a cap portion 221. The cylinder portion 220 and cap portion 221 are formed of sheets composed mainly of paper.

The cylinder portion 220 is a member that forms the peripheral walls of the cap 204, and it is cylindrical. A connector portion 223 is provided at one end portion 222a in the axial direction of the cylinder portion 220 (the vertical direction in FIG. 5 and FIG. 6), and an inner perimeter portion 224 is provided at the other end portion 222b. As described in detail below, the connector portion 223 is formed by rolling the blank for formation of the cylinder portion 220 into a tube shape and curling a predetermined area from one open end (end edge) toward the inside, and then compressing the thus formed curled portion vertically. The connector portion 223 is a part for sealing the cap portion 221. The inner perimeter portion 224 is formed by rolling the blank for formation of the cylinder portion 220 into a tube shape and curling a predetermined area from the other open end (end edge) toward the inside, and then compressing the thus formed curled portion along the inner peripheral surface of the cylinder portion 220. The inner perimeter portion 224 is the part that protects the end surface of the blank (sheet) forming the cylinder portion 220 and imparts strength to the end portion 222b of the cylinder portion 220. When the outer perimeter portion 207 is formed on the end portion 205b of the cylinder portion 220 as in this embodiment, the inner diameter of the inner perimeter portion 224 may be made smaller than the outer diameter of the outer perimeter portion 207 to allow the inner perimeter portion 224 and outer perimeter portion 207 to function as a lock mechanism to prevent the cap 204 from falling off. As shown in FIG. 5, a bonded portion 225 is formed on the cylinder portion 220, being sealed by overlapping the areas near the pair of end edges of the blank rolled during formation of the cylinder portion 220. The shape of the cylinder portion 220 is not particularly restricted and may be circular, elliptical, oblong, track-shaped, polygonal, etc., but the cylinder portion 220 is formed in a shape matching that of the cylinder portion 201.

When the contents of the paper tube container 2100 are poorly permeable through paper, it is not necessary to provide the inner perimeter portion 224 at the end portion 222b of the cap 204. Alternatively, depending on the type and form of the contents, instead of providing the inner perimeter portion 224 on the inner perimeter portion 224 of the cap 204, a predetermined area from one open end (end edge) of the blank for formation of the cylinder portion 220 that has been rolled into a tube shape may be curled toward the outer side, and then the thus formed curled portion may be compressed along the outer peripheral surface of the cylinder portion 220.

The cap portion 221 is a flat member that fits inside the cylinder portion 220 and closes the end portion 222a of the cylinder portion 220. The cap portion 221 is sealed to the connector portion 223 provided at the end portion 222a of the cylinder portion 220.

The cap 204 is optional, and the paper tube container 2100 does not need to be provided with the cap 204. The end portion 205b of the cylinder portion 201 may also be sealed with a top sealant closing the cylinder portion 201, with the paper tube container 2100 in the unopened state. The structure of the top sealant is not particularly restricted, but it is preferably provided with at least a barrier layer and a sealant layer. In order to facilitate release of the top sealant from the end portion 205b of the cylinder portion 201, the sealant layer of the top sealant preferably has an easy-peeling property.

Figure 7:
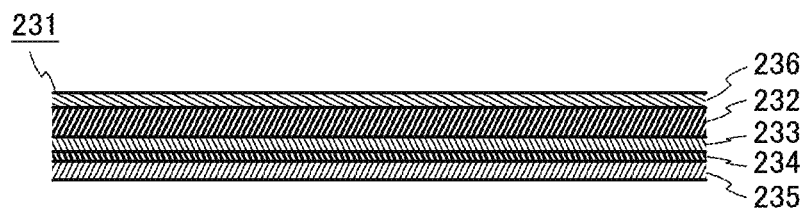
FIG. 7 is a diagram showing an example of a sheet forming the cylinder portion and flat portion.
Figure 8:
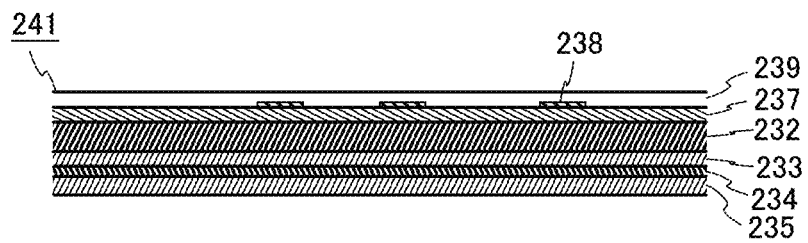
FIG. 8 is a diagram showing an example of a sheet forming the body portion.

FIG. 7 is a diagram showing an example of a sheet forming the cylinder portion and flat portion, and FIG. 8 is a diagram showing an example of a sheet forming a body portion.

As an example, the cylinder portion 201 and flat portion 202 of this embodiment are formed by a sheet 231 shown in FIG. 7, and the body portion 203 is formed by a sheet 241 shown in FIG. 8.

The sheet 231 is a multilayer sheet having a base material film layer 233, barrier layer 234 and sealant layer 235 laminated in that order on a surface on one side of a paper layer 232, and a thermoplastic resin layer 236 laminated on a surface on the other side of the paper layer 232. The sheet 241 is a multilayer sheet having a base material film layer 233, barrier layer 234 and sealant layer 235 laminated in that order on the surface on one side of the paper layer 232, and a paper protective layer 237 laminated on the surface on the other side of the paper layer 232, as well as an ink layer 238 and overcoat varnish layer 239 laminated on the paper protective layer 237. Each layer will be described in detail below.

(Paper Layer)

The paper layer 232 is a structural layer imparting strength to the paper tube container 2100. The type of paper forming the paper layer 232 is not particularly restricted, but from the viewpoint of strength, bending resistance, and printing suitability, it is preferred to use single-gloss kraft paper or double-gloss kraft paper. The paper forming the paper layer 232 may also be waterproof paper or oil-resistant paper, if necessary.

The basis weight of the paper of the sheet for formation of the cylinder portion 201 is 50 to 500 g/m$^2$ and preferably 100 to 300 g/m$^2$. If the basis weight of the paper used in the sheet for formation of the cylinder portion 201 is less than 50 g/m$^2$, it will not be possible to form the curled portion (described below) and the strength of the molded cylinder portion 201 will be insufficient. If the basis weight of the paper used in the sheet for formation of the cylinder portion 201 exceeds 500 g/m$^2$, it will be difficult to form curls (described below) and the condition will be undesirable from the viewpoint of resource saving and production cost.

The basis weight of the paper of the sheet for formation of the flat portion 202 is 50 to 1000 g/m$^2$ and preferably 100 to 300 g/m$^2$. If the basis weight of the paper used in the sheet for formation of the flat portion 202 is less than 50 g/m$^2$, the strength of the paper tube container 2100 will be insufficient. If the basis weight of the paper used in the sheet for formation of the flat portion 202 exceeds 1000 g/m$^2$, vibration during ultrasonic sealing will be absorbed into the paper making it impossible to accomplish proper welding, and the condition will be undesirable from the viewpoint of resource saving and production cost.

The basis weight of the paper of the sheet for formation of the body portion 203 is 30 to 200 g/m$^2$ and preferably 50 to 120 g/m$^2$. If the basis weight of the paper used in the sheet for formation of the body portion 203 is less than 30 g/m$^2$, the stiffness of the body portion 203 will be insufficient. For improved stiffness, it is necessary to thicken the resin film on the inner side with the paper layer 232, for example, but since this increases the relative amount of resin, it is not preferred from the viewpoint of reducing environmental load. If the basis weight of the paper used in the sheet for formation of the body portion 203 is greater than 200 g/m$^2$, this is undesirable because the cylinder formability (bag formability), moldability and weldability will be impaired, due to the stiffness and thermal insulation properties of the paper.

The base material film layer 233 is a layer that imparts heat resistance and physical strength including toughness during heating to the sheets 231 and 32. The base material film layer 233 is also a layer serving as the base for the barrier layer 234. The material of the film forming the base material film layer 233 is not particularly restricted, but from the viewpoint of heat resistance and physical strength, it is preferably a stretched film of polypropylene, polyester, polyamide, etc. However, the base material film layer 233 may also be made of paper.

(Barrier Layer)

The barrier layer 234 is a functional layer that blocks oxygen, water vapor, etc., and increases the storage life of the contents. The barrier layer 234 may be composed of one or more selected from among vapor deposition films of inorganic compounds such as silica or alumina, metal vapor deposition films of aluminum, etc., metal foils of aluminum, etc., and barrier coating agent films containing laminar minerals and/or barrier resins. A barrier resin used in a barrier coating agent may be ethylene-vinyl alcohol copolymer (EVOH), polyvinylidene chloride (PVDC), or the like, with appropriate admixture of a binder resin other than the barrier resin in the barrier coating agent. The barrier layer 234 may also form a barrier film already laminated on the base material film layer 233, or it may be provided as a monolayer film.

(Sealant Layer)

The material of the sealant layer 235 is not particularly restricted, but a thermoplastic resin such as polypropylene, polyethylene, cyclic polyolefin or polyester is preferred. The sealant layer 235 uses a resin with a softening temperature of at least 20° C. lower than the softening temperature of the base material film layer 233. If the softening temperature of the sealant layer 235 is not at least 20° C. higher than the softening temperature of the base material film layer 233, this is undesirable because the base material film layer 233 will soften during sealing, increasing the potential for pinhole generation. The softening temperature of the sealant layer 235 is preferably at least 40° C. higher than the softening temperature of the base material film layer 233.

(Thermoplastic Resin Layer)

The thermoplastic resin layer 236 is a layer formed by laminating or coating a thermoplastic resin that is weldable with the resin that is to form the sealant layer 235. The thermoplastic resin layer 236 may be laminated over the entire surface of the paper layer 232, or it may be laminated over only part of the surface of the paper layer 232. By laminating the thermoplastic resin layer 236, it is possible to strengthen welding of the curled portion during curl formation (described below), to strengthen welding between the surface 211b of the flat portion 202 and the body portion 203, or to weld the fold-over portion 212 of the flat portion 202.

(Paper Protective Layer)

The paper protective layer 237 is a layer for protection against fouling of the paper layer 232 forming the sheet 241 by the contents or dirt. The material and method of forming the paper protective layer 237 are not particularly restricted, and the paper protective layer 237 may be laminated by coating a thermoplastic resin extrusion coat or a coating agent such as a water-resistant agent or oil-resistant agent. The thickness of the paper protective layer 237 is preferably 0.2 to 50 μm and more preferably 1 to 20 μm. If the thickness of the paper protective layer 237 is less than 0.2 μm, pinholes can potentially be generated in the paper protective layer 137, often making it impossible to obtain sufficient paper protection. A thickness of the paper protective layer 237 of greater than 50 μm is undesirable from the viewpoint of resin usage amount and production cost.

(Ink Layer and Overcoat Varnish Layer)

The ink layer 238 is a layer provided by printing for display, while the overcoat varnish layer 239 is a layer for imparting abrasion resistance, etc. The order of laminating the ink layer 238 and overcoat varnish layer may also be opposite from that shown in FIG. 8. The overcoat varnish layer 239 may also serve as the paper protective layer 237.

In order to reduce the proportion of resin in the sheets forming the cylinder portion 201, flat portion 202 and body portion 203, the proportion of the paper layer 232 in the mass of each sheet is preferably 50% or greater. A higher proportion is preferred for the paper layer 232 from the viewpoint of reducing resin usage. However, if paper constitutes at least 50 mass % of the total of paper and resin forming the paper tube container 2100, then the proportion of the paper layer 232 of any one of the sheets forming the cylinder portion 201, flat portion 202 and body portion 203 may be below 50 mass %.

The sheet forming the cylinder portion 201 and flat portion 202 may have the sealant layer 235 laminated on at least on a surface on one side of the paper layer 232 (the surface that forms the inner side of the paper tube container 2100), and it may omit one or more layers from among the base material film layer 233, barrier layer 234 and thermoplastic resin layer 236 described above. The sheets forming the cylinder portion 201 and flat portion 202 may also be provided with a coating to impart water resistance and oil resistance, or printing of display markings, or coating of an overcoat varnish to protect printing, as appropriate.

An example of a method for producing the paper tube container 2100 of this embodiment will now be described.

Figure 9A:
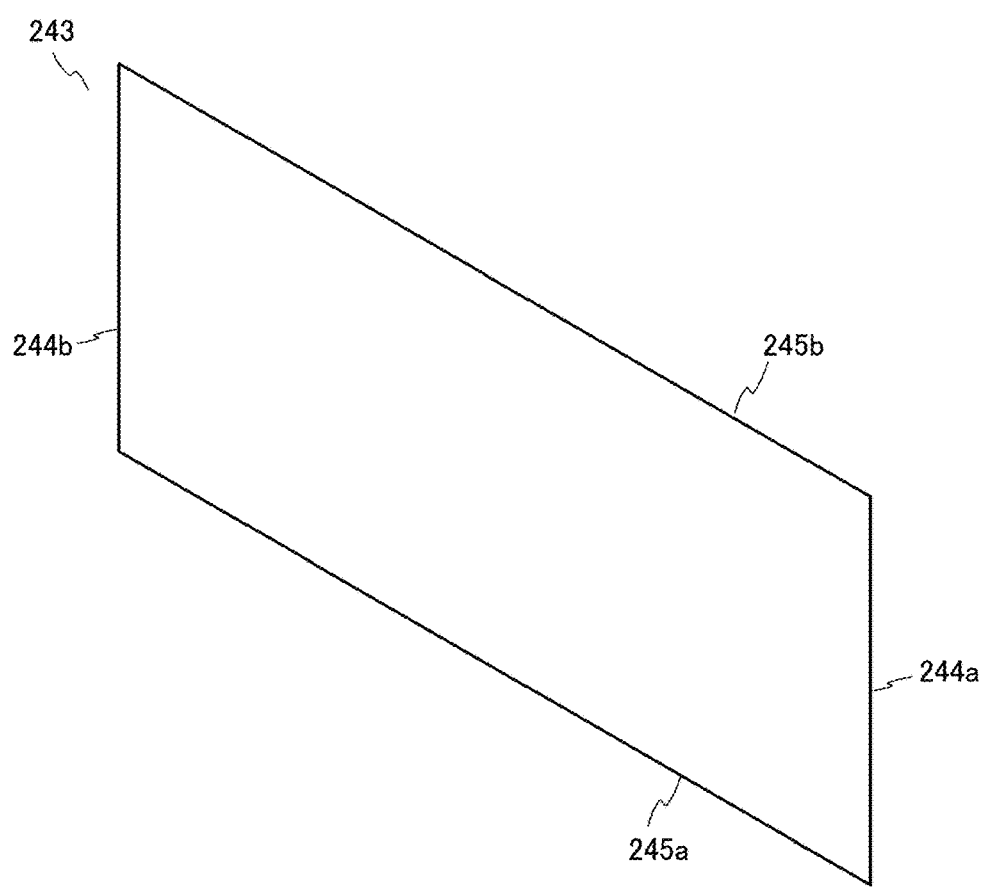
FIG. 9A is a schematic diagram showing an example of a method for producing a paper tube container.
Figure 9B:
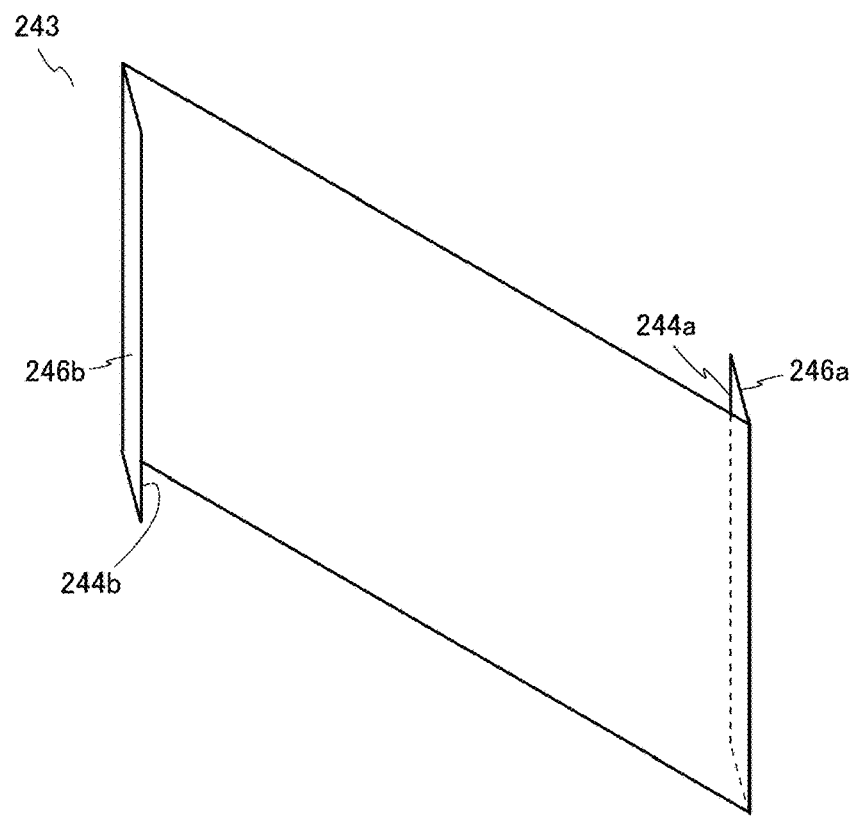
FIG. 9B is a schematic diagram showing an example of a method for producing a paper tube container.
Figure 9C:
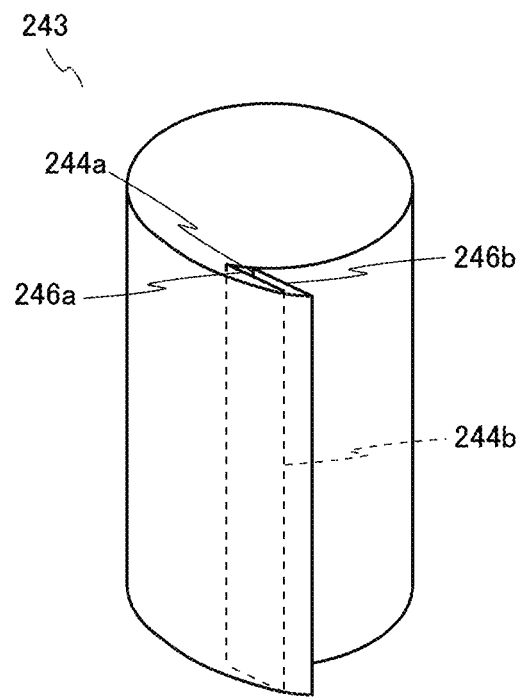
FIG. 9C is a schematic diagram showing an example of a method for producing a paper tube container.
Figure 9D:
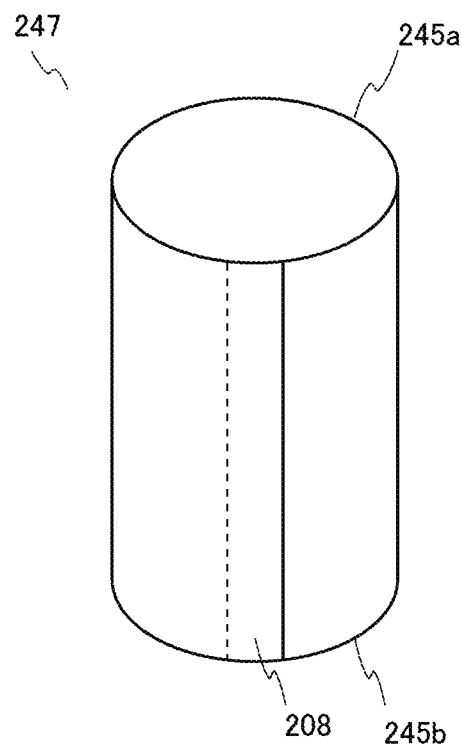
FIG. 9D is a schematic diagram showing an example of a method for producing a paper tube container.
Figure 9E:
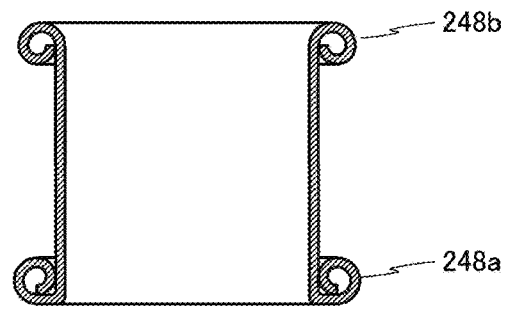
FIG. 9E is a schematic diagram showing an example of a method for producing a paper tube container.

FIG. 9A to FIG. 9I are schematic diagrams showing an example of a method for producing a paper tube container. FIG. 9E and onward show the container in the production process as cross-sectional diagrams corresponding to FIG. 6.

FIG. 9A to FIG. 9G show the production process for the spout formed by the cylinder portion 201 and flat portion 202.

A blank 243 for formation of the cylinder portion 201 is prepared, as shown in FIG. 9A. The blank 243 is the sheet shown in FIG. 7, for example, cut into a rectangular shape. The parts of the predetermined area of a pair of ends 244a and 244b of the blank 243 correspond to the parts that are overlapped and attached when the blank 243 is rolled into a tube shape. The parts of the predetermined area from one end edge 245a of the blank 243 corresponds to the part that is curled to form the flange 206, and the part of the predetermined area from the other end edge 245b of the blank 243 corresponds to the part that is curled to form the flange 206. The surface at the front side in FIG. 9A is the surface that becomes the outer surface of the cylinder portion 201.

Next, as shown in FIG. 9B, a strip-shaped part 246a including the end edge 244a and a strip-shaped part 246b including the end edge 244b of the blank 243 are folded together in opposite directions (hemming).

Next, as shown in FIG. 9C, the hemmed blank is rolled into a tube shape and engaged with the folded strip-shaped parts 246a and 46b, and portions at predetermined areas from each of the pair of ends 244a and 244b, i.e. the strip-shaped parts 246a and 46b, are overlapped and sealed. This forms a tubular intermediate body 247 shown in FIG. 9D. A bonded portion 208 where the strip-shaped parts 246a and 46b are overlapped and sealed is formed in the intermediate body 247. In this example, four sheets of the blank 243 are laminated and sealed at the bonded portion 208. However, the bonded portion 208 may also be formed without overlapping the strip-shaped parts 246a and 46b, i.e. by rolling the blank 243, and overlapping and sealing with the ends 244a and 244b stuck together, or with the ends 244a and 244b separated. In this case, the blank 243 sheet is laminated into three layers. Regardless of the method used to form the bonded portion 208, the ends 244a and 244b of the blank 243 are folded over and sealed to the inside of the bonded portion so that the end surface of the sheet is protected at the ends 244a and 244b.

By curling outward both the portion in a predetermined area from one end edge 245a of the intermediate body 247 and the portion in a predetermined area from the other end edge 245b, an intermediate body 249 having curled portions 248a and 48b is formed, as shown in FIG. 9E. The end edges 245a and 245b of the intermediate body 247 are wrapped up inside the curled portions 248a and 48b during this step. The curled portions 248a and 48b can also be formed by a known working method using a die.

Figure 9F:
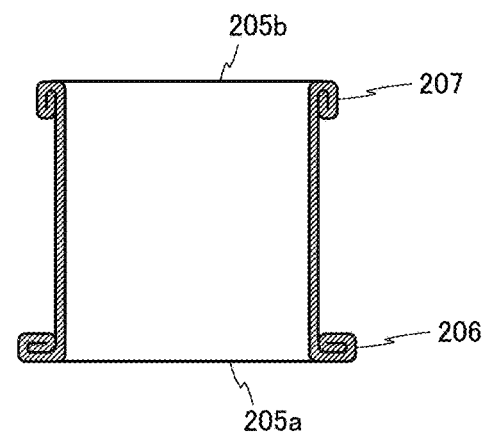
FIG. 9F is a schematic diagram showing an example of a method for producing a paper tube container.

Next, the curled portion 248a of the intermediate body 249 is compressed in the axial direction (the vertical direction in FIG. 9E) while the curled portion 248b is compressed along the outer peripheral surface of the intermediate body 247, thereby forming a cylinder portion 201 having a flange 206 and an outer perimeter portion 207, as shown in FIG. 9F. Compression of the curled portions 248a and 48b can be carried out by pressing under ultrasonic irradiation using an ultrasonic horn, for example. When the curled portions 248a and 48b are compressed by the step illustrated in FIG. 9F, the end edges 245a and 245b of the intermediate body 247 shown in FIG. 9F become wrapped and sealed inside the flange 206 and outer perimeter portion 207, so that the end surfaces of the sheets of the end edges 245a and 245b are protected. As long as there is no effect on workability in subsequent steps, the step of compressing either one or both of the curled portions 248a and 48b may be omitted, or either one or both of the curled portions 248a and 48b may be compressed in the step of fitting and sealing into the flat portion 202 shown in FIG. 9G (described below) or in the subsequent steps.

Figure 9G:
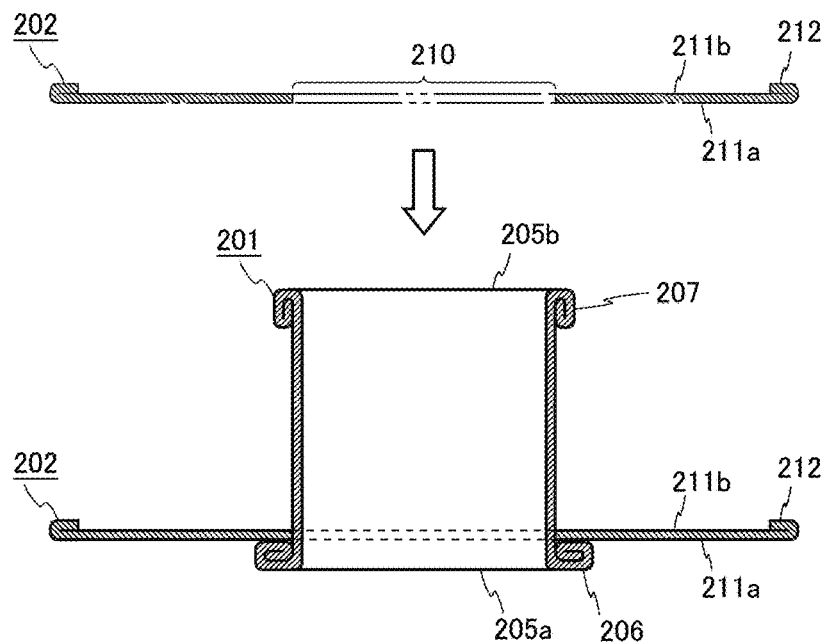
FIG. 9G is a schematic diagram showing an example of a method for producing a paper tube container.

The flat portion 202 represented as an alternate long and two short dashed line in FIG. 9G is fabricated separately from the cylinder portion 201. The flat portion 202 can be formed by, for example, punching the sheet shown in FIG. 7 into the prescribed shape and folding the annular part including the entire outer perimeter toward the surface 211b to form a fold-over portion 212. An opening 210 with approximately the same shape as the cross-sectional shape of an intermediate body 250 (cylinder portion 201) is formed in the punched sheet, either simultaneously with or separately from the punching. The outer dimensions of the punched sheet are set to be larger than the cross-sectional dimensions of the body portion 203 by the size of the fold-over portion 212.

The cylinder portion 201 is then fitted into the opening 210 of the flat portion 202 and the flange 206 of the cylinder portion 201 is contacted with the surface 211a of the flat portion 202 as shown in FIG. 9G, sealing together the flange 206 and the surface 211a of the flat portion 202. This step can produce a spout in which the cylinder portion 201 and flat portion 202 are integrated.

Since both the cylinder portion 201 and flat portion 202 molded sheets are composed mainly of paper, it is possible to fit the cylinder portion 201 into the opening 210 of the flat portion 202 while deforming the portion near the end portion 205b of the cylinder portion 201 and/or the portion near the opening 210 of the flat portion 202 in the step shown in FIG. 9G. In order to facilitate fitting of the cylinder portion 201 into the flat portion 202, however, formation and compression of the curled portion 248b may be carried out after sealing of the flat portion 202 to the flange 206, without forming the curled portion 248b as shown in FIG. 9E or compressing the curled portion 248b as shown in FIG. 9F.

Figure 9H:
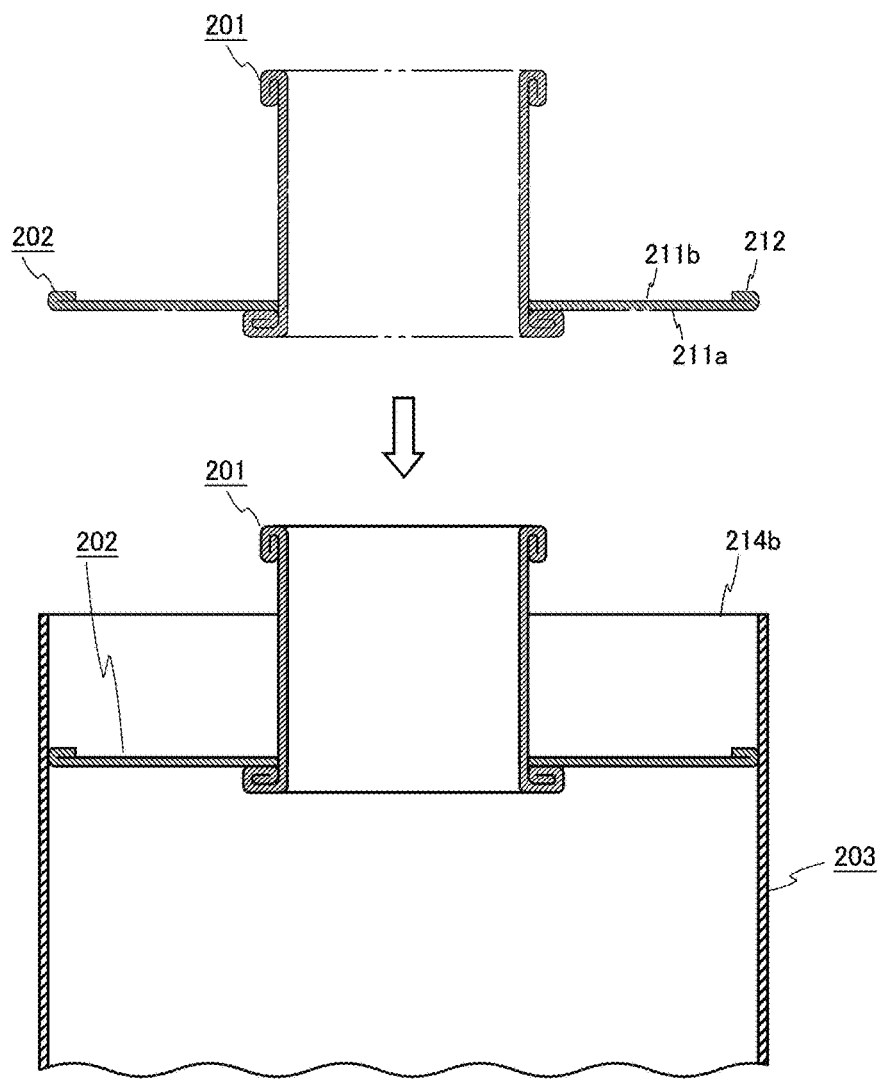
FIG. 9H is a schematic diagram showing an example of a method for producing a paper tube container.
Figure 9I:
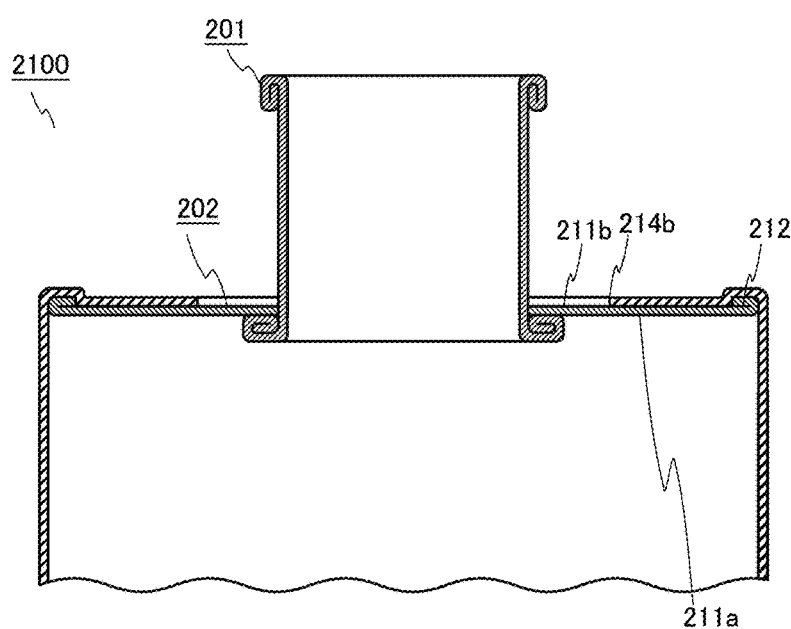
FIG. 9I is a schematic diagram showing an example of a method for producing a paper tube container.

FIG. 9H and FIG. 9I show the production steps for a paper tube container 2100 in which the body portion 203 is sealed to the flat portion 202.

The body portion 203 is formed by, for example, butt-welding, in a butt-seam shape, the inner surfaces of a strip-shaped part that includes the pair of end edges of the sheet, using the sheet shown in FIG. 8. In this embodiment, the sheet used for formation of the body portion 203 is a sheet with a thickness (total thickness) of 30 to 300 µm, and it can therefore be worked into a tubular shape using a bag making machine, pillow stick packaging machine, etc.

As shown in FIG. 9H, after the flat portion 202 has been inserted into the tubular body portion 203 from the end portion 214b, the portion of a predetermined area from the end portion 214b of the body portion 203 is folded and sealed to the surface 211b of the flat portion 202, as shown in FIG. 9I. At this time, the portion of predetermined area from the end portion 214b of the body portion 203 is sealed with the entire fold-over portion 212 and the portion along the entire inner periphery of the fold-over portion 212, within the surface 211b of the flat portion 202. The end surface at the end edge part of the sheet forming the flat portion 202 is thus protected by being sealed to the interior of the bonded portion between the body portion 203 and flat portion 202. The body portion 203 does not necessarily need to be sealed to the inner periphery of the fold-over portion 212 of the flat portion 202, and may be sealed to the fold-over portion 212 alone, but welding between the body portion 203 and flat portion 202 can be strengthened by sealing the body portion 203 across the fold-over portion 212 and the inner peripheral side thereof as according to this embodiment.

A paper tube container 2100 can be produced by following these steps.

FIG. 10A to FIG. 10D are schematic diagrams showing an example of a method for producing a cap.

First, a sheet composed mainly of paper is cut out into a rectangular shape to prepare a blank for formation of the cylinder portion 220. The blank for formation of the cylinder portion 220 may be a sheet as shown in FIG. 7, for example. Using the prepared blank for formation of the cylinder portion 220 through the steps illustrated by FIG. 9A to FIG. 9C, a tubular intermediate body 250 similar to that shown in FIG. 9C is formed (see FIG. 10A). In the intermediate body 250, a bonded portion 225 is formed by overlapping and sealing the portions in the predetermined areas from the pair of end edges of the blank.

Figure 10A:
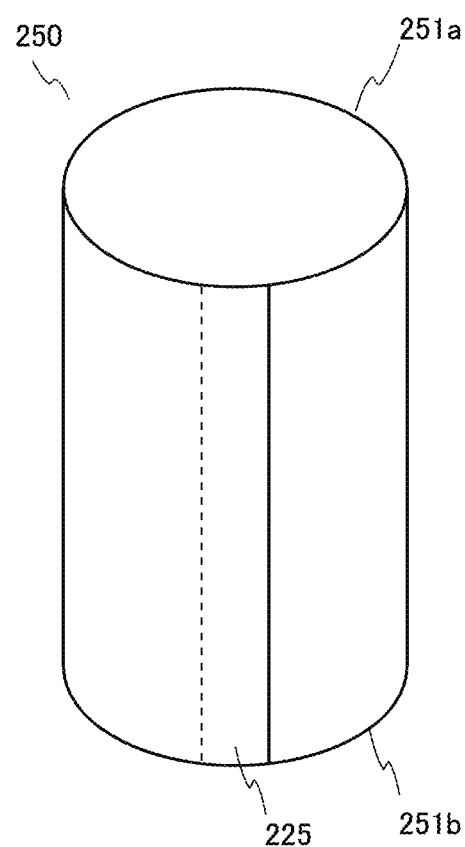
FIG. 10A is a schematic diagram showing an example of a method for producing a cap.
Figure 10B:
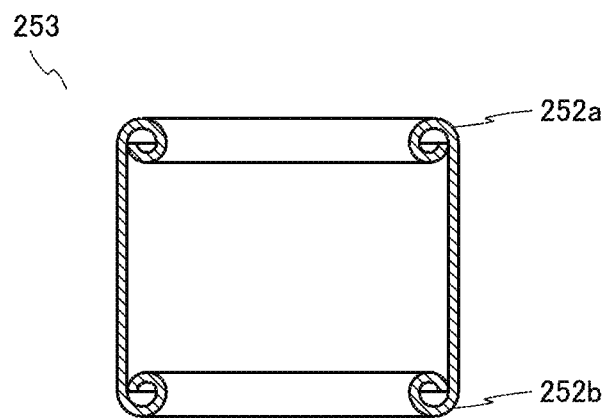
FIG. 10B is a schematic diagram showing an example of a method for producing a cap.

By curling inward both the portion in a predetermined area from one end edge 251a of the intermediate body 250 and the portion in a predetermined area from the other end edge 251b, an intermediate body 253 having curled portions 252a and 52b is formed, as shown in FIG. 10B. The curled portions 252a and 52b can also be formed by a known working method using a die.

Figure 10C:
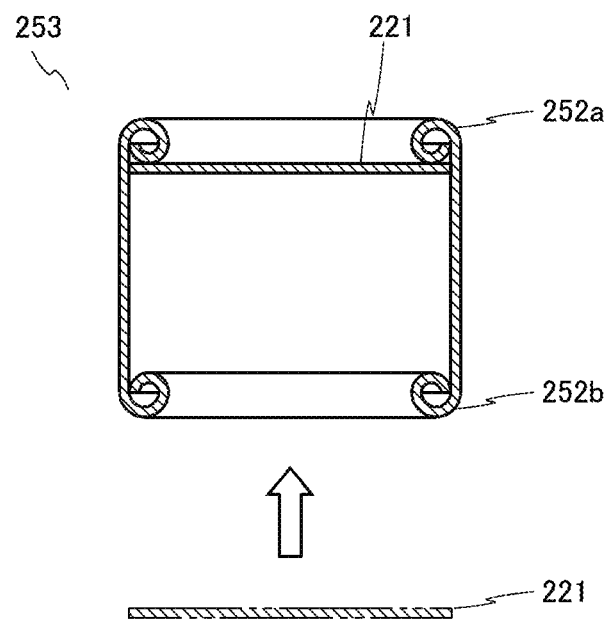
FIG. 10C is a schematic diagram showing an example of a method for producing a cap.

Next, as shown in FIG. 10C, the separately fabricated cap portion 221 is fitted into the tubular portion of the intermediate body 253. The cap portion 221 can be formed by, for example, punching the sheet shown in FIG. 7 into a shape matching the cap 204.

Figure 10D:
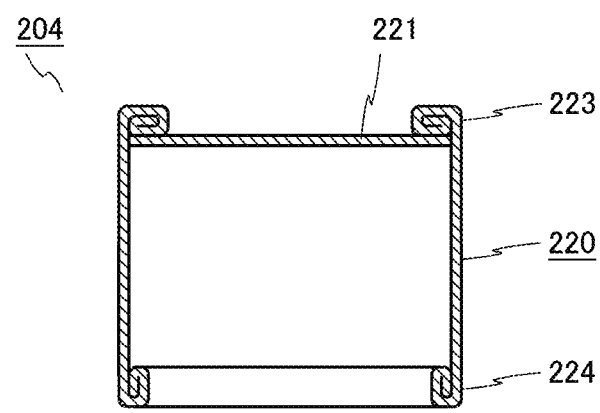
FIG. 10D is a schematic diagram showing an example of a method for producing a cap.

The curled portion 252a is then sealed to the cap portion 221 while being compressed in the axial direction, and the curled portion 252b is compressed along the inner peripheral surface of the intermediate body 253. Thus, as shown in FIG. 10D, a cap 204 is obtained having the cylinder portion 220 and cap portion 221 integrated through the connector portion 223 in which the curled portion 252a is compressed, and with an inner perimeter portion 224 formed. When the curled portions 252a and 52b are compressed, the end edges 251a and 251b of the intermediate body 250 shown in FIG. 10A become wrapped and sealed inside the connector portion 223 and inner perimeter portion 224, respectively, so that the end surfaces of the sheets of the end edges 251a and 251b are protected. The curled portions 252a and 52b of the intermediate body shown in FIG. 10C may also be compressed in advance, before sealing the cap portion 221 to the intermediate body 253.

In the example describe above, the curled portion 252b is formed by curling the end edge 251b of the intermediate body 250 inward as shown in FIG. 10A, but the end edge 251b may also be curled outward and the thus formed curled portion may be compressed along the outer peripheral surface of the intermediate body. In this case, the end surface of the sheet forming the cylinder portion 220 can be protected if the hemming during fabrication of the intermediate body 250 in FIG. 10A is performed only near the end edge, which is to be the inside of the bonded portion 225.

As the welding method for each part in the method for producing the paper tube container 2100 described above, it is possible to employ ultrasonic welding, high frequency welding, heat seal welding, hot air welding, body portion insert compression molding, etc., but ultrasonic welding is preferred from the viewpoint of avoiding effects by the thermal insulation properties of the paper.

Since the cylinder portion 201, flat portion 202 and body portion 203 in the paper tube container 2100 of this embodiment are all formed of sheets composed mainly of paper, it is possible to reduce the resin usage amount compared to a conventional resin tube container. Providing a barrier layer in the sheets forming the cylinder portion 201 and flat portion 202 helps to provide a barrier property to the spout part as well.

As described above, the hemming illustrated in FIG. 9B and the curling illustrated in FIG. 9E are carried out in the molding step for the cylinder portion 201, whereby all of the end surfaces of the sheets forming the cylinder portion 201 are sealed and protected. Also, the entire outer perimeter of the flat portion 202 is folded in toward the surface that becomes the outer surface of the container (the surface 211b side), being sealed and protected by the bonded portion between the body portion 203 and flat portion 202. Moreover, the sheet forming the body portion 203 is also attached in a butt-seam shape when worked into a tubular shape. Since the end surfaces of the sheets forming each part of the inside of the paper tube container 2100 are not exposed with such a construction, permeation of contents such as liquid from the end surface of the sheet into the paper layer can be prevented. According to this embodiment, therefore, it is possible to construct a paper tube container 2100 that is able to hold contents that are permeable into paper layers.

For purpose of holding contents that are not permeable into paper layers, it is possible to omit any one or more from among the hemming of the end edge 244a portion, hemming of the end edge 244b portion, curling of the end edge 245a portion and curling of the end edge 245b portion. The hemming shown in FIG. 9B can also be omitted if protective tape is used to protect the end surface of the sheet on the end edge 244a or 244b. For the body portion 203 as well, the method of attaching the sheet that is to form the body portion 203 is not particularly restricted if the use is for housing of contents that are not permeable into paper layers, and the outer surface of the strip-shaped region including one end edge of the sheet may be bonded together with the inner surface of the strip-shaped region including the other end edge of the sheet. The end surface of the sheet that is to form the body portion 203 may also be protected using protective tape.

Also, the cylinder portion 220 forming the cap 204 is constructed by hemming and curling so that the end surface of the sheet is not exposed to the inner side, similar to the cylinder portion 201. When the paper tube container 2100 is resealed with the cap 204, therefore, it is possible to prevent permeation of contents such as liquid from the end surface of the sheet forming the cylinder portion 220 into the paper layer, even if the contents adhere to the inner surface of the cap 204. In order to reliably prevent permeation of contents into the paper layer of the sheet forming the cap portion 221, the blank for formation of the cap portion 221 may be formed larger in advance and sealed to the connector portion 223 of the cylinder portion 220 with the annular part in a predetermined area from the outer perimeter folded over toward the outer surface. For purpose of holding of contents that do not permeate into the paper layers, however, either one or both of the hemming and curled portion 252b (inner perimeter portion 224) processing during formation of the cylinder portion 220 may be omitted.

Moreover, in the paper tube container 2100 of this embodiment, the cylinder portion 201 and the flat portion 202 are sealed to construct the spout, and the inner surface of the sheet that is to form the body portion 203 is sealed to the outer surface of the flat portion 202. The sheet that is to form the body portion 203 is easy to bend because it is composed mainly of paper and has a total thickness of 30 to 300 μm, and contents can be easily squeezed out by folding in the body portion 203 along the outer periphery of the flat portion 202. Furthermore, since the flat portion 202 does not leave space in which contents may remain, it is possible to reduce residue of contents when they have been squeezed out by folding the body portion 203 along the outer periphery of the flat portion 202.

Third Embodiment

Since a tube container is generally used for packaging of liquid-containing contents, when paper is used as the sheet to form the body portion, it is necessary to provide a resin layer on a surface on one side of the paper (the surface that forms the inner side of the body portion) in order to prevent permeation of liquid into the paper. It is also necessary to prevent permeation of liquid from the end surfaces of the sheet. The method for partially overlapping a sheet with different materials for the front and back (for example, polyethylene for the innermost layer and paper for the outermost layer) into a tube shape and bonding the innermost layer and outermost layer of the overlapped parts, may be a method using a tape material at the overlapping portion, but the need for the tape material will increase production cost while also potentially leading to elution of the adhesive component from the end surface of the tape material exposed on the inside, making it undesirable as a construction for a tube container. The body portion must have a construction so that the end surfaces of the sheet do not contact the contents, and a suitable form is one in which the inner surfaces of the sheet are butted in a butt-seam shape as a back bonded seal, as in a pillow packaging.

When two paper-containing sheets are used for a back bonded seal, however, the back bonded seal part has strong stiffness and juts out from the body portion, thus impairing the outer appearance of the packaging container.

This embodiment provides a tube container with a high aesthetic quality using paper on the surface of the body portion.

Figure 11:
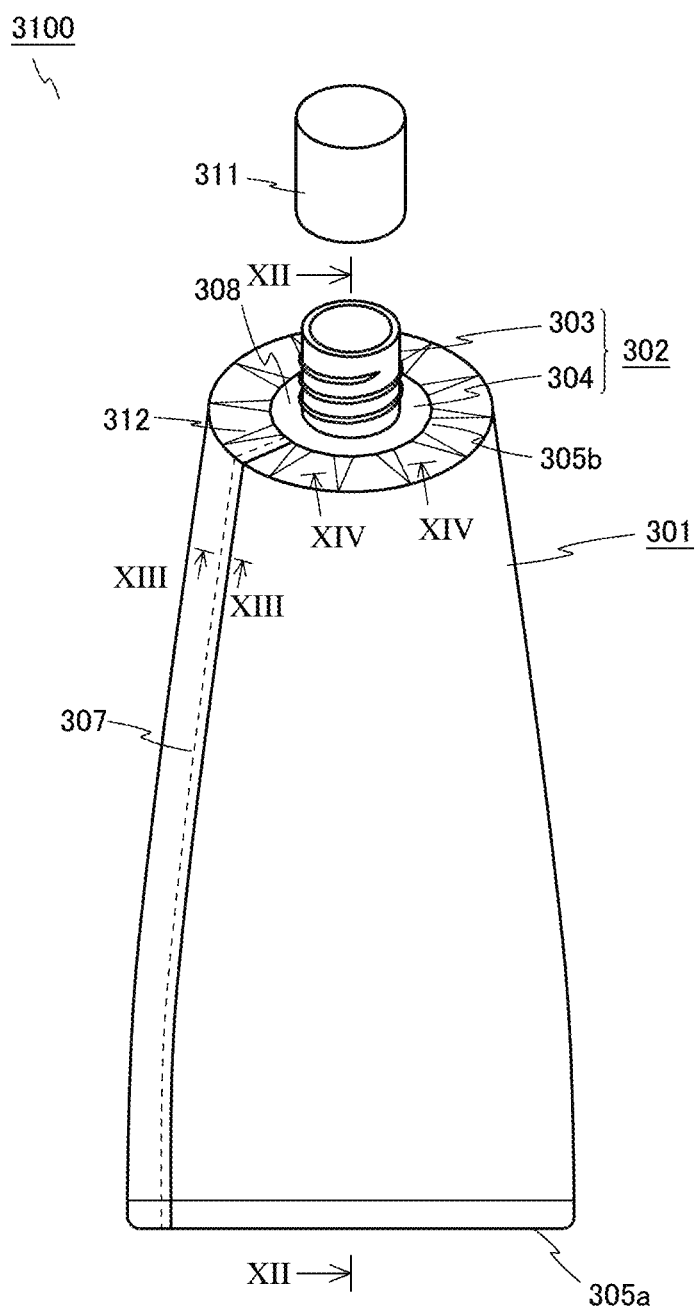
FIG. 11 is a perspective view showing the general construction of a tube container according to an embodiment.
Figure 12:
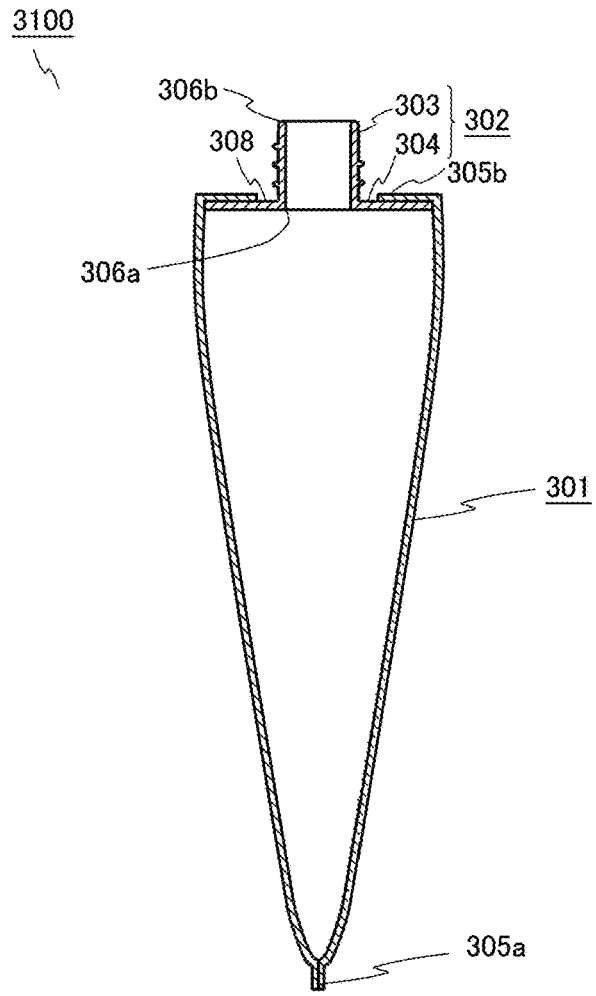
FIG. 12 is a cross-sectional view along line XII-XII shown in FIG. 11.
Figure 13:
FIG. 13 is an end view along line XIII-XIII shown in FIG. 11.
Figure 14:
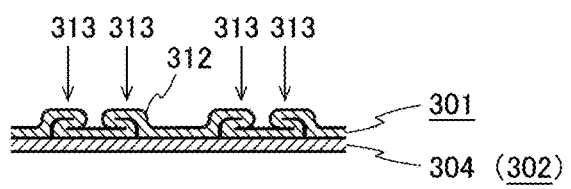
FIG. 14 is an end view along line XIV-XIV shown in FIG. 11.

FIG. 11 is a perspective view showing the general construction of a tube container according to the embodiment, FIG. 12 is a cross-sectional view along line XII-XII in FIG. 11, FIG. 13 is an end view along line XIII-XIII in FIG. 11, and FIG. 14 is an end view along line XIV-XIV in FIG. 11.

A tube container 3100 includes a tube-like body portion 301, and a spout portion 302 mounted on the body portion 301.

The body portion 301 is a member for housing contents and is formed of a sheet that includes paper and a sealant. The body portion 301 is formed by rolling a sheet having a pair of roughly parallel end edges and butt-welding, in a butt-seam shape, the inner surfaces of a strip-shaped part that includes the pair of end edges of the sheet. The body portion 301 can also be fabricated using a bag making machine, pillow stick packaging machine, etc.

The spout portion 302 serves as a spout to extract the contents housed in the body portion 301 to the outside, and it is molded of a material including a thermoplastic resin. The spout portion 302 includes a pouring cylinder portion 303 and a flange portion 304. The flange portion 304 is connected to one end portion 306a of the pouring cylinder portion 303 (the lower end in FIG. 12), and it is a flat part extending outward from the pouring cylinder portion 303. In this embodiment, the flange portion 304 is formed so as to extend in the direction perpendicular to the axial direction of the pouring cylinder portion 303 (the left-right direction in FIG. 12). In this embodiment, the flange portion 304 is formed in a toric shape, but the outer shape of the flange portion 304 is not limited to this shape and may be elliptical, oblong, track-shaped, polygonal, etc., as long as it can be joined with the body portion 301.

The thermoplastic resin used as the material for the spout portion 302 may be any one or a combination of two or more from among polyethylene, polypropylene, polyester, polyamide and cyclopolyolefin resins, for example. The spout portion 302 may be molded of a material including a thermoplastic resin and a filler other than a resin, where the filler may be any one or a combination of two or more from among talc, kaolin, paper dust and cellulose fibers. By using a mixture of a thermoplastic resin and a filler other than a resin as the material of the spout portion 302, it is possible to reduce the resin usage amount while maintaining moldability and heat weldability between the body portion 301 and sheet material. The method of molding the spout portion 302 is not particularly restricted, and a known molding method such as thermoforming or compression molding, including injection molding, vacuum forming, hot plate compressed air molding, etc., may be used.

As shown in FIG. 11 and FIG. 12, one end portion 305a of the body portion 301 is sealed and closed. The portion in a predetermined area from the other end portion 305b of the body portion 301 is folded over and sealed to an outer surface 308 of the flange portion 304 of the spout portion 302. Multiple pleats 312 are formed by folding the sheet that is to form the body portion 301 onto the flange portion 304, as shown in FIG. 11 and FIG. 14.

A back bonded seal portion 307 including the inner surfaces of the sheet butt-welded in a butt-seam shape is formed on the body portion 301. As shown in FIG. 13, the back bonded seal portion 307 formed on the body portion 301 is folded and sealed to the body portion 301 along the outer surface of the body portion 301. The outer surface of the back bonded seal portion 307 and the outer surface of the body portion 301 are sealed using a material with a heat welding property.

As shown in FIG. 14, at least part of the portion in a predetermined area from the end portion 305b of the body portion 301 is folded over onto the flange portion 304 of the spout portion 302, thus forming sheet-overlapped portions 313. The overlapped portions 313 have the overlapping outer surfaces of the sheet in contact, the outer surfaces of the mutually contacting sheets being sealed using a material with a heat welding property.

Figure 15:
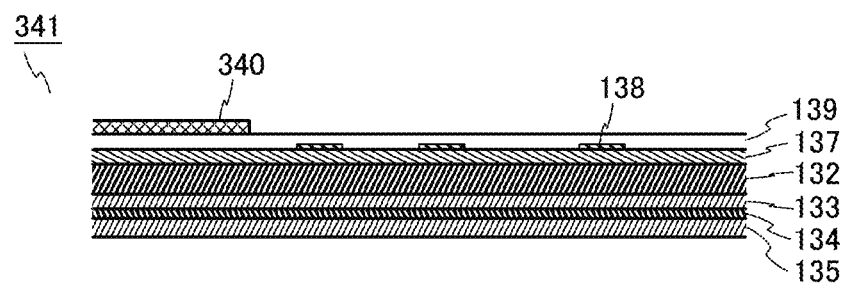
FIG. 15 is a cross-sectional view showing an example of the layered structure of a sheet forming the body portion of a tube container.

FIG. 15 is a cross-sectional view showing an example of the layered structure of a sheet forming the body portion of a tube container.

The body portion 301 of the tube container 3100 is made of a sheet 341 composed mainly of paper. The sheet 341 is a multilayer sheet having a base material film layer 133, barrier layer 134 and sealant layer 135 laminated in that order on a surface on one side of the paper layer 132, and a paper protective layer 137 laminated on a surface on the other side of the paper layer 132, as well as an ink layer 138 and overcoat varnish layer 139 laminated on the paper protective layer 137, and with a heat weldable coating layer 340 coated in a pattern. The structures for each of the layers described for the first embodiment may also be applied for the paper layer 132, base material film layer 133, barrier layer 134, sealant layer 135, paper protective layer 137, ink layer 138 and overcoat varnish layer 139. The total thickness of the sheet 341 forming the body portion 301 and the content ratio of paper (pulp fibers) may be set within the same ranges as the first embodiment. One or more of the layers other than the paper layer 132 and sealant layer 135 may also be omitted from the sheet 341.

(Heat-Weldable Coating Layer)

The heat-weldable coating layer 340 is a layer for imparting heat weldability to the outer surface of the sheet 341. In this embodiment, as described below, the heat-weldable coating layer 340 pattern-coated on the outer surface of the sheet 341 seals the outer surface of the back bonded seal portion 307 to the outer surface of the body portion 301 (see FIG. 13), while the outer surfaces of the sheet overlapping at the overlapped portions 313 formed on the flange portion 304 of the spout portion 302 are sealed (see FIG. 14).

The heat-weldable coating layer 340 can be formed by coating and drying a coating agent that includes a thermoplastic resin with a melting point of 200° C. or lower, such as an acrylic polymer, polyolefin, polyvinyl acetate or polyester. The coating agent may also have an inorganic material, etc., mixed in with the thermoplastic resin in order to prevent blocking.

The coating amount of the coating agent used to form the heat-weldable coating layer 340 is 0.2 to 40 g/m$^2$ and preferably 3.0 to 30 g/m$^2$. If the coating amount of the coating agent is less than 0.2 g/m$^2$, the bonding strength between the outer surfaces of the sheet 341 will be insufficient, and edge rising of the sheet ("paper curling") may occur at the back bonded seal portion 307 or overlapped portions 313. If the coating amount of the coating agent is greater than 40 g/m$^2$, on the other hand, the frictional coefficient will increase, machining compatibility for processing equipment such as the bag making machine will decrease, and blocking between the sheets 341 will tend to occur.

The heat-weldable coating layer 340 may be formed over the entire sheet 341, but since the surface of the sheet 341 has a high frictional coefficient, this may lower the machining compatibility during the step of forming the body portion 301 and the subsequent steps. From the viewpoint of machining compatibility, therefore, the heat-weldable coating layer 340 more preferably has a patterned coating agent (partial coating) provided on part of the surface of the sheet 341.

If the heat-weldable coating layer 340 is provided over part of the surface of the sheet 341, it is sufficient to provide the heat-weldable coating layer 340 on the to-be-sealed sections, i.e. the parts where the outer surface of the back bonded seal portion 307 and the outer surface of the body portion 301 are in contact, and the parts where the outer surfaces of the overlapping sheet at the overlapped portions 313 are in contact. However, the heat-weldable coating layer 340 may instead be provided only on one of the surfaces contacting at the to-be-sealed sections.

The thickness (total thickness) of the sheet 341 forming the body portion 301 is not particularly restricted but is preferably 30 to 300 μm. If the thickness of the film forming the body portion 301 is within this range, then it will be possible to easily work the body portion 301 into a tubular shape using a bag making machine, pillow stick packaging machine, etc. Since the paper layer 132 imparts strength and stiffness, it can be made thinner compared to a common laminate tube (300 to 500 μm thickness), and the resin usage amount can be reduced.

In order to reduce the proportion of resin in the sheet 341 forming the body portion 301, the proportion of the paper layer 132 in the mass of the sheet 341 is preferably 50% or greater. A higher proportion is preferred for the paper layer 132 from the viewpoint of reducing resin usage.

Any one or more of the base material film layer 133, barrier layer 134, paper protective layer 137, ink layer 138 and overcoat varnish layer 139 may be omitted in the layered structure of the sheet 341 shown in FIG. 15.

As shown in FIG. 11, the tube container 3100 may also be provided with a screw cap 311 that is removable by screwing onto the pouring cylinder portion 303 of the spout portion 302. Providing the tube container 3100 with the screw cap 311 will facilitate resealing of the tube container 3100 after opening.

The tube container 3100 may also be provided with a hinge cap instead of the screw cap 311. If a hinge cap is provided, the hinge cap can be fitted onto the spout portion 302 by screwing onto the pouring cylinder portion 303 as shown in FIG. 11. Alternatively, a rib may be formed instead of a screw thread on the outer surface of the pouring cylinder portion 303 and the hinge cap may be attached to the spout portion 302 by fitting over the rib.

An end portion 306b of the pouring cylinder portion 303 may also be sealed with a film closing the pouring cylinder portion 303, with the tube container 3100 in the unopened state.

The interior of the pouring cylinder portion 303 may also be closed by a partition to ensure a closed state inside the container, with the tube container 3100 in the unopened state. When a partition is to be provided, preferably a circular half-cut is formed along the inner periphery of the pouring cylinder portion 303, and a pull ring is provided which is connected to the part surrounded by the half-cut. With such a construction, the user may pull on the pull ring to rupture the half-cut 327 part of the partition when opening the tube container 100, thereby removing part of the partition surrounding the half-cut and forming an opening for pouring of the contents from the body portion 301 through the pouring cylinder portion 303.

A method for producing the tube container 3100 of this embodiment will now be described.

Figure 16:
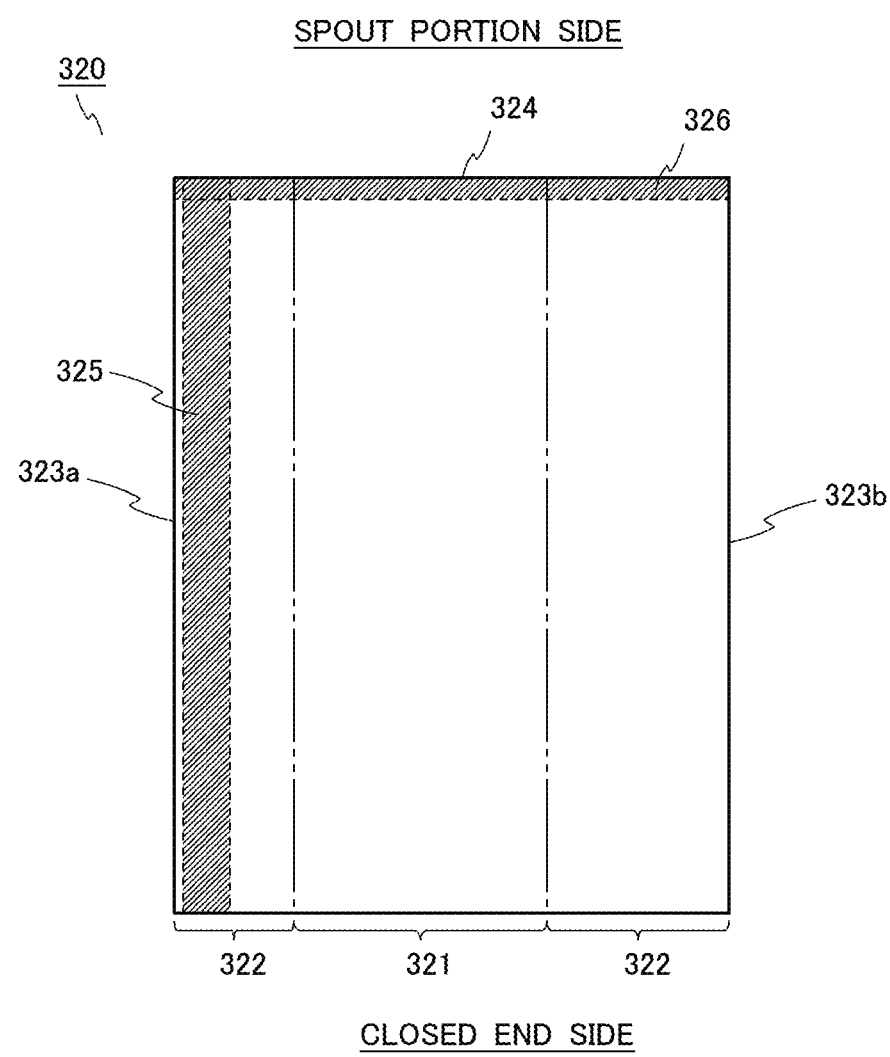
FIG. 16 is a plan view of a sheet forming the body portion of a tube container.

FIG. 16 is a plan view of a sheet forming the body portion of a tube container.

A sheet 320 shown in FIG. 16 is a sheet having the layered structure explained for FIG. 15, and it corresponds to a single body portion 301. The region near an upper end edge 324 in FIG. 16 corresponds to the portion which is to be welded to the spout portion 302, and the region near the lower end edge in FIG. 16 corresponds to the portion which is to be the closed end. A center region 321 sandwiched by alternate long and two short dashed lines is the portion that becomes the front surface of the tube container 3100, and regions 322 adjacent to both sides of the region 321 are the portions that become the back surface of the tube container 3100. The front side on the image plane of FIG. 16 is the surface that becomes the outer surface of the body portion 301.

On the surface of the sheet 320 (outer surface), the above-described heat-weldable coating layer is formed by pattern coating a heat-weldable coating agent onto a strip-shaped region 325 along an end edge 323a and a strip-shaped region 326 including an end edge 324 adjacent to the end edge 323a. The region 325 corresponds to the portion in contact with the outer surface of the back bonded seal portion 307 and the outer surface of the body portion 301, when the sheet 320 has been rolled into a tube shape, both inner surfaces of the strip-shaped regions along the parallel facing end edges 323a and 323b have been butted in a butt-seam shape to form a back bonded seal portion 307, and the back bonded seal portion 307 has been folded along the body portion 301. The region 326 corresponds to the portion welded to the flange portion 304 and folded to form a pleat 312, when the tube shaped sheet 320 is joined to the flange portion 304 of the spout portion 302.

FIG. 17A to FIG. 17D are cross-sectional diagrams for illustration of a method for producing the body portion of a tube container. In FIG. 17A to FIG. 17D, the direction perpendicular to the plane of the image is the conveying direction of the sheet 320, the sheet 320 is sequentially processed while being conveyed by a conveying apparatus (not shown).

Figure 17A:
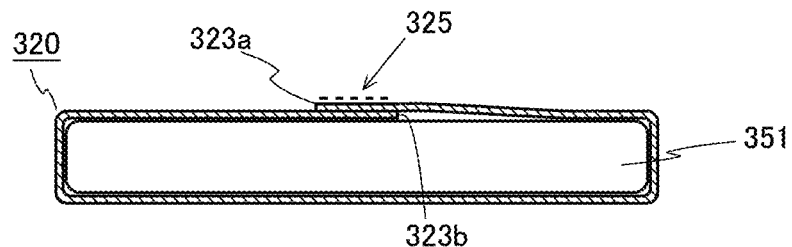
FIG. 17A is a cross-sectional diagram for illustration of a method for producing the body portion of a tube container.

First, as shown in FIG. 17A, the sheet 320 is wrapped on a laminar jig 351 and the predetermined area including the one end edge 323a and the predetermined area including the other end edge 323b are overlapped. As explained for FIG. 16, a heat-weldable coating layer is provided in the region 325 along the end edge 323a.

Figure 17B:
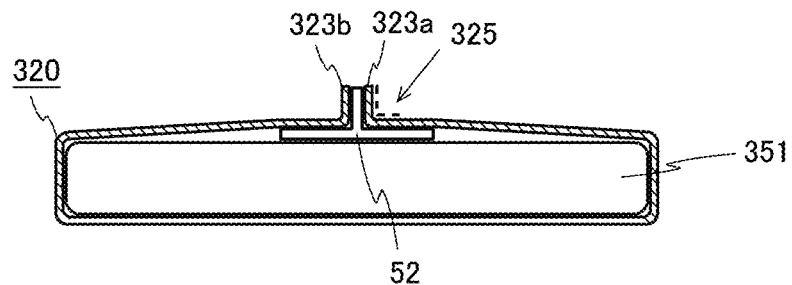
FIG. 17B is a cross-sectional diagram for illustration of a method for producing the body portion of a tube container.

Next, as shown in FIG. 17B, the strip-shaped portion along the end edge 323a and the strip-shaped portion along the end edge 323b are raised up using a guide 352 having an inverse T-shaped cross-section, and the respective inner surfaces are to face each other, in a butt-seam shape, across the guide 352.

Figure 17C:
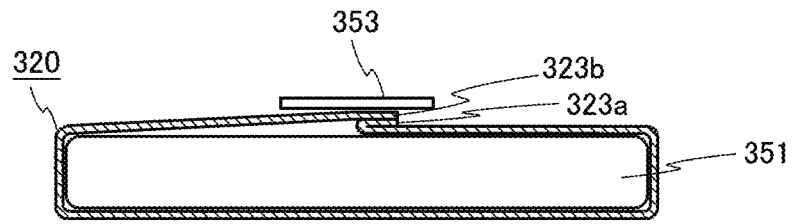
FIG. 17C is a cross-sectional diagram for illustration of a method for producing the body portion of a tube container.

Next, as shown in FIG. 17C, a flat guide 353 is used to bend the butt-seam portions of the inner surfaces of the sheet 320 approximately 90°, forming a state in which three layers are overlapped.

Figure 17D:
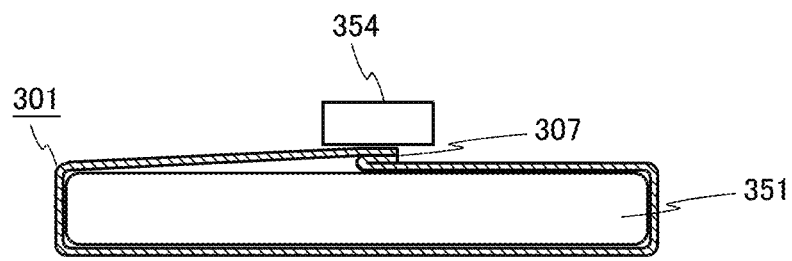
FIG. 17D is a cross-sectional diagram for illustration of a method for producing the body portion of a tube container.

In this state, as shown in FIG. 17D, a seal bar 354 is used for sealing to weld together the inner surfaces of the sheet 320 and form a back bonded seal portion 307, while simultaneously forming a body portion 301 with the back bonded seal portion 307 welded to the outer surface of the body portion 301 by the heat-weldable coating layer provided in the region 325.

Figure 18A:
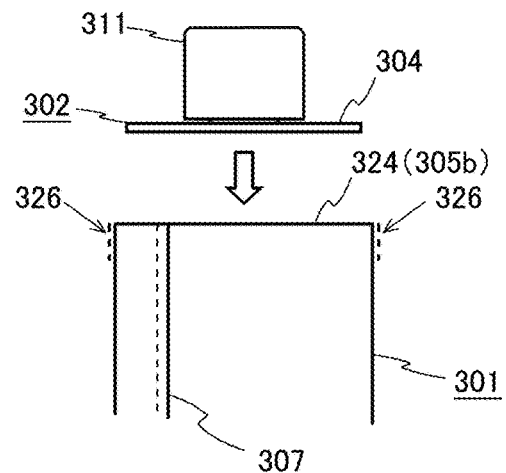
FIG. 18A is a cross-sectional diagram for illustration of a method for welding the body portion and spout portion of a tube container.
Figure 18B:
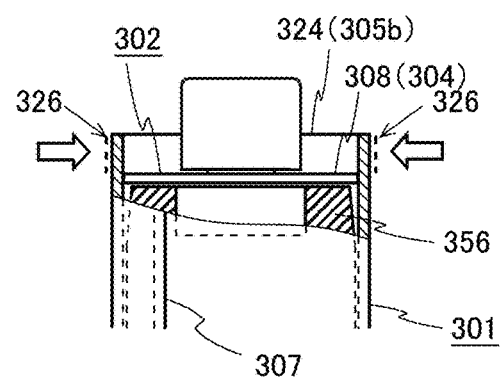
FIG. 18B is a cross-sectional diagram for illustration of a method for welding the body portion and spout portion of a tube container.
Figure 18C:
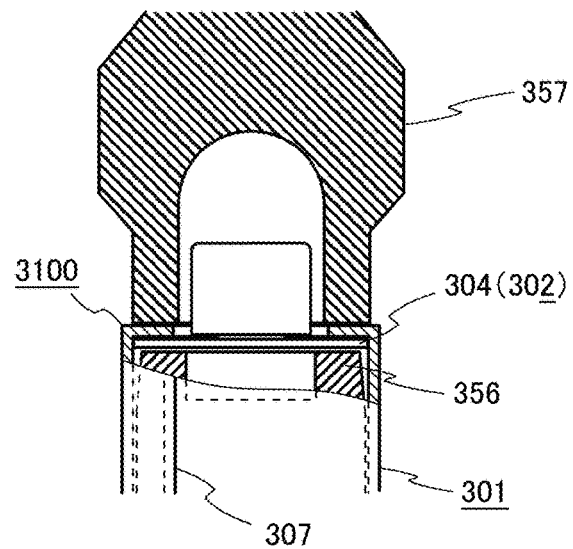
FIG. 18C is a cross-sectional diagram for illustration of a method for welding the body portion and spout portion of a tube container.

FIG. 18A to FIG. 18C are cross-sectional diagrams for illustration of a method for welding the body portion and spout portion of a tube container.

First, as shown in FIG. 18A and FIG. 18B, a tubular body portion 301 and a separately molded spout portion 302 are prepared, and the flange portion 304 of the spout portion 302 is inserted through the end portion 305b of the body portion 301. Preferably, a separately molded screw cap 311 is screwed and integrated into the spout portion 302. As explained for FIG. 16, a heat-weldable coating layer is provided in the region 326 including the end edge 324.

Next, as shown in FIG. 18B, a jig 356 inserted through the other end portion of the body portion 301 is used to support the inner surface of the flange portion, and the portion in a predetermined area from the end edge 324 (end portion 305b) of the body portion 301 is folded back in the direction of the outlined arrow in FIG. 18B using a nail (not shown). Several nails for folding over the body portion 301 are provided for each spacing in the circumferential direction of the spout portion 302.

Next, as shown in FIG. 18C, the portion in the predetermined area from the end edge 324 of the body portion 301 is sandwiched by a welding device 357 such as an ultrasonic horn, and the jig 356. By pressing the portion in the predetermined area from the end edge 324 of the body portion 301 with the multiple intermittently placed nails against the welding device 357, it is possible to fold the portion in the predetermined area from the end edge 324 of the body portion 301 and weld it to the flange portion 304. This allows the body portion 301 and the spout portion 302 to be joined together.

The contents are then filled into the body portion 301 and the end portions of the body portion 301 are sealed to obtain a packaging using the tube container 3100.

As the method for welding the body portion 301 and spout portion 302 during production of the tube container 3100, it is possible to employ ultrasonic welding, high frequency welding, heat seal welding, hot air welding, body portion insert compression molding, etc., but ultrasonic welding is preferred from the viewpoint of avoiding effects by the thermal insulation properties of the paper.

As explained above, the tube container of this embodiment has the body portion 301 constructed of a sheet including paper and a sealant, and therefore the resin usage amount is reduced and stiffness can be imparted to the body portion 301 by the paper, thus providing excellent self-support and handling properties for the container. It is possible to provide a tube container 3100 in which the back bonded seal portion 307 formed on the body portion 301 is welded to the outer surface of the body portion 301, and the overlapped portions 313 of the sheet formed on the flange portion 304 are welded together, thus avoiding paper curling in the back bonded seal portion 307 and overlapped portions 313 and providing an excellent aesthetic quality.

In the tube container 3100 of this embodiment, since the flange portion 304 has a flat shape perpendicular to the central axis of the pouring cylinder portion 303 and the body portion 301 is welded to the outer surface 308 of the flange portion 304, the body portion 301 can be folded along the outer perimeter of the flange portion 304 so that the contents can be easily squeezed out when the contents of the tube container 3100 have been reduced. Since the flange portion 304 has a flat shape and no space is formed by the flange portion 304 that would lead to residue of the contents, the contents can be squeezed out without residue by folding the body portion 301 along the outer perimeter of the flange portion 304 so that the flange portion 304 and body portion 301 are in an approximately flat state.

Modified Example

The embodiment described above was for an example in which a heat-weldable coating layer 340 is laminated on both regions 325 and 26 shown in FIG. 16, but when the number of overlapped portions 313 and the overlapping area can be reduced due to the shape of the flange portion 304 and the manner of folding the welded part of the body portion 301 to the flange portion 304, the heat-weldable coating layer 340 of the region 326 (overlapped portions 313) may be omitted, or with the heat-weldable coating layer 340 provided only on the region 325. In this case as well, the back bonded seal portion 307 may be folded and sealed along the outer surface of the body portion 301, to obtain a highly aesthetic tube container in which paper curling of the back bonded seal portion 307 is prevented.

The example in the embodiment described above had the heat-weldable coating layer 340 laminated by pattern coating of a coating agent, but the coating agent may also be coated over the entire surface of the sheet material forming the body portion 301 to form the heat-weldable coating layer 340.

The example in the embodiment described above also had the back bonded seal portion 307 and overlapped portions 313 welded by providing a heat-weldable coating layer 340, but alternatively, instead of laminating the heat-weldable coating layer 340, a material with a heat-weldable property may be used to form the paper protective layer 137 shown in FIG. 16 over the entire surface of the paper layer 132, and the back bonded seal portion 307 may be welded to the outer surface of the body portion 301 by the paper protective layer 137. In addition to the back bonded seal portion 307, the sheets overlapping at the overlapped portions 313 on the flange portion 304 may also be welded together by the paper protective layer 137. When the paper protective layer 137 is formed of a heat-weldable material, a heat welding resin such as an acrylic polymer, polyolefin, polyvinyl acetate or polyester may be extrusion coated on the paper layer 132, or a coating agent including a thermoplastic resin and an inorganic compound added as necessary may be coated onto the paper layer 132. When a heat-weldable paper protective layer 137 is formed by extrusion coating of a resin, the thickness is preferably 5 to 30 μm, and when a thermoplastic paper protective layer 137 is formed by a coating agent, the thickness is preferably 0.2 to 20 μm.

The tube container of this embodiment is as follows.
[1] A tube container including:
a spout portion with a tubular pouring cylinder portion and a flange portion that is connected to one end of the pouring cylinder portion and extends outward from the pouring cylinder portion, and
a tube-like body portion made of a sheet having a sealant on a surface on one side of paper, closed at one end, and sealed to the flange portion at a portion in a predetermined area from the other end,
a back bonded seal portion is formed on the body portion by butt-sealing, in a butt-seam shape, the sheet that has been rounded in a tubular shape, and
the back bonded seal portion is folded along the outer surface of the body portion and sealed to the body portion.

[2] The tube container according to item [1], where at least part of the portion in the predetermined area of the body portion is folded to form a sheet-overlapped portion, and
the overlapping sheets at the overlapped portion are sealed together.

[3] The tube container according to item [2], where the back bonded seal portion is sealed to the outer surface of the body portion by a material with a heat-weldable property partially coated on a surface on the other side of the paper forming the sheet of the body portion, and the overlapping sheets are sealed at the overlapped portions.

[4] The tube container according to item [3], where the coating amount of the coating agent is 0.2 to 40 $g/m^2$.

[5] The tube container according to item [2], where the back bonded seal portion is sealed to the outer surface of the body portion by a layer of a material with a heat-weldable property laminated over the entire surface of the surface on the other side of the paper forming the sheet of the body portion, and the overlapping sheets are sealed at the overlapped portions.

Fourth Embodiment

The body portion of the tube-like container described in Japanese Published Examined Utility Model Application No. H7-45311 mentioned above is problematic in terms of elution and deposition of contents that permeate through paper when the contents contact with the paper due to exposure of the end surfaces of the paper inside the tube-like container. If both ends of the blanks composed of laminated bodies made of laminated intermediate paper layers are folded and heat-sealed after overlapping the innermost layers (butt-seam sealing), as in the body portion of the tube-like container described in Japanese Laid-Open Patent Publication No. 2012-25471, then the end surfaces of the paper will not be exposed inside the tube-like container but the sealed portion of the body portion including the paper will have a greater thickness, resulting in impaired outer appearance of the tube-like container.

This embodiment provides a body portion for a tube-like container that has a satisfactory outer appearance without exposure of the paper end surfaces inside the body portion of the tube-like container.

<Body Portion of Tube-Like Container of Fourth Embodiment>

Figure 19:
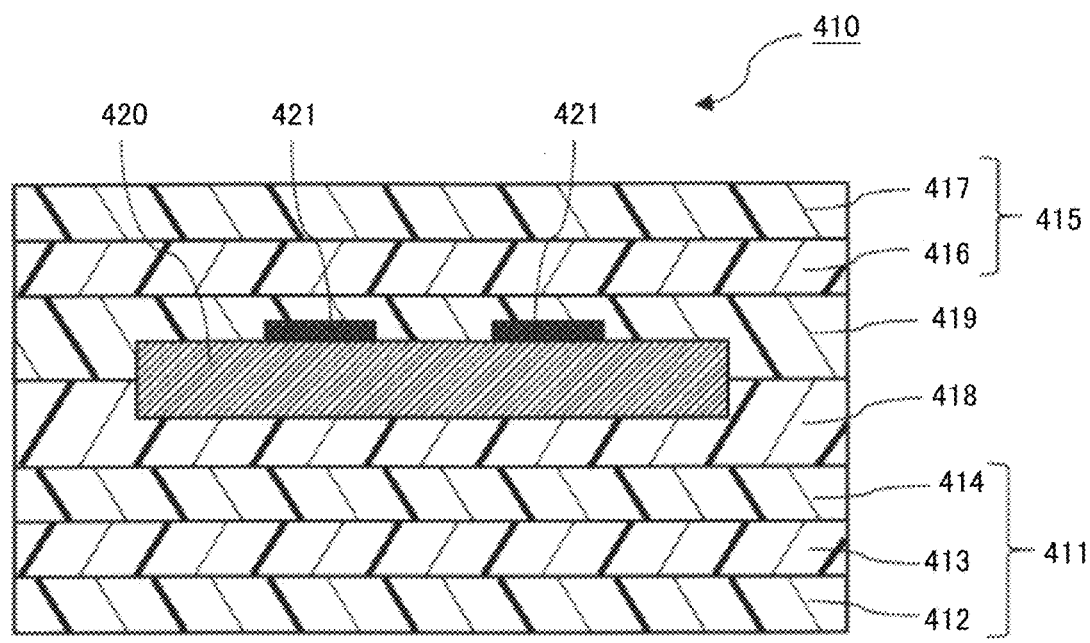
FIG. 19 is a cross-sectional diagram showing the layered structure of a laminated sheet forming the body portion of a tube-like container according to a fourth embodiment.

FIG. 19 is a cross-sectional diagram showing the layered structure of a laminated sheet 410 forming a body portion 4100 of a tube-like container according to the fourth embodiment. The laminated sheet 410 has, for example, a paper layer 420 laminated between an inner side laminated film 411 having a first sealant layer 412, barrier layer 413 and first base material film layer 414 laminated in that order, and an outer side laminated film 415 having a second base material film layer 416 and second sealant layer 417 laminated in that order. The paper layer 420 is provided in a manner sandwiched between a first adhesive layer 418 laminated on the side of the first base material film layer 414 opposite to the barrier layer 413, and a second adhesive layer 419 laminated on the side of the second base material film layer 416 opposite to the second sealant layer 417. An ink layer 421 is also partially laminated on the second base material film layer 416 side of the paper layer 420.

Each of the layers forming the laminated sheet 410 will now be described in detail.

(First Sealant Layer)

The first sealant layer 412 is the innermost layer of the laminated sheet 410 and the innermost layer of the inner side laminated film 411, and it is a thermoplastic resin layer. The first sealant layer 412 is the layer that is sealed with the second sealant layer 417 of the innermost layer when forming the laminated sheet 410 into a tube shape. The first sealant layer 412 is the layer bonded to the spout portion 450 when the body portion 4100 formed in a tube shape is used for the tube-like container 4300 described below, and it therefore preferably has suitable adhesiveness with the spout portion 450.

The material used for the first sealant layer 412 is not particularly restricted as long as it is a thermoplastic resin, but for example, polypropylene, polyethylene, a cyclic polyolefin, a polyester, etc., is preferred. The softening temperature of the first sealant layer 412 must be at least 20° C. lower than the softening temperature of the first base material film layer 414, and it is more preferably at least 40° C. lower. If the temperature of the softening temperature of the first base material film layer 414 minus the softening temperature of the first sealant layer 412 is less than 20° C., then the first base material film layer 414 and second base material film layer 416 will soften during sealing of the body portion for formation of the laminated sheet 410 into a tube shape, and minute holes (pinholes) will be more likely to form in the body portion 4100.

(Barrier Layer)

The barrier layer 413 is an intermediate layer of the inner side laminated film 411, being laminated for quality protection, extended life of the contents, etc.

The barrier layer 413 includes one or more from among a metal vapor deposited layer of aluminum or another metal, a vapor deposited layer of an inorganic compound such as silica or alumina, and a barrier resin coating film that is a barrier coat material including a laminar mineral and a binder resin and including ethylene-vinyl alcohol copolymer (EVOH), polyvinylidene chloride (PVDC), etc., as a component. Combinations of these may also be used. If the barrier layer 413 is transparent, it will be possible to contribute to clarity of the body portion 4100 of the tube-like container, to improve the visibility of the contents and to aid in confirmation of residue and the like, and therefore the barrier layer 413 is preferably transparent.

(First Base Material Film Layer)

The first base material film layer 414 is the innermost layer of the inner side laminated film 411 and also functions as a base material layer for the barrier layer 413 described above.

The material used for the first base material film layer 414 is not particularly restricted, but from the viewpoint of heat resistance, toughness during heating and physical strength, it is preferably a stretched film of a polyolefin, polyester, polyamide, etc. Paper may also be used for the first base material film layer 414.

If the second base material film layer 416 (described below) of the outer side laminated film 415 is laminated, then the first base material film layer 414 of the inner side laminated film 411 does not need to be laminated.

(First Adhesive Layer)

The first adhesive layer 418 is a layer that sandwiches the paper layer 420 together with the second adhesive layer 419 (described below), and it serves for integration with the outer side laminated film 415.

The composition of the first adhesive layer 418 includes one or more hot-melt materials that are thermoplastic resins, for example, a polyolefin or polyacrylic acid, a PE-based or PP-based material, etc. The above-described composition is not particularly restricted as long as it can be heat sealed with the second adhesive layer 419, but it is more preferably the same material as the second adhesive layer 419 described below for higher bonding strength.

The thickness of the first adhesive layer 418 is, for example, 5 µm to 100 µm, and particularly preferably 10 µm to 50 µm. If the thickness of the first adhesive layer 418 is less than 5 µm, it will not be possible to obtain sufficient strength when the paper layer 420 and outer side laminated film 415 are attached together, and if the thickness of the first adhesive layer 418 is greater than 100 µm, the processing suitability and machining speed will be poor when the paper layer 420 and outer side laminated film 415 are attached together, etc., or the resin usage amount will increase, which is uneconomical.

(Paper Layer)

The paper layer 420 is an intermediate layer of the laminated sheet 410, being sandwiched between the first adhesive layer 418 and the second adhesive layer 419 described below, and by attaching it to and between the outer side laminated film 415 and the inner side laminated film 411, it imparts strength to the body portion 4100 of the tube-like container.

The material used for the paper layer 420 is not particularly restricted, but Unryu (mulberry) paper may be used for an aesthetic quality, thick kraft paper may be used for rigidity, etc. If the paper layer 420 includes at least 5% cellulose fibers, it can be distinguished from synthetic paper formed by paper-making from resin fibers.

The basis weight of the paper layer 420 is preferably 3 $g/m^2$ to 300 $g/m^2$. If the basis weight of the paper layer 420 is 10 $g/m^2$ to 150 $g/m^2$, it will be easy to handle during the body portion molding processing, etc., and the body portion 4100 will have a good stiff feel when the tube-like container 4300 including the body portion 4100 is used. If the basis weight of the paper layer 420 is less than 3 $g/m^2$, the paper may tear during attachment with the outer side laminated film 415 and inner side laminated film 411, making it impossible to properly carry out molding processing into the body portion 4100. If the basis weight of the paper layer 420 is greater than 300 $g/m^2$, on the other hand, the total thickness of the laminated sheet 410 will increase, making it impossible to properly carry out fusion processing during formation into a tube shape.

(Second Adhesive Layer)

The second adhesive layer 419 is a layer that sandwiches the paper layer 420 together with the first adhesive layer 418 described above, and it serves for integration with the inner side laminated film 411.

The composition of the second adhesive layer 419 includes one or more hot-melt materials that are thermoplastic resins, for example, a polyolefin or polyacrylic acid, a PE-based or PP-based material, etc. The above-described composition is not particularly restricted as long as it can be heat sealed with the first adhesive layer 418, but it is more preferably the same material as the first adhesive layer 418 described above for higher bonding strength.

The thickness of the second adhesive layer 419 is, for example, 5 μm to 100 μm, and particularly preferably 10 μm to 50 μm, similar to the first adhesive layer 418. If the thickness of the second adhesive layer 419 is less than 5 μm, it will not be possible to obtain sufficient strength when the paper layer 420 and inner side laminated film 411 are attached together, and if the thickness of the second adhesive layer 419 is greater than 100 μm, the processing suitability and machining speed will be poor when the paper layer 420 and inner side laminated film 411 are attached together, or the resin usage amount will increase, which is uneconomical.

(Second Base Material Film Layer)

The second base material film layer 416 is the innermost layer of the inner side laminated film 411, and serves mainly to impart toughness. The material used for the second base material film layer 416 is the same as for the first base material film layer 414 described above.

If the first base material film layer 414 (described above) of the inner side laminated film 411 is laminated, then the second base material film layer 416 of the outer side laminated film 415 does not need to be laminated.

(Second Sealant Layer)

The second sealant layer 417 is the outermost layer of the laminated sheet 410 and the outermost layer of the outer side laminated film 415, and it is a thermoplastic resin layer.

The second sealant layer 417 is a layer imparted with heat weldability with the first sealant layer 412, and it serves to protect the paper layer 420.

The second sealant layer 417 is not particularly restricted as long as it is a thermoplastic resin layer, and for example, one or more extruded or liquefied low melting point resins such as polyethylene, polypropylene, polyethylene terephthalate or polymethacrylic acid may be coated. Pattern coating may also be carried out only on the portion that is sealed to shape the laminated sheet 410 into a tube.

The second sealant layer 417 has a thickness of preferably 3 μm to 200 μm and more preferably 8 μm to 30 μm. If the thickness of the second sealant layer 417 is less than 3 μm, sufficient strength for heat sealing with the first sealant layer 412 will not be maintained, and problems such as tearing may occur when the laminated sheet 410 is used in a tube-like container 4300. If the thickness of the second sealant layer 417 is greater than 200 μm, the layer thickness of the laminated sheet 410 will increase, which is not economical.

(Ink Layer)

In FIG. 19, the ink layer 421 is partially laminated only on the outer side laminated film 415 surface side of the paper layer 420, but the location where the ink layer 421 is laminated is not particularly restricted.

The ink layer 421 may also be laminated, for example, on the surface of the second sealant layer 417 opposite to the second base material film layer, the surface of the first base material film layer 414 opposite to the barrier layer 413 or the surface on the barrier layer 413 side, the surface of the second base material film layer 416 on the second sealant layer side or the surface opposite to the second sealant layer 417, etc., in addition to the surface on the outer side laminated film 415 side of the paper layer 420 described above.

The type of ink used in the ink layer 421 is not particularly restricted, but it is preferably selected as appropriate for the printing method and printing substrate. The printing method for the ink layer 421 is not particularly restricted, and any common printing method, for example, such as gravure printing, offset printing, flexographic printing, etc., may be used.

The laminated sheet 410 for each above-described layer may be fabricated in the following manner, for example.

The ink layer 421 is laminated (printed) on a surface on one side of the paper layer 420. The first sealant layer 412, barrier layer 413 and first base material film layer 414 are laminated in that order and dry laminated with a dry laminating adhesive to fabricate the inner side laminated film 411. The second sealant layer 417 is also formed by extruder lamination on a surface on one side of the second base material film layer 416 to fabricate the outer side laminated film 415.

The first adhesive layer 418 is laminated on the surface of the above-described first base material film layer 414 opposite to the barrier layer 413, and the printed paper layer 420 is provided as multiple line stripes, with the printed surface facing upward, on the surface of the first adhesive layer 418 opposite to the first base material film layer 414. The second adhesive layer 419 and the outer side laminated film 415 with the second sealant layer 417 facing upward are laminated in that order on the surface of the paper layer 420 opposite to the first adhesive layer 418. The inner side laminated film 411 and outer side laminated film 415, and the paper layer 420 between them, are attached by extruder lamination by the first adhesive layer 418 and second adhesive layer 419, to complete the laminated sheet 410.

The laminated sheet 410 has a thickness of preferably 30 μm to 300 μm. Such a thickness will help facilitate squeezing of the contents with light force from the tube-like container 4300 using the body portion 4100 of the tube-like container composed of the laminated sheet 410. When squeezing out the contents, the body portion 4100 can be pressed cleanly to the end portion, lowering the curvature radius at the widthwise end portion of the body portion 4100 and helping to suppress residue of the contents.

Figure 20:
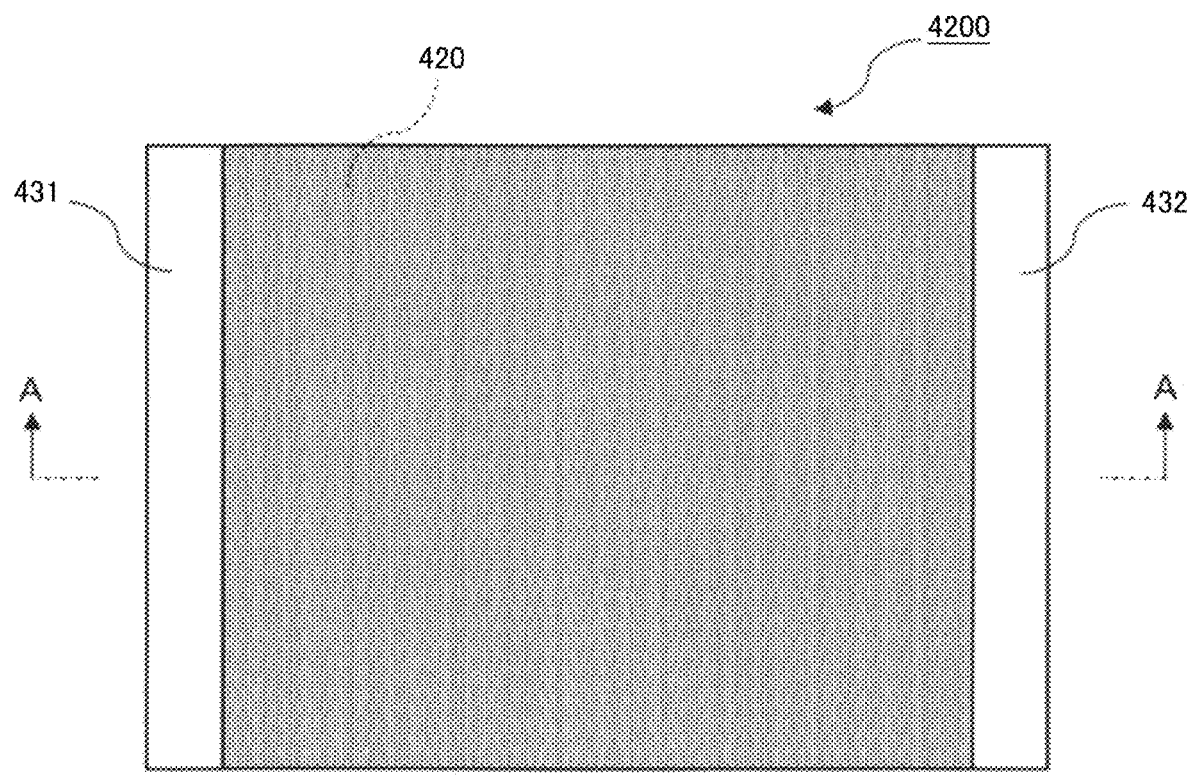
FIG. 20 is a plan view showing a body portion-forming blank to be used in the body portion of a tube-like container according to the fourth embodiment.
Figure 21:
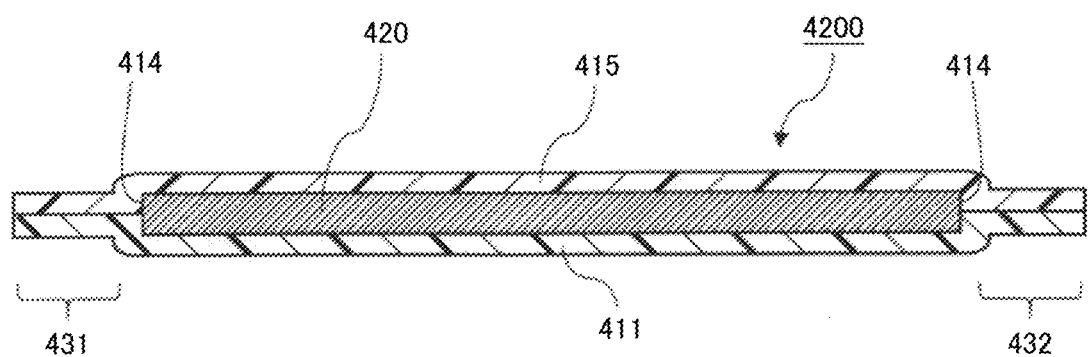
FIG. 21 is an enlarged cross-sectional view on line A-A of FIG. 20.

FIG. 20 is a plan view showing a body portion-forming blank 4200 to be used in the body portion 4100 of a tube-like container according to the fourth embodiment. FIG. 21 is an enlarged cross-sectional view on line A-A of FIG. 20. The body portion-forming blank 4200 is composed of the laminated sheet 410 described above. As viewed in the height direction of the body portion in the plan view, as shown in FIG. 20, the body portion-forming blank 4200 is formed by slitting the laminated sheet 410 having the paper layer 420 laminated in multiple line stripes in the height direction of the body portion, with the paper layer 420 portion at the center so as to form parts 431, 432 of the film alone at both sides where the paper layer 420 is not laminated, and further cutting to a predetermined length in the direction perpendicular to the height direction of the body portion. When the body portion 4100 formed in a tube shape is cylindrical, for example, the height direction of the body portion is the height direction of the cylinder.

As shown in FIG. 20, the body portion-forming blank 4200 to be used in the body portion 4100 of the tube-like container of the fourth embodiment is essentially rectangular, for example. As shown in FIG. 21, an end surface 441 of the paper layer 420 is not exposed at least at both facing end edges of the body portion-forming blank 4200. The paper layer 420 is sandwiched between the inner side laminated film 411 and outer side laminated film 415, and the end surface 441 of the paper layer 420 is protected at both facing end edges of the body portion-forming blank 4200. The inner side laminated film 411, paper layer 420 and outer side laminated film 415 are integrated by the first adhesive layer 418 and second adhesive layer 419 (not shown in FIG. 21) shown in FIG. 19.

Figures 22A, 22B:
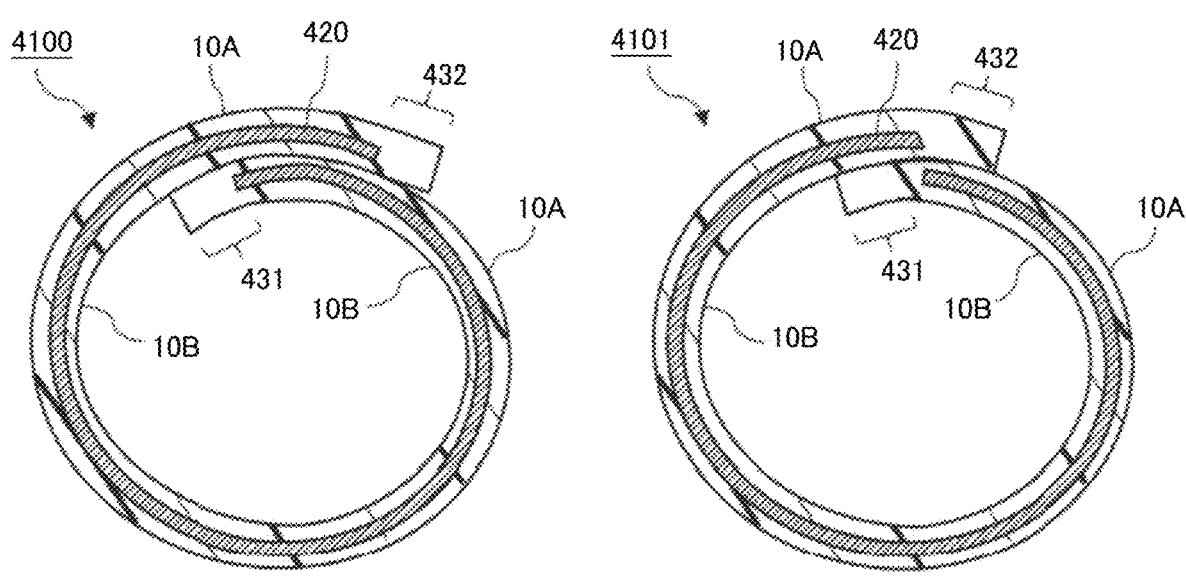
FIG. 22A is an enlarged cross-sectional view perpendicular to the height direction of the body portion of a tube-like container according to the fourth embodiment.
FIG. 22B is an enlarged cross-sectional view perpendicular to the height direction of the body portion of a tube-like container according to a modified example.

FIG. 22A is an enlarged cross-sectional view perpendicular to the height direction of the body portion 4100 of the tube-like container of the fourth embodiment.

As shown in FIG. 22A, both facing end edges of the above-described body portion-forming blank 4200 are overlapped and heat-sealed at an outermost layer surface 410A and innermost layer surface 410B made of thermoplastic resins, thus forming a tube shape and completing the body portion 4100 of the tube-like container. That is, both facing end edges of the body portion-forming blank 4200 are overlapped and heat-sealed together so that one end edge is on the inner side of the body portion 4100 of the tube-like container and the other end edge is on the outer side of the body portion 4100 of the tube-like container, resulting in a so-called "envelope-like sealing" form.

In the body portion 4100 of the tube-like container of the fourth embodiment illustrated in FIG. 22A, when both facing end edges of the body portion-forming blank 4200 are overlapped, the portions where the paper layer 420 is laminated are wrapped until they overlap, and then heat-sealed together. For example, it is wrapped on a mandrel or plate until the portions where the paper layer 420 is laminated overlap, so that both facing end edges of the body portion-forming blank 4200 overlap, after which a heat seal bar or hot plate is contacted from one or both surfaces to heat seal together both facing end edges of the body portion-forming blank 4200. Alternatively, for example, while one or both end edges of the body portion-forming blank 4200 are heated for melting of the surface resin, the body portion-forming blank 4200 may be sealed by wrapping it over until the portions laminated with the paper layer 420 overlap, and cooling it.

The method for forming the body portion-forming blank 4200 into a tube shape as described above may be a method of overlapping the innermost layer and outermost layer at both facing end edges of the body portion-forming blank 4200 and heat sealing them, using a common tubing machine, bag making machine, pillow stick packaging machine, etc. When a bag making machine is used, for example, the method may include folding the stripe-slit laminated sheet 410 into a tube shape in the direction perpendicular to the height direction of the body portion using a sheet-folding guide, overlapping the innermost layer and outermost layer at both end edges of the laminated sheet 410, and heat sealing with a heat seal bar from above the overlapping portions.

<Body Portion of Tube-Like Container of Modified Example>

A body portion 4101 of a tube-like container according to a modified example is formed of a body portion-forming blank 4200 similar to the body portion-forming blank 4200 forming the body portion 4100 of the tube-like container of the first embodiment, but differs in the construction of the heat-sealed portion formed in the tube shape.

FIG. 22B is an enlarged cross-sectional view perpendicular to the height direction of the body portion 4101 of a tube-like container according to a modified example.

Similar to the body portion 4100 of the tube-like container of the fourth embodiment illustrated in FIG. 22A, both facing end edges of the body portion-forming blank 4200 are overlapped and heat-sealed at the outermost layer surface 410A and innermost layer surface 410B made of thermoplastic resins, thus forming a tube shape and completing the body portion 4101 of the tube-like container. That is, both facing end edges of the body portion-forming blank 4200 are overlapped and heat-sealed together so that one end edge is on the inner side of the body portion 4101 of the tube-like container and the other end edge is on the outer side of the body portion 4101 of the tube-like container.

Unlike the body portion 4100 of the tube-like container of the fourth embodiment, however, the body portion 4101 of the tube-like container of the modified example illustrated in FIG. 22B is wrapped and heat-sealed up to the location just before the portions where the paper layer 420 is laminated overlap, when both facing end edges of the body portion-forming blank 4200 are overlapped. For example, it is wrapped on a mandrel or plate up to the location just before the portions where the paper layer 420 is laminated overlap, so that both facing end edges of the body portion-forming blank 4200 overlap, after which a heat seal bar or hot plate is contacted from one or both surfaces to heat seal together both facing end edges of the body portion-forming blank 4200. Alternatively, for example, while one or both end edges of the body portion-forming blank 4200 are heated for melting of the surface resin, the body portion-forming blank 4200 may be sealed by wrapping it over to a location just before the portions laminated with the paper layer 420 overlap, and cooling it.

When the laminated sheet 410 is wrapped and heat sealed while the parts 431, 432 of the film alone where the paper layer 420 is not laminated are overlapping, the paper layer 420 is not formed at part of the entire perimeter of the cross-section perpendicular to the height direction of the body portion, which is undesirable from the viewpoint of protecting the contents. Therefore, as shown in FIG. 22A and FIG. 22B, the paper layer 420 is preferably provided over the entire perimeter of the cross-section perpendicular to the height direction of the body portion.

The method for forming the body portion-forming blank 4200 into a tube shape in the body portion 4101 of the tube-like container of the modified example may be a method of overlapping the innermost layer and outermost layer at both facing end edges of the body portion-forming blank 4200 and heat sealing them, using a common tubing machine, bag making machine, pillow stick packaging machine, etc., similar to the body portion 4100 of the tube-like container of the fourth embodiment. When a bag making machine is used, for example, the method may include folding the stripe-slit laminated sheet 410 into a tube shape in the direction perpendicular to the height direction of the body portion using a sheet-folding guide, overlapping the innermost layer and outermost layer at both end edges of the laminated sheet 410, and heat sealing with a heat seal bar from above the overlapping portions.

<Example of Tube-Like Container Using Body Portion of Tube-Like Container According to Fourth Embodiment>

FIG. 23A is a front view of a first example of a tube-like container using the body portion 4100 of the tube-like container of the fourth embodiment. FIG. 23B is a side view of the first example of a tube-like container using the body portion 4100 of the tube-like container of the fourth embodiment.

The tube-like container 4300 includes the body portion 4100 of the tube-like container described above and a spout portion 450. The body portion 4100 of the tube-like container is closed at one end, with the spout portion 450 mounted at the other end of the body portion 4100. Also, the tube-like container 4300 further includes a hinge cap (not shown) mounted on the spout portion 450, as one example. In FIGS. 23A and 23B, the spout portion 450 is shown without the hinge cap (not shown) for convenience.

The body portion 4100 of the tube-like container is closed at a bottom portion 462 at one end, and contents (not shown) are housed in it. As one example, the body portion is formed by first forming the body portion-forming blank 4200 made of the laminated sheet 410 described above into a tube shape, and then bonding together the bottom portion 462 and the end edge portions of the laminated sheet 410 which are the end edges along the height direction of the body portion. The method of bonding together the laminated sheets 410 at the bottom portion 462 is not particularly restricted, and for example, a method of providing an adhesive layer containing polyethylene between the innermost layers of the facing laminated sheets 410 and heat welding them together may be used. The method of bonding the laminated sheets 410 in the body portion 4100 of the tube-like container may be the same method described above used to form a tube shape for the body portion 4100 of the tube-like container of the fourth embodiment illustrated in FIGS. 22A and 22B. The contents therefore do not contact with the end surface 441 of the paper layer 420 at the sealed portion of the body portion and bottom portion 462 used to form the tube shape for the body portion 4100.

Figure 24:
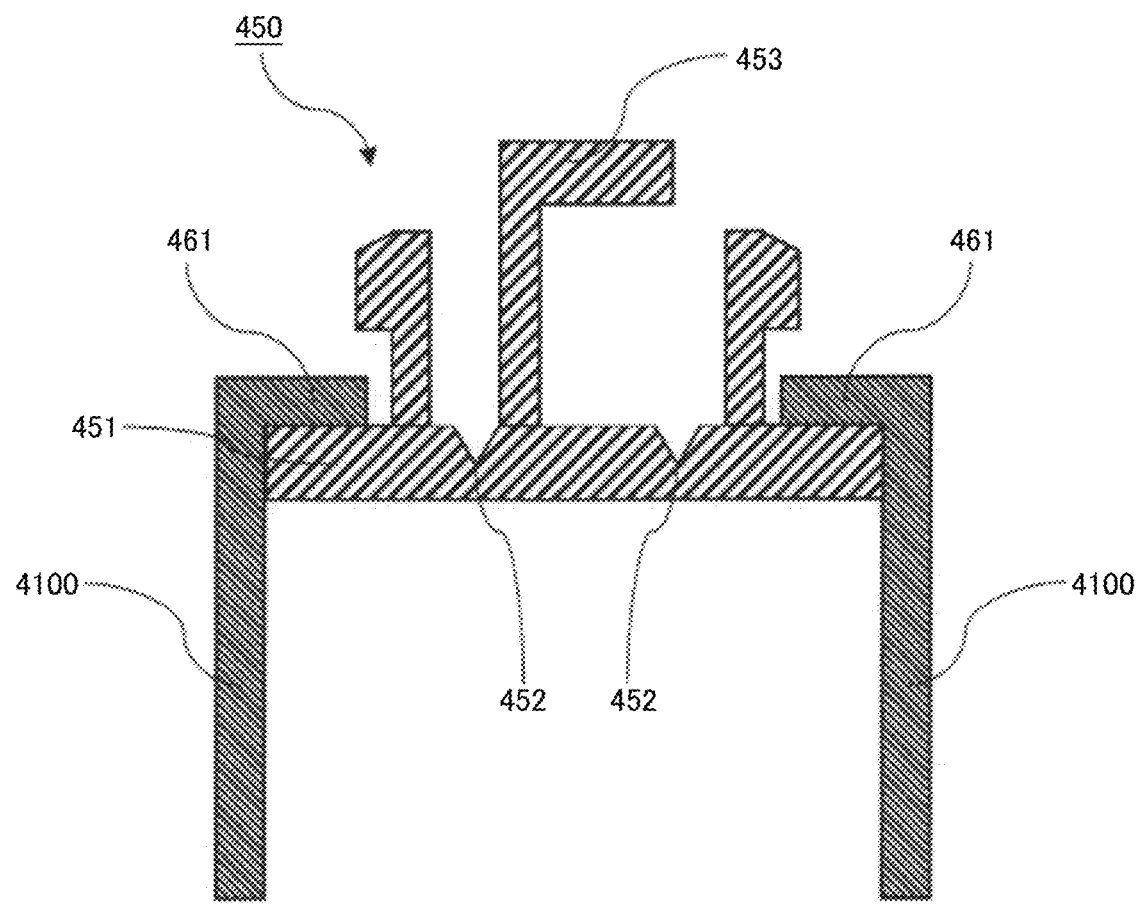
FIG. 24 is an enlarged cross-sectional view along line B-B near the spout portion of FIG. 23B.

FIG. 24 is an enlarged cross-sectional view along line B-B near the spout portion 450 of FIGS. 23A and 23B. The spout portion 450 is mounted at a top portion 461 situated at the other end of the body portion 4100 of the tube-like container, as a member allowing the top portion 461 of the body portion 4100 of the tube-like container to be closed. The spout portion 450 includes a flat closed portion 451 perpendicular to the height direction of the body portion 4100 of the tube-like container. In FIGS. 23A, 23B and 24, the height direction of the body portion refers to the axis line direction of the body portion 4100 that connects the bottom portion 462 located at one end of the body portion 4100 with the spout portion 450 mounted at the other end of the body portion 4100.

The closed portion 451 may have a disc shape as one example, but the shape is not limited as long as it is flat, and may be elliptical, oblong, polygonal, etc. The material of the spout portion 450 is also not particularly restricted, and a resin material such as low-density polyethylene may be suitably used. By using a material with a barrier function for the spout portion 450 as well as for the body portion 4100, it is possible to improve the barrier function of the tube-like container 4300 as a whole and to further protect the quality of the contents. A spout portion 450 having the closed portion 451 formed flat can reduce the amount of material used compared to a conventional spout portion 450 formed in a tapered manner.

The closed portion 451 has a toric half-cut 452 at approximately the center, as one example, and a pull ring 453 inside the half-cut 452. If the closed portion 451 includes a half-cut 452 and a pull ring 453, then the user of the tube-like container 4300 can form an opening for drawing out the contents of the closed portion 451 by pulling the pull ring 453 to remove part of the closed portion 451 along the half-cut 452. An opening for drawing out the contents of the closed portion 451 may also be formed in advance, without providing a half-cut 452 and pull ring 453.

The top portion 461 of the body portion 4100 of the tube-like container is mounted on the surface of the body portion 4100 of the tube-like container of the spout portion 450 opposite to the bottom portion 462 side, at the peripheral portion of the spout portion 450. In FIG. 24, the top portion 461 of the body portion 4100 of the tube-like container is bonded to the surface of the body portion 4100 of the tube-like container of the closed portion 451 opposite to the bottom portion 462 side, at the end edges (peripheral portion) of the closed portion 451. Therefore, the contents do not contact with the end surface 441 of the paper layer 420 at the mounting parts for the sealed portion of the body portion for formation of the tubular body portion 4100, or at the bottom portion 462 and spout portion 450, and the end surface 441 of the paper layer 420 does not contact with the contents throughout the entire tube-like container 4300 that uses the body portion 4100.

The method of bonding the body portion 4100 of the tube-like container and the closed portion 451 is not particularly restricted, and for example, a method of providing a second sealant layer containing polyethylene on the innermost layer of the laminated sheet 410, forming the spout portion 450 of a material containing polyethylene and heat welding them, may be used.

The hinge cap (not shown) is a member mounted on the spout portion 450 which allows the opening formed in the spout portion 450 to be closed and opened.

The manner of opening and closing the opening formed in the spout portion 450 is not limited to a hinge cap, and for example, it may be in the form of including a cylindrical portion with an external screw provided in the spout portion 450 and a cap with an internal screw that can be fitted around the external screw.

In the tube-like container 4300, the spout portion 450 is provided with a flat closed portion 451 that is perpendicular to the height direction of the body portion 4100 of the tube-like container, while the top portion 461 of the body portion 4100 of the tube-like container is bonded to the surface of the body portion 4100 of the tube-like container of the closed portion 451 opposite to the bottom portion 462 side, at the end edge of the closed portion 451. Therefore, by folding the body portion 4100 at the end edge of the closed portion 451 with fingers, etc., trace contents remaining in the body portion 4100 can be extruded toward the area near the opening of the spout portion 450 by pinching the residue content between the flat surface on the inner side of the closed portion 451 and the inner surface of the body portion 4100.

Moreover, since the closed portion 451 of the spout portion 450 is flat, there is no space where residue of the contents can remain on the inner side, unlike with a conventional tapered spout portion 450. The contents extruded toward the area near the opening of the spout portion 450 can therefore be squeezed out from the opening without leaving the contents inside the body portion 4100 and spout portion 450. It is thus possible to suppress residue of the contents in the container.

As described above, it is possible to suppress residue of the contents in the tube-like container 4300 by squeezing out the contents while folding the body portion 4100. The body portion is therefore preferably formed of a laminated sheet 410 with low rigidity (weak stiffness), allowing the body portion to be easily folded.

As described above, if the thickness of the laminated sheet 410 forming the body portion 4100 of the tube-like container is 30 μm to 300 μm, it will be possible to aid squeezing of the contents with light force and thus suppress residue of contents in the tube-like container 4300 using the body portion 4100 of the tube-like container composed of the laminated sheet 410. The body portion 4100 of the tube-like container can also be easily folded.

If the above-described hinge cap is provided as the cap, then it will be possible to reduce stiffness against twisting which is required for the body portion that is gripped by hand when opening, compared to providing a cap that opens by rotatable screw fitting with the closed portion 451, thus preferably making it easier to adopt a laminated sheet 410 with low rigidity.

Fifth Embodiment

In the case of tube containers where resin and paper are used for the body part, it is preferable that the film and the paper can be separated at the time of disposal from a standpoint of reuse of resources. However, in conventionally considered tube containers where paper is used as a part of the material constituting the body part, it is impossible to separate the film and the paper.

The present embodiment provides a tube container where the film and the paper constituting the body part can be separated.

The tube container according to the present embodiment is provided with: a tubular body part configured similarly to the tube container according to the third embodiment shown in FIGS. 11 and 12; and a spout part attached to the body part. However, the sheet constituting the body part is different from the sheet constituting the body part according to the third embodiment.

Figure 30A:
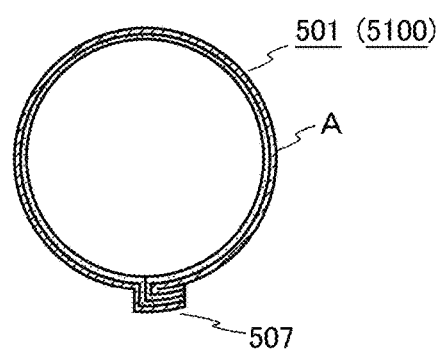
FIG. 30A is a transverse cross-sectional view of the body part of the tube container.
Figure 30B:
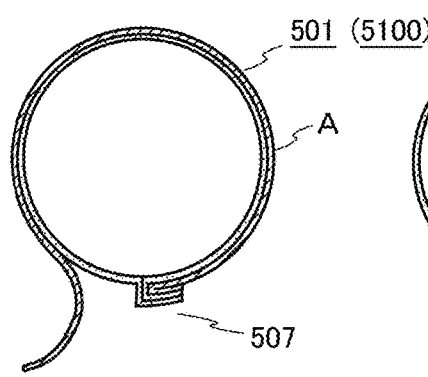
FIG. 30B is a transverse cross-sectional view of the body part of the tube container.
Figure 30C:
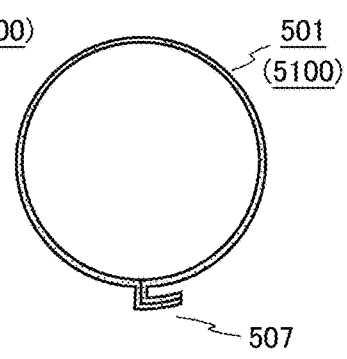
FIG. 30C is a transverse cross-sectional view of the body part of the tube container.

FIGS. 25 to 29 are cross-sectional views showing an example of the sheet constituting the body part of the tube container, and FIGS. 30A to 30C are transverse cross-sectional views of the body part of the tube container.

The body part of the tube container is formed of a sheet 541. The sheet 541 is a multilayer sheet where the base film layer 133, the barrier layer 134 and the sealant layer 135 are laminated in this order on one surface side of the paper layer 132, the paper protection layer 137 is laminated on the other surface side of the paper layer 132, and the ink layer 138 and the overcoat varnish layer 139 are further laminated on the paper protection layer 137. An adhesive for bonding the layers may be used between the layers.

The paper layer 132 and the base film layer 133 have an easy-to-peel property therebetween. That is, the peeling strength between the paper layer 132 and the base film layer 133 are designed to be weaker than that between the other layers, and the paper layer 132 and the base film layer 133 can be peeled off from each other. By peeling the paper layer 132 and the base film layer 133 off from each other, the paper layer 132 and the layers laminated on the paper layer 132 (in FIGS. 25 to 29, the paper protection layer 137, the ink layer 138, and the overcoat varnish layer 139) can be separated from the sheet 541. The peeling strength between the paper layer 132 and the base film layer 133 is not less than 0.5 N/15 mm and not more than 10 N/15 mm, and is more preferably not less than 1 N/15 mm and not more than 3 N/15 mm. When the peeling strength is less than 0.5 N/15 mm, the bonding strength is weak, so that the paper layer 132 can peel accidentally while the tube container 5100 is in use. When it exceeds 10 N/15 mm, the peeling strength is strong, so that the paper layer 132 and the base film layer 133 are difficult to separate.

To the paper layer 132, the base film layer 133, the barrier layer 134, the sealant layer 135, the paper protection layer 137, the ink layer 138 and the overcoat varnish layer 139, the configurations of the layers described in the first embodiment are applicable. The total thickness of the sheet 541 constituting the body part and the content ratio of the paper (pulp fiber) may be set within ranges similar to those of the first embodiment. One or more layers other than the paper layer 132 and the sealant layer 135 may be omitted from the sheet 541.

In the present embodiment, the basis weight of the paper used for the paper layer 132 is 30 to 300 g/m², and is preferably 50 to 170 g/m². The sealant layer 135 in the present embodiment is a layer provided for the welding of a bonded part 507, and the spout part and the body part. In the present embodiment, the thickness of the paper protection layer 137 is preferably 0.2 to 50 μm, and is more preferably 0.5 to 20 μm.

Figure 25:
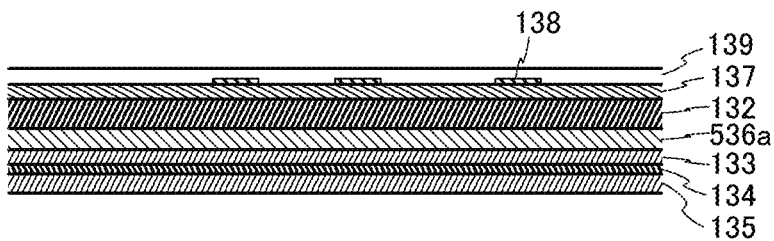
FIG. 25 is a cross-sectional view showing an example of a sheet constituting the body part of the tube container.

Next, a method of providing an easy-to-peel property between the paper layer 132 and the base film layer 133 will be described. As an example of the provision of an easy-to-peel property, a method is available in which, as shown in FIG. 25, an easy-to-peel layer 536a is laminated between the paper layer 132 and the base film layer 133. The easy-to-peel layer 536a is a layer containing, for example, an easy-to-peel material or a pseudo-adhesive, and is provided to weaken the peeling strength between the paper layer 132 and the base film layer 133. A case where an easy-to-peel material or a pseudo-adhesive are used as the easy-to-peel layer 536a will be described in the following:

(Method Using an EP Material)

As the easy-to-peel layer 536a laminated between the paper layer 132 and the base film layer 133, an EP layer formed of an easy-to-peel (EP) material is laminated. By using an EP material the peeling strength of which is not less than 0.5 N/15 mm and not more than 10 N/15 mm, the peeling strength between the paper layer 132 and the base film layer 133 can be made not less than 0.5 N/15 mm and not more than 10 N/15 mm, so that the paper layer 132 and the base film layer 133 can be peeled off from each other. The peeling strength between the paper layer 132 and the base film layer 133 is substantially equal to that of the EP material. For this reason, the peeling strength between the paper layer 132 and the base film layer 133 can be suitably set by adjusting the peeling strength of the EP material. Examples of the EP material include a hot-melt material using an easy-to-peel film or having a weak cohesive force.

(Method Using a Pseudo-Adhesive)

In bonding the paper layer 132 and the base film layer 133, a false adhesive such as a pressure sensitive adhesive or a re-peelable adhesive is used. At this time, the applied pseudo-adhesive corresponds to the easy-to-peel layer 536a. The materials and application amount of these pseudo-adhesives are appropriately selected and adjusted so that the peeling strength between the paper layer 132 and the base film layer 133 is not less than 0.5 N/15 mm and not more than 10 N/15 mm. Thereby, the peeling strength between the paper layer 132 and the base film layer 133 can be suitably set, so that the paper layer 132 and the base film layer 133 can be peeled off from each other.

Figure 26:
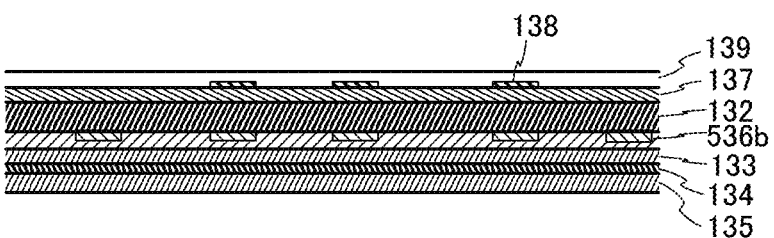
FIG. 26 is a cross-sectional view showing an example of the sheet constituting the body part of the tube container.
Figure 27:
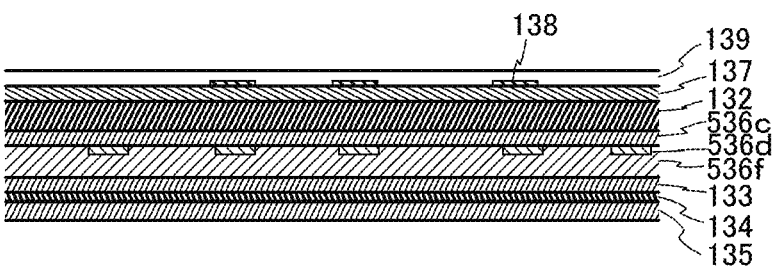
FIG. 27 is a cross-sectional view showing an example of the sheet constituting the body part of the tube container.
Figure 28:
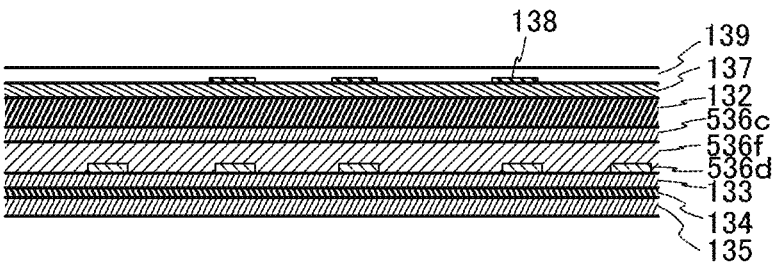
FIG. 28 is a cross-sectional view showing an example of the sheet constituting the body part of the tube container.
Figure 29:
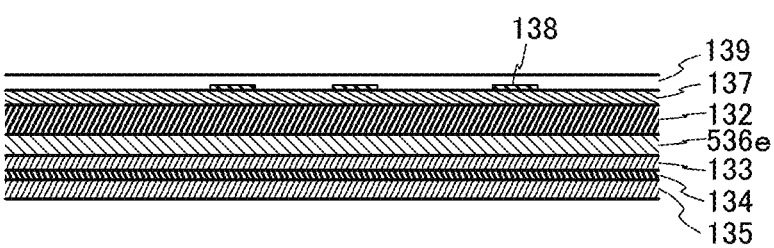
FIG. 29 is a cross-sectional view showing an example of the sheet constituting the body part of the tube container.

As another method of providing an easy-to-peel property between the paper layer 132 and the base film layer 133, for example, a method is available in which, as shown in FIGS. 26 to 28, the peeling strength between the paper layer 132 and the base film layer 133 is weakened by performing pattern coating with a peelable varnish or an easily adherent varnish between the paper layer 132 and the base film layer 133. A case in which pattern coating with a peelable varnish or an easy-to-adhere varnish is performed will be described below.

(Method in which Pattern Coating with a Peelable Varnish is Performed)

As shown in FIG. 26, at least one of the base film layer 133 side surface of the paper layer 132 and the paper layer 132 side surface of the base film layer 133 is pattern-coated with a varnish having peelability (peelable varnish) 536b, and the paper layer 132 and the base film layer 133 are bonded with an adhesive. The application amount and application pattern of the peelable varnish 536b is appropriately adjusted so that the peeling strength between the paper layer 132 and the base film layer 133 is not less than 0.5 N/15 mm and not more than 10 N/15 mm. Thereby, the peeling strength between the paper layer 132 and the base film layer 133 can be suitably set, so that the paper layer 132 and the base film layer 133 can be peeled off from each other. In laminating the base film layer 133 and the paper layer 132, extrusion with a thermoplastic resin firmly adhering to the base film layer 133 and the paper layer 132 and not firmly adhering to the peelable varnish may be performed.

(Method in which Pattern Coating with an Easy-to-Peel Varnish is Performed)

As shown in FIGS. 27 and 28, a film layer 536c formed of the same material as the base film layer 133 is laminated on the base film layer 133 side surface of the paper layer 132, and at least one of the paper layer 132 side surface of the base film layer 133 and the base film layer 133 side surface of the film layer 536c is pattern-coated with a varnish having an easy-to-adhere property (easy-to-adhere varnish) 536d. Further, a resin layer 536f is laminated adjacent to the easy-to-adhere varnish 536d. The resin layer 536f is formed of a material having a property of being firmly welded to the easy-to-adhere varnish 536d and not being welded to the base film layer 133 (film layer 536c) and whose peeling strength with the base film layer 133 (film layer 536c) is not less than 0.5 N/15 mm and not more than 10 N/15 mm. Thereby, the paper layer 132 and the base film layer 133 can be peeled off from each other by the film layer 536c and the resin layer 536f or the resin layer 536f and the base film layer 133 being peeled off from each other. The peeling strength between the paper layer 132 and the base film layer 133 is substantially equal to that between the resin layer 536f and the base film layer 133 (film layer 536c). For this reason, the peeling strength between the paper layer 132 and the base film layer 133 can be suitably set by appropriately selecting the materials of the resin layer 536f and the base film layer 133 (film layer 536c).

As another method of providing an easy-to-peel property between the paper layer 132 and the base film layer 133, for example, a method using paper having a specific property for the base film layer 133 is available. In this case, for the bonding between the paper layer 132 and the base film layer 133, a common adhesive 536e as is also used for the bonding between other layers may be used. A case where paper having a specific property is used for the paper layer 132 will be described below by using FIG. 29.

(Method in which Adjustment is Made with Surface Smoothness of the Paper Layer)

As the paper layer 132, paper is used the surface smoothness of which is 20 to 300 seconds in Bekk smoothness defined in JIS P 8119. Since the surface of the paper layer 132 having the smoothness has minute irregularities and the paper layer 132 and the base film layer 133 or the adhesive 536e applied onto the base film layer 133 are in contact at points, the contact area is small, so that the peeling strength is weak. By thus using paper with a surface smoothness of 20 to 300 seconds, the peeling strength between the paper layer 132 and the base film layer 133 can be made not less than 0.5 N/15 mm and not more than 10 N/15 mm, so that the paper layer 132 and the base film layer 133 can be peeled off from each other. Examples of the adhesive 536e used for bonding the paper layer 132 and the base film layer 133 include polyolefin-based resin, and the thickness is preferably not less than 5 µm and not more than 100 µm, and is more preferably not less than 10 µm and not more than 50 µm. When the thickness is less than 10 µm, the peeling strength between the paper layer 132 and the base film layer 133 is weak, and when the thickness exceeds 100 µm, the peeling strength is so strong that the easy-to-peel property is lost. As described above, the peeling strength between the paper layer 132 and the base film layer 133 can be suitably set by adjusting the surface smoothness of the paper and the material and thickness of the adhesive.

The above-described methods of providing an easy-to-peel property between the paper layer 132 and the base film layer 133 are merely examples, and the present invention is not limited to the above-described methods as long as the peeling strength between the paper layer 132 and the base film layer 133 is not less than 0.5 N/15 mm and not more than 10 N/15 mm. Moreover, the peeling strength between the paper layer 132 and the base film layer 133 may be adjusted by appropriately combining the above-described methods.

Using FIGS. 30A-30C, a method of separating the paper layer 132 from the body part 501 of the tube container 5100 will be described. In FIG. 30, A represents the paper layer 132 and a layer laminated on the paper layer 132 which layers constitute the layer to be separated from the body part 501. FIG. 30A shows a condition before separation. From this condition, the paper layer 132 is peeled from the body part 501 with the bonded part 507 as the starting point (FIG. 30B), peeling is continued under this condition along the outer periphery of the film of the body part 501, and eventually, the paper layer 132 and the layer laminated on the paper layer 132 are separated from the body part 501 (FIG. 30C). A notch may be formed on a part of the bonded part 507. The formation of a notch becomes a springboard for the separation between the paper layer 132 and the base film layer 133, which makes the peeling between the paper layer 132 and the base film layer 133 easier. The notch may be provided on only the paper layer 132 and the layer laminated on the paper layer 132, or may be provided on all the layers constituting the sheet 541.

As described above, in the present embodiment, since the peeling strength between the paper layer 132 and the base film layer 133 is not less than 0.5 N/15 mm and not more than 10 N/15 mm, the paper layer 132 can be separated from the body part 501 with the bonded part 507 as the starting point, and the paper layer 132 is never peeled off accidentally while the tube container 5100 is in use. Consequently, according to the present embodiment, the tube container 5100 can be provided where the film and the paper constituting the body part 501 can be separated from each other.

Moreover, if the peeling strength between the paper layer 132 and the base film layer 133 is not less than 1 N/15 mm and not more than 3 N/15 mm, the paper layer 132 can be more easily separated from the body part 501.

The tube container according to the present embodiment is as follows:

[1] A tube container provided with:
  a tubular body part formed of a sheet with a thickness of not less than 30 µm and not more than 300 µm having a paper layer, a base film layer and a sealant layer in this order and being closed at one end; and
  a spout part attached to the other end of the body part, wherein the peeling strength when the paper layer and the base film layer are peeled off from each other is not less than 0.5 N/15 mm and not more than 10 N/15 mm.

[2] The tube container according to item [1], wherein the peeling strength is not less than 1 N/15 mm and not more than 3 N/15 mm.

[3] The tube container according to item [1] or [2], wherein an easy-to-peel material is laminated between the paper layer and the base film layer.

[4] The tube container according to item [1] or [2], wherein at least one of the base film layer side surface of the paper layer and the paper layer side surface of the base film layer is pattern-coated with a varnish having peelability.

[5] The tube container according to item [1] or [2], wherein a film layer formed of the same material as that of the base film layer is laminated on the base film layer side surface of the paper layer,
- at least one of the paper layer side surface of the base film layer and the base film layer side surface of the film layer is pattern-coated with a varnish having an easy-to-adhere property, and
- a resin layer having a property of being firmly welded to the varnish having the easy-to-adhere property and not being welded to the base film layer is laminated in a position in contact with the varnish having the easy-to-adhere property.

[6] The tube container according to item [1] or [2], wherein the paper layer and the base film layer are bonded with a pressure sensitive adhesive or a re-peelable adhesive.

[7] The tube container according to item [1] or [2], wherein the Bekk smoothness of the surface of the paper layer is not less than 20 seconds and not more than 300 seconds.

[8] The tube container according to any of items [1] to [7], wherein the mass of the paper layer remaining on the base film layer side after the peeling between the paper layer and the base film layer, with respect to the mass of the paper layer is not more than 5%, or the mass of the base film layer remaining on the paper layer side after the peeling between the paper layer and the base film layer, with respect to the mass of the base film layer is not more than 5%.

Sixth Embodiment

The body part of the tube container is formed by shaping the sheet constituting the body part, into a tube and bonding both ends together. Available methods of bonding the sheet include: butt-seam sealing where the inner surface of the sheet is bonded together and welded; stick and tape sealing where a stuck part in which both ends of the sheet are stuck together is sealed with a tape material; and envelope tape sealing where the inner and outer surfaces of the sheet are placed one on another and sealed with a tape material. However, with the butt-seam sealing, since the bonded part protrudes from the body part, the bonded part touches the hand while in use, which deteriorates handleability.

When handleability is considered, stick and tape sealing and envelope tape sealing where sealing is performed with a tape material are desirable because the protrusion of the bonded part from the body part is small compared with butt-seam sealing. In addition to the resin layer weldable to the body part, the tape material for bonding the body part is provided with a barrier layer for securing a barrier property of the bonded part. When the tape material has a multilayer configuration as described above, there is a possibility that the adhesive provided between the layers is exposed from the end part of the tape material and the adhesive elutes to the contents side. In addition, since the interface between the layers of the tape material is exposed, interlayer peeling of the tape material constituting the body part can occur.

The present embodiment provides a tube container excellent in handleability and capable of suppressing the elution of the adhesive from the end part of the tape material and the interlayer peeling of the tape layer.

Figure 31:
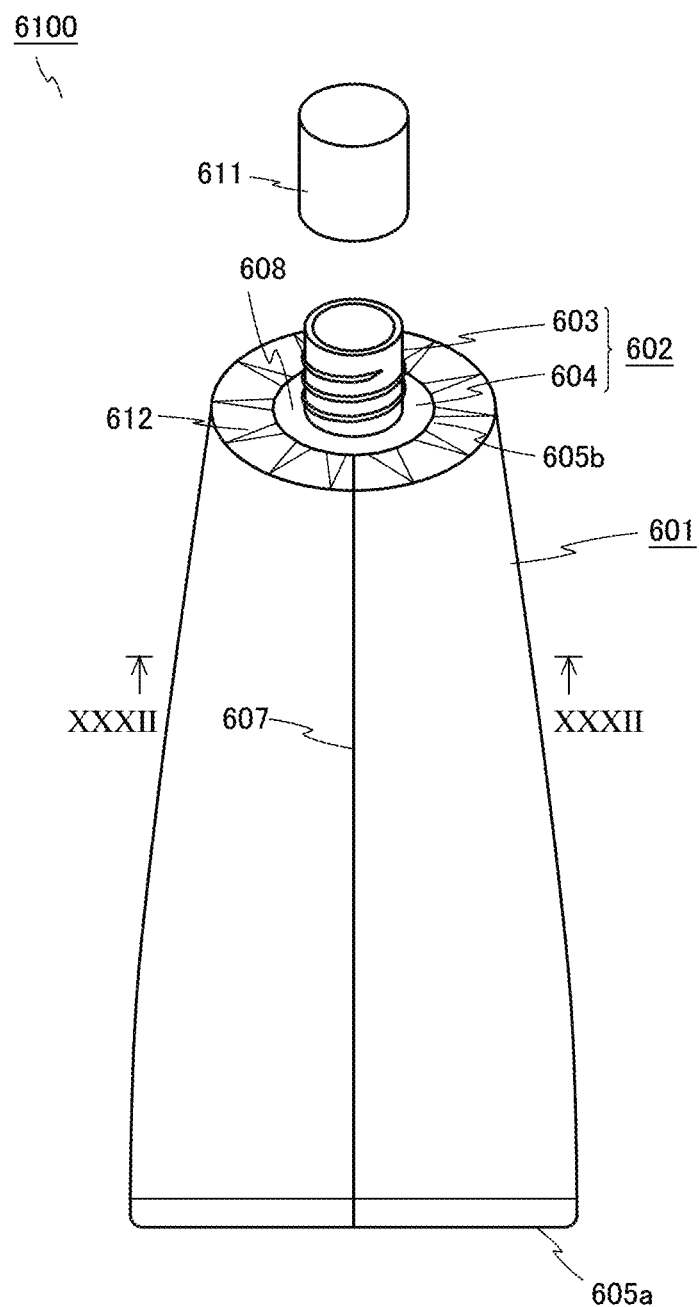
FIG. 31 is a front view showing a general structure of a tube container according to a sixth embodiment.

FIG. 31 is a front view showing a general structure of the tube container according to the embodiment, FIGS. 32A and 32B are end surface views along line XXXII-XXXII shown in FIG. 31, and FIG. 33 is a cross-sectional view showing an example of the sheet constituting the body part of the tube container.

The tube container 6100 is provided with a tubular body part 601 and a spout part 602 attached to the body part 601.

The body part 601 is a member for accommodating the contents, and is formed by shaping, into a tube, a sheet 641 having a pair of opposing end edges substantially parallel to each other. As the method of bonding both ends of the sheet 641 together, the following are used: stick and tape sealing where as shown in FIG. 32A, a stuck part in which both ends of the sheet 641 are stuck together is sealed with a tape material 620 from the inner surface of the sheet 641; and envelope tape sealing where as shown in FIG. 32B, the inner and outer surfaces of the sheet 641 are bonded together with the tape material 620 from the inner surface of the sheet 641. One end part 605a of the body part 601 (lower end in FIG. 31) is closed by being sealed. On the other hand, a part near the other end part 605b of the body part 601 (upper end in FIG. 31) is sealed to an outer surface 608 of a flange part 604 described later, in a state of being folded. In the part where the body part 601 and the flange part 604 are welded, more than one pleat 612 formed by folding the sheet 641 constituting the body part 601 is formed. On the body part 601, a bonded part 607 (back bonded part) is formed. The vertical length of the body part 601 in FIG. 31 may be, for example, 50 to 250 mm.

The sheet 641 constituting the body part 601 of the tube container 6100 is a multilayer sheet where as shown in FIG. 33, the base film layer 133, the barrier layer 134 and the sealant layer 135 are laminated in this order on one surface side of the paper layer 132 and the paper protection layer 137 is laminated on the other surface side of the paper layer 132.

To the paper layer 132, the base film layer 133, the barrier layer 134, the sealant layer 135 and the paper protection layer 137, the configurations of the layers described in the first embodiment are applicable. The total thickness of the sheet 641 constituting the body part 601 and the content ratio of paper (pulp fiber) may be set within ranges similar to those of the first embodiment. One or more layers other than the paper layer 132 and the sealant layer 135 may be omitted from the sheet 541.

In the present embodiment, the basis weight of the paper used for the paper layer 132 is preferably 50 to 200 g/m$^2$, and is more preferably 70 to 150 g/m$^2$. For the barrier layer 134, for example, GL-RD (manufactured by Toppan Inc.) which is a bather film may be used. For the base film layer 133, for example, ONBC (manufactured by Unitika Ltd.) may be used. The sealant layer 135 in the present embodiment is a layer provided for the welding between the tape material 620 and the body part 601 and the welding between the spout part 602 and the body part 601 in the bonded part 607. In the present embodiment, the thickness of the paper protection layer 137 is preferably 0.2 to 50 μm, and is more preferably 0.5 to 20 μm. An ink layer may be provided between the paper layer 132 and the paper protection layer 137. Moreover, the order of lamination of the paper protection layer 137 and the ink layer may be reverse. In this case, in order to provide abrasion resistance and the like, the overcoat varnish layer described in the first embodiment may be laminated on the ink layer. Further, an adhesive to bond the layers may be used between the layers.

Figure 34:
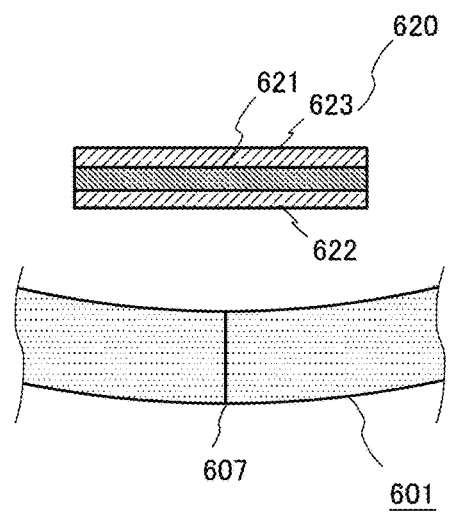
FIG. 34 is a view explaining a condition before the tape material is bonded to the body part.
Figure 35:
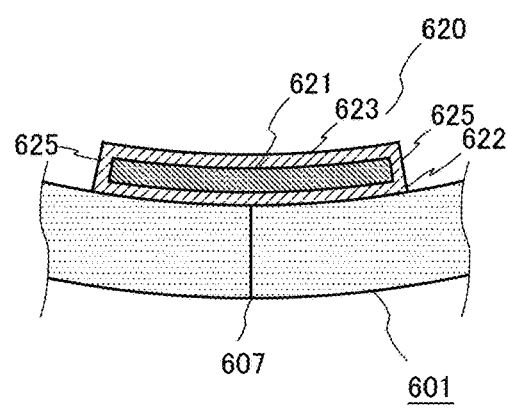
FIG. 35 is a view explaining a condition before the tape material is bonded to the body part.
Figure 36:
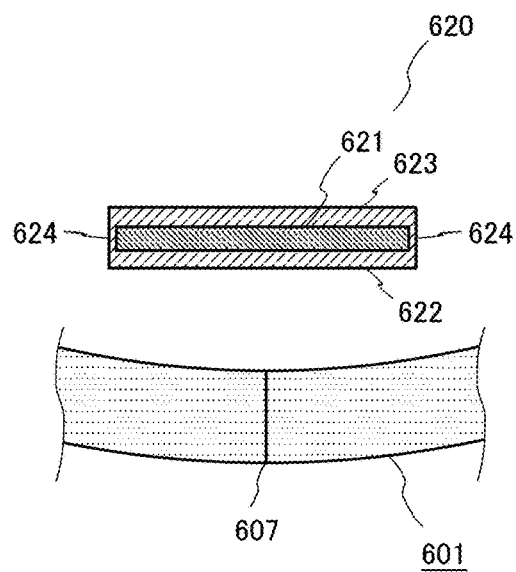
FIG. 36 is a view explaining a condition after the tape material is bonded to the body part.

Using FIGS. 34 to 36, the bonding of both ends of the sheet 641 by using the tape material 620 will be described. FIGS. 34 and 35 are views explaining the condition before the tape material is bonded to the body part, and FIG. 36 is a view explaining the condition after the tape material is bonded to the body part.

The tape material 620 is provided with a first resin layer 621, a second resin layer 622 and a base material 623. The body part 601 can be formed by welding the tape material 620 to the sealant layer 135 so as to include the pair of end edges of the sheet 641 and/or the neighborhood thereof. The base material 623 has a belt-like shape, one surface of the base material 623 is covered with the first resin layer 621, and the other surface thereof is covered with the second resin layer 622. When the tape material 620 is welded to the body part 601, it is the first resin layer 621 that is laminated on the body part 601 side of the base material 623 and it is the second resin layer 622 that is laminated on the opposite side of the body part 601.

The first resin layer 621 is a layer weldable to the sealant layer 135 of the body part 601. The thickness of the first resin layer 621 is, under the condition before welding, not less than 10 μm and not more than 70 μm, and is preferably not less than 20 μm and not more than 50 μm. The material of the first resin layer 621 is not specifically limited as long as it is weldable to the sealant layer 135 of the body part 601; for example, a thermoplastic resin such as polypropylene, polyethylene, cyclic polyolefin or polyester may be used. In particular, the material is preferably the same as that of the thermoplastic resin used for the sealant layer 135, and by making the same the thermoplastic resin used for the first resin layer 621 and the thermoplastic resin layer used for the sealant layer 135, sealing strength between the body part 601 and the tape material 620 can be improved.

The thickness of the second resin layer 622 is, under the condition before welding, not less than 10 μm and not more than 70 μm, and is preferably not less than 20 μm and not more than 50 μm. As the material of the second resin layer 622, a thermoplastic resin such as polypropylene, polyethylene, cyclic polyolefin or polyester may be used. In particular, the material is preferably the same as that of the thermoplastic resin used for the first resin layer 621.

The base material 623 is a functional layer having a barrier property and a light blocking property, and a material may be used that is appropriately selected from among, for example, a drawn film of polypropylene or the like, a metallized film of aluminum or the like and a metallic foil of aluminum or the like according to the desired function. The base material 623 may be either a single layer or a multilayer. The thickness of the base material 623 is, for example, 9 to 40 μm. When a transparent barrier film is used as the base material 623, a material appropriately selected from among, for example, GL-RD, GL-ARH, GL-AE, GL-AN and GX (manufactured by Toppan Inc.) may be used.

The tape material 620 and the sheet 641 are welded by heat sealing by using a seal bar. The seal bar is wider than the tape material 620, that is, has a heating part capable of heating the tape material 620 so as to cover it. For this reason, even with the tape material 620 where the base material 623 is exposed from the end surfaces like the tape material 620 illustrated in FIG. 34, after the welding, the end surfaces of the tape material 620 are covered (protected) by the resin of the first resin layer 621 or the second resin layer 622 dissolved at the time of welding as shown in FIG. 35. Consequently, the elution of the adhesive between the layers from the end parts of the tape material into the tube container can be suppressed, so that deterioration of the taste and color of the contents of the tube container 6100 can be suppressed. In addition, the occurrence of the interlayer peeling of the tape material 620 can be suppressed.

Like the tape material 620 illustrated in FIG. 36, the end surfaces may be covered with an end surface resin 624 under the condition before welding. Also in this case, the thickness of the first resin layer 621 is, under the condition before welding, not less than 10 μm and not more than 70 μm, and is preferably not less than 30 μm and not more than 50 μm. The thickness of the second resin layer 622 is not less than 10 μm and not more than 70 μm, and is preferably not less than 30 μm and not more than 50 μm. At this time, the seal bar may be narrower than the tape material 620. Even when a narrow seal bar is used, since the end surfaces of the tape material 620 are previously covered with the end surface resin 624, the end surfaces of the tape material 620 are covered (protected) as in FIG. 35 even after welding. The tape material 620 illustrated in FIG. 36 can be formed by, for example, ultrasonic slitting. At this time, the end surface resin 624 is formed of the same material as that the first resin layer 621 or the second resin layer 622.

As described above, in the tube container 6100 according to the present embodiment, the end surfaces of the tape material 620 bonded to the body part 601 are covered with the resin of the first resin layer 621 or the second resin layer 622 dissolved when the tape material 620 is welded. For this reason, even if the tape material has a multilayer configuration, the elution of the adhesive between the layers from the end parts of the tape material can be suppressed, and the interlayer peeling of the tape material can be suppressed.

Moreover, the base material 623 of the tape material 620 has a barrier property. This improves the barrier property of the joint part of the sheet 641 of the tube container 6100.

Under the condition before welding, the thicknesses of the first resin layer 621 and the second resin layer 622 of the tape material 620 are both not less than 10 μm and not more than 70 μm, and the tape material 620 is welded by using a seal bar that is wider than the tape material 620. For this reason, the end surfaces of the tape material 620 can be covered (protected) by the resin of the first resin layer 621 or the second resin layer 622 dissolved at the time of welding.

Under the condition before welding, the end surfaces of the tape material 620 may be covered with the end surface resin 624. Thereby, even when welding is performed by using a seal bar that is narrower than the tape material 620, the end surfaces of the tape material 620 can be covered with the resin of the first resin layer 621 or the second resin layer 622 dissolved when the tape material 620 is welded.

The method of manufacturing the tube container according to the present embodiment is as follows:

[1] A method of manufacturing a tube container provided with a body part where a sheet having a pair of opposing end edges is shaped into a tube and a tape material is bonded to parts of the inner surface of the sheet that are along the pair of end edges, respectively; and a spout part attached to one end of the body part,
  wherein the tape material is provided with:
  a belt-like base material having a barrier property;
  a first resin laminated on the body part side of the base material; and
  a second resin laminated on the opposite side of the body part of the base material,
  the first resin layer is not less than 10 μm and not more than 70 μm, the second resin layer is not less than 10 μm and not more than 70 μm, and the tape material and the body part are heat-sealed by a seal bar that is wider than the tape material.

[2] A method of manufacturing a tube container provided with a body part where a sheet having a pair of opposing end edges is shaped into a tube and a tape material is bonded to parts of the inner surface of the sheet that are along the pair of end edges, respectively; and a spout part attached to one end of the body part, wherein the tape material is provided with:

a belt-like base material having a barrier property;

a first resin laminated on the body part side of the base material; and a second resin laminated on the opposite side of the body part of the base material, the first resin layer is not less than 10 μm and not more than 70 μm, the second resin layer is not less than 10 μm and not more than 70 μm, and the end surfaces of the tape material are covered with a resin the same as the first resin or the second resin, and the tape material and the body part are heat-sealed by a seal bar.

Seventh Embodiment

There is a problem in that the body part including paper and attached to a plate-like peripheral edge part of the spout part after provided with pleats is not formed beautifully and is poor in appearance and the sealability of the attachment part is not readily stabilized.

The present embodiment provides a tubular container where the body part including paper and attached to the plate-like peripheral edge part of the spout part after provided with pleats is formed beautifully and good in appearance and the sealability of the attachment part is readily stabilized.

Figure 37A:
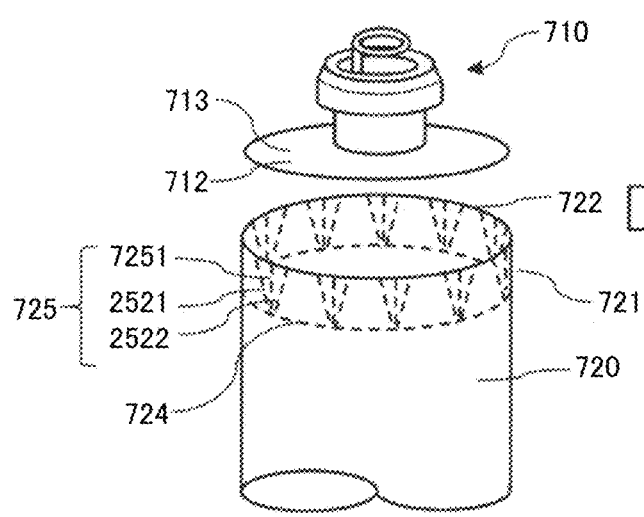
FIG. 37A is a front perspective view of the neighborhood of the other end of a body part and a spout part under a condition before the body part and the spout part of a tubular container according to a seventh embodiment are attached.
Figure 37B:
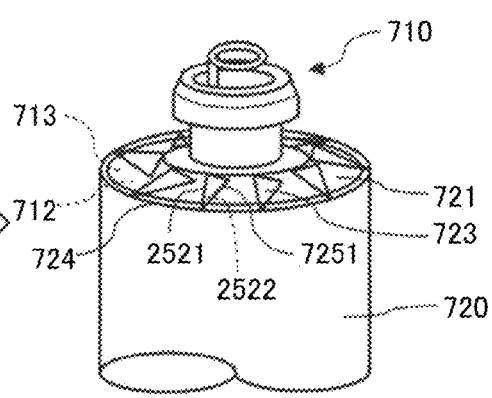
FIG. 37B is a front perspective view of the neighborhood of the other end of the body part and the spout part under a condition where the other end of the body part of the tubular container according to the seventh embodiment is folded on a peripheral edge part of a flange part and welding is performed thereon.
Figure 39:
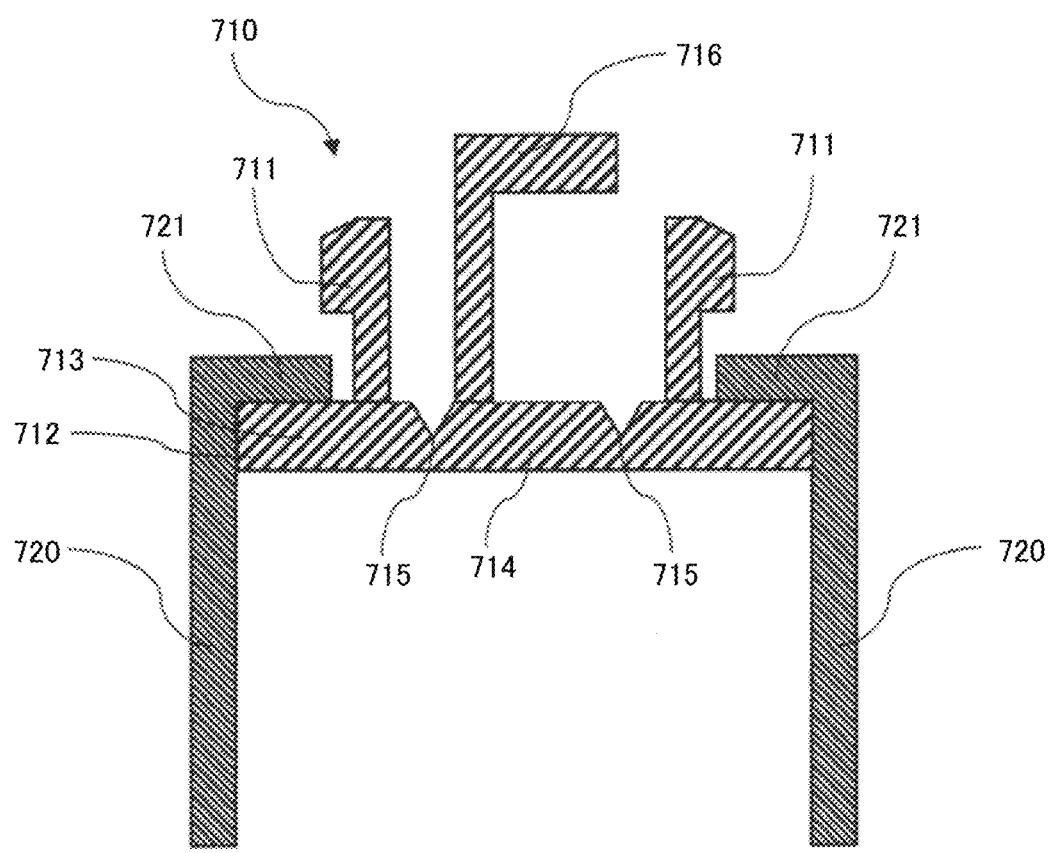
FIG. 39 is an enlarged cross-sectional view, along line G-G, of the neighborhood of the spout part of FIG. 38B.
Figure 40A:
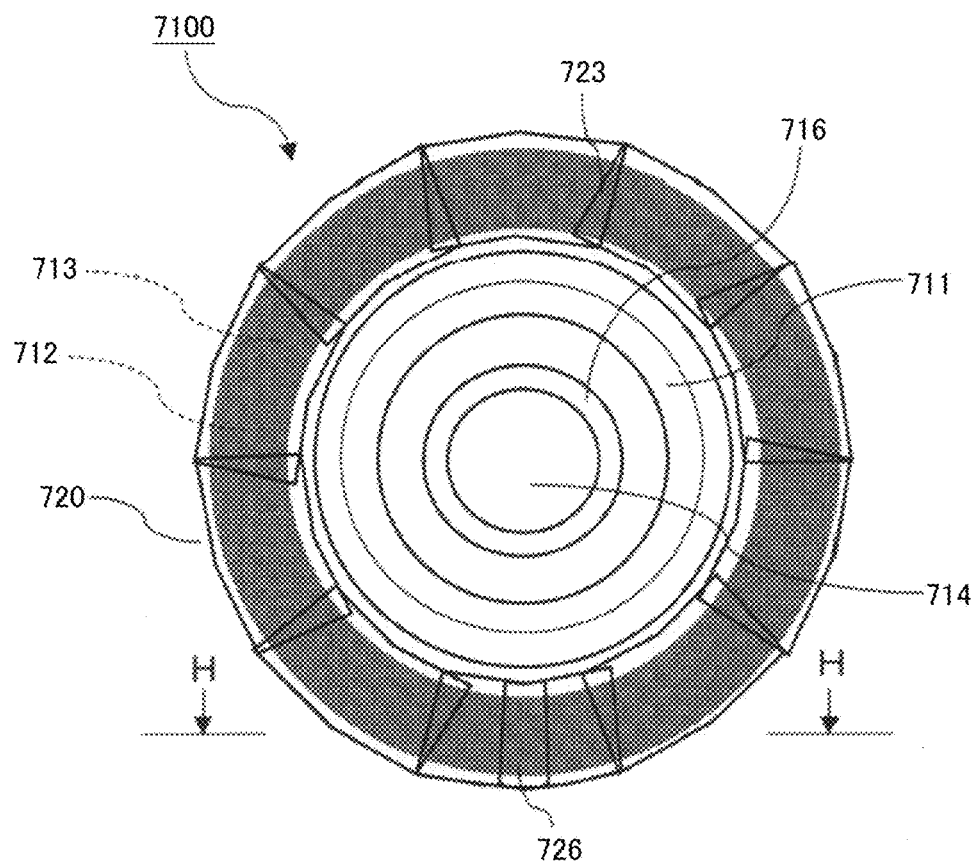
FIG. 40A is a plan view of the tubular container according to the seventh embodiment.
Figure 40B:
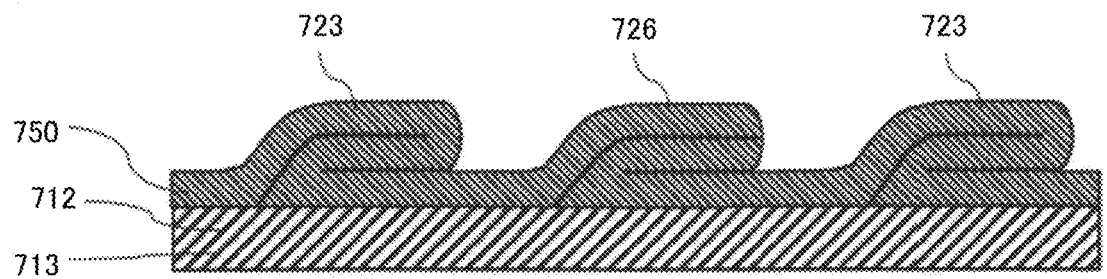
FIG. 40B is an enlarged cross-sectional view along line H-H of FIG. 40A.

FIG. 37A is a front perspective view of the neighborhood of the other end 721 of a body part 720 and a spout part 710 under a condition before the body part 720 and the spout part 710 of a tubular container 7100 according to a seventh embodiment are attached. FIG. 37B is a front perspective view of the neighborhood of the other end 721 of the body part 720 and the spout part 710 under a condition where the other end 721 of the body part 720 of the tubular container 7100 according to the seventh embodiment is folded on a peripheral edge part 713 of a flange part 712 and welding is performed thereon. FIG. 38A is a front view of the tubular container 7100 according to the seventh embodiment. FIG. 38B is a side view of the tubular container 7100 according to the seventh embodiment. FIG. 39 is an enlarged cross-sectional view, along line G-G, of the neighborhood of the spout part 710 of FIG. 38B. FIG. 40A is a plan view of the tubular container 7100 according to the seventh embodiment. FIG. 40B is an enlarged cross-sectional view along line H-H of FIG. 40A.

As shown in FIGS. 38A and 38B, the tubular container 7100 includes the body part 720 that is closed at one end and the spout part 710 attached to the other end 721 of the body part 720, and accommodates contents (not shown). In FIGS. 38A and 38B, the one end of the body part 720 is a bottom part 727 of the tubular container 7100.

The body part 720 is formed of a laminated sheet 750 including paper the basis weight of which is thicker than 30 g/m² and thinner than 300 g/m². In the body part 720, for example, the laminated sheet 750 having a pair of end edges substantially parallel to each other is shaped into a tube having a substantially circular transverse cross-sectional shape and the inner surfaces of the belt-like parts including the pair of end edges of the laminated sheet 750, respectively, are joined in such a manner that the palms are joined together, and welded, whereby a back bonded seal part 726 (not shown in FIG. 37A, 37B, 38A or 38B) is formed. The body part 720 can be formed by using a bag-making machine, a pillow stick packaging machine or the like. Here, "transverse cross-sectional shape" indicates the cross-sectional shape of the body part 720 on a plane (transverse cross section) orthogonal to a central axis X of the tubular container 7100 of FIGS. 38A and 38B.

Although the method of bonding the laminated sheet 750 together at the bottom part 727 is not specifically limited, for example, a method may be used in which an adhesive layer containing polyethylene is provided between the opposing innermost layers of the laminated sheet 750 and these are heat-sealed.

As shown in FIGS. 37A, 37B, 38A and 38B, the spout part 710 has a tubular spout tube part 711 and the plate-like flange part 712 connected to one end of the spout tube part 711 and orthogonal to the height direction of the body part 720. The flange part 712 is a part extending outward from one end of the spout tube part 711. The shape of the peripheral edge part 713 of the flange part 712 viewed from the height direction of the body part 720 is substantially circular. The other end 721 of the body part 720 is attached to the surface, on the side opposite to the one end side of the body part 720, of the flange part 712 in the peripheral edge part 713 of the flange part 712. Here, the "height direction" indicates the direction of the central axis X of the tubular container 7100 of FIGS. 38A and 38B.

While the material of the spout part 710 is not specifically limited, a resin material such as low-density polyethylene may be suitably used. Moreover, by using a material provided with a barrier function for the spout part 710 as well as for the body part 720, the overall barrier function of the tubular container 7100 improves, so that the quality of the contents can be protected more. With the spout part 710 having the flange part 712 formed in a plate shape, the material used can be reduced compared with the spout part 710 according to the prior art formed in a tapered shape.

Since the flange part 712 has a plate shape, there is no space that enables the contents to remain on the inner side unlike the flange part 712 formed in a tapered shape as in the prior art. For this reason, by bending the body part 720 at the end edge of the flange part 712 with fingers or the like, the small amount of contents remaining in the body part 720 can be extruded toward the periphery of the opening of the spout part 710 by sandwiching them by the flat surface on the inner side of the flange part 712 and the inner surface of the body part 720. Moreover, the contents extruded toward the periphery of the opening of the spout part 710 can be squeezed from the opening without remaining inside the body part 720 and the spout part 710. As a consequence, the contents' remaining inside the container can be suppressed.

As described above, the contents' remaining can be suppressed by squeezing the contents while bending the body part 720. For this reason, it is preferable that the body part 720 be constituted by the laminated sheet 750 being low in rigidity (not being high in stiffness) and enabling the body part 720 to be easily bent.

Since the body part 720 of the tubular container 7100 can be easily bent by setting the thickness of the laminated sheet 750 constituting the body part 720 to not less than 30 μm and not more than 300 μm, molding can be easily performed, the contents can be easily squeezed with a light force and the contents' remaining can be suppressed.

As shown in FIG. 39, on the peripheral edge part 713 of the flange part 712 having a plate shape orthogonal to the height direction of the body part 720, the other end 721 of the body part 720 is attached to the surface, on the side opposite to the one end side of the body part 720, of the flange part 712. Moreover, as shown in FIG. 40B, the other end 721 of the body part 720 is attached to the peripheral edge part 713 while pleats 723 are formed that are folded so that the inner surface of the laminated sheet 750 is in contact with each other. These pleats 723 are folded in one direction (the rightward direction or the leftward direction) to the outer surface of the other end 721 of the body part 720 on the peripheral edge part of the flange part 712 and the outer surface of the other end 721 of the body part 720 on the peripheral edge part of the flange part 712 is sealed together. By folding the pleats 723 in one direction, stabler and beautiful pleats 723 can be formed. Here, "on the peripheral edge part" indicates the surface, on the side opposite to the one end side of the body part 720, of the peripheral edge part 713. Moreover, the "outer surface of the other end of the body part" indicates the surface, on the side opposite to the contents, of the other end 721 of the body part 720.

Moreover, as shown in FIGS. 37A and 37B, the other end 721 of the body part 720 has a first ruled line 724 and a second ruled line 725, is bent along the first ruled line 724 and the second ruled line 725, and is attached to the peripheral edge part 713 while the pleats 723 are formed that are folded to the outer surface of the other end 721 of the body part 720 on the peripheral edge part of the flange part 712.

FIG. 37A shows the body part 720 where the first ruled line 724 and the second ruled line 725 are formed and the spout part 710 separately from each other. However, as described later, depending on the method of manufacturing the tubular container 7100, the first ruled line 724 and the second ruled line 725 are formed on the body part 720 inserted in a mandrel to which the spout part 710 is attached.

As shown in FIG. 37A, the first ruled line 724 is a mountain fold line, and is formed in the peripheral direction of the body part 720 for bending toward the center of the body part 720 and attachment to the peripheral edge part 713 of the flange part 712. For example, the first ruled line 724 is linearly formed in the peripheral direction of the body part 720.

The second ruled line 725 is structured as follows: With one mountain fold line 7251 and two valley fold lines 2521 and 2522 as one set, two or more sets thereof are equally formed along the peripheral direction of the peripheral edge part 713 of the flange part 712.

Figure 41A:
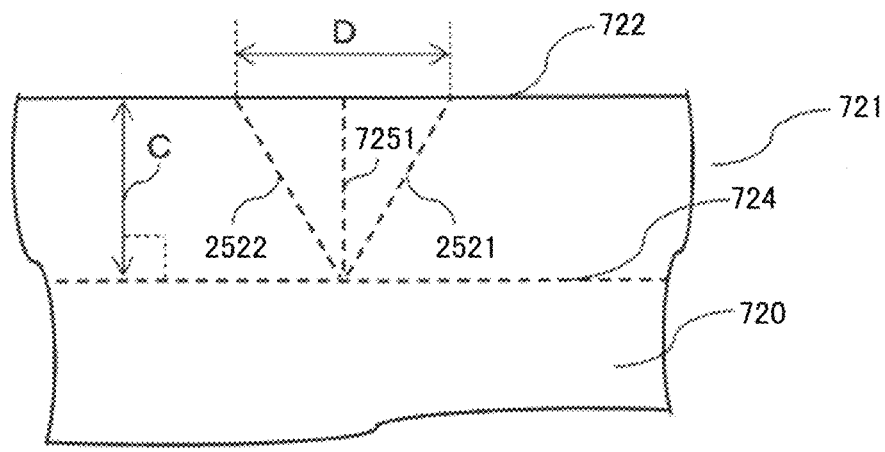
FIG. 41A is an enlarged front view of the neighborhood of the other end of the body part of the tubular container of FIG. 37A.
Figure 41B:
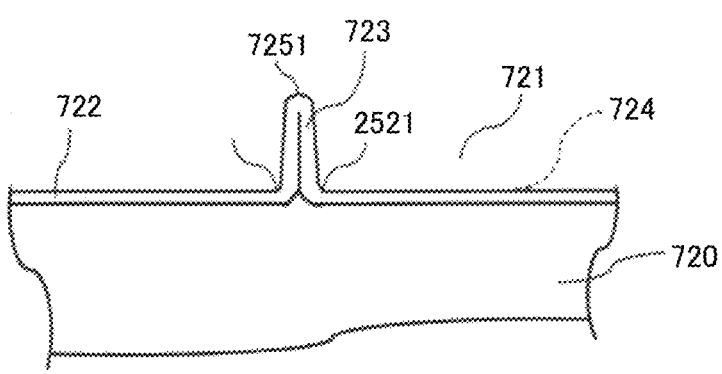
FIG. 41B is an enlarged front view of the neighborhood of the other end of the body part under a condition where folding processing on the body part of the tubular container of FIG. 37A is performed on the peripheral edge part of the flange part.
Figure 41C:
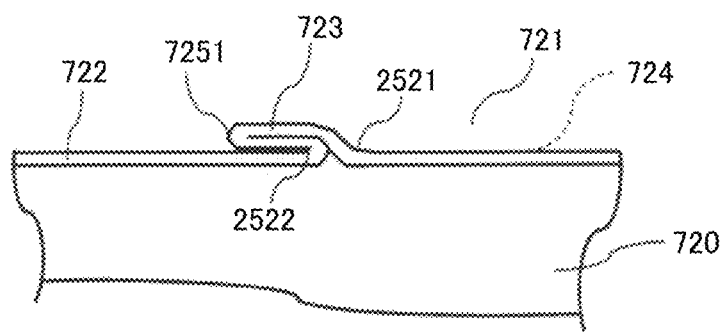
FIG. 41C is an enlarged front view of the neighborhood of the other end of the body part of the tubular container of FIG. 37B.

FIG. 41A is an enlarged front view of the neighborhood of the other end 721 of the body part 720 of the tubular container 7100 of FIG. 37A, that is, is an enlarged front view of the neighborhood of the other end 721 of the body part 720 under a condition before the body part 720 and the spout part 710 of the tubular container 7100 according to the seventh embodiment are attached. FIG. 41B is an enlarged plan view of the neighborhood of the other end 721 of the body part 720 under a condition where folding processing on the body part 720 of the tubular container 7100 of FIG. 37A is performed on the peripheral edge part 713 of the flange part 712. FIG. 41C is an enlarged plan view of the neighborhood of the other end 721 of the body part 720 of the tubular container 7100 of FIG. 37B, that is, is an enlarged plan view of the neighborhood of the other end 721 of the body part 720 under a condition where the other end 721 of the body part 720 of the tubular container 7100 according to the seventh embodiment is folded on the peripheral edge part 713 of the flange part 712 and welded.

FIGS. 41A-41C show the inner peripheral surface side of the body part 720. In FIGS. 41A-41C, the spout part is not shown intentionally.

As shown in FIG. 41A, the one mountain fold line 7251 is a line extending substantially perpendicularly to the first ruled line 724 from an other end side edge 722 of the body part 720 to one point of the first ruled line 724. The two valley fold lines 2521 and 2522 are lines extending symmetrically with respect to the one mountain fold line 7251 in a slanting direction from the other end side edge 722 of the body part 720 to the vertex of the first ruled line 724 so as to form an isosceles triangle with the one point of the first ruled line 724 as the vertex and the other end side edge 722 of the body part 720 as the base. In FIGS. 41A to 41C, etc., the line extending obliquely upward to the left with respect to the one mountain fold line 7251 from the one point of the first ruled line 724 is the first valley fold line 2521, and the line extending obliquely upward to the right with respect to the one mountain fold line 7251 from the one point of the first ruled line 724 is the second valley fold line 2522. The one mountain fold line 7251 is the line that halves the isosceles triangle formed of the first valley fold line 2521 and the second valley fold line 2522 with the other end side edge 722 of the body part 720 as the base.

The length of the outer periphery of the body part 720 in the neighborhood of the peripheral edge part 713 of the flange part 712 is denoted by A, the diameter of the outer periphery of the body part 720 in the neighborhood of the peripheral edge part 713 of the flange part 712 is denoted by B, and the length of the line extending substantially perpendicularly to the first ruled line 724 from the other end side edge 722 of the body part 720 to the first ruled line 724 (the amount of bend of the body part 720 onto the peripheral edge part of the flange part 712) is denoted by C (see FIG. 41A). The length of the base of the isosceles triangle at the other end side edge 722 of the body part 720 is denoted by D, and the number of sets of the one mountain fold line 7251 and the two valley fold lines 2521 and 2522 is denoted by E. When the length of the circumference of a circle with a length of (B−C×2) as the diameter (the circumference of a circle formed by the edge 722 of the other end 721 of the body part 720 bent onto the peripheral edge part of the flange part 712) is denoted by F, a relationship (A−F)/E=D is satisfied.

For example, the length (A) of the outer periphery of the body part 720 in the neighborhood of the peripheral edge part 713 of the flange part 712 is approximately 110 mm, the diameter (B) of the outer periphery of the body part 720 in the neighborhood of the peripheral edge part 713 of the flange part 712 is 35 mm, and the length (C) of the line extending substantially perpendicularly to the first ruled line 724 from the other end side edge 722 of the body part 720 to the first ruled line 724 is 5 mm. In this case, the length of (B−C×2) is 25 mm, and the length (F) of the circumference of the circle with the 25 mm as the diameter is approximately 78.5 mm. The length of (A−F) is approximately 31.5 mm and when the number (E) of sets of the one mountain fold line 7251 and the first valley fold line 2521 and the second valley fold line 2522 on the right and left of the one mountain fold line 7251 is 10, the length (D) of the base of the isosceles triangle at the other end side edge 722 of the body part 720 is (A−F)/E, that is, approximately 31.5/10, or approximately 3.2 mm.

The body part 720 includes paper the basis weight of which is thicker than 30 g/m² and thinner than 300 g/m², and on the other end 721 of the body part 720, the first ruled line 724 and the second ruled line 725 are formed as described above, and the other end 721 of the body part 720 is bent along the first ruled line 724 and the second ruled line 725 and attached to the peripheral edge part 713 of the flange part 712 while the pleats 723 are formed that are folded to the outer surface of the other end 721 of the body part 720 on the peripheral edge part of the flange part 712.

Consequently, the pleats 723 are equally formed in the peripheral direction of the body part 720 on the plate-like flange part 712 of the spout part 710, the body part 720 is formed beautifully, the appearance is good, and the sealability of the part of attachment to the flange part 712 is readily stabilized.

Moreover, as shown in FIGS. 28 and 39, the spout part 710 has, as an example, a closing part 714 having an annular half cut 715 substantially in the center, and is provided with a pull ring 716 inside the half cut 715. By the closing part 714 being provided with the half cut 715 and the pull ring 716, the user of the tubular container 7100 can form an opening for taking out the contents in the closing part 714 by pulling the pull ring 716 to remove a part of the closing part 714 along the half cut 715. The opening for taking out the contents may be previously formed in the spout part 710 without the provision of the half cut 715 or the pull ring 716.

The tubular container 7100 may be provided with a cap (not shown) detachably attachable to the spout tube part 711 of the spout part 710. Examples of the detachably attachable cap include a hinge cap attached to the spout part 710 and a screw cap detachably attachable by screwing. When the tubular container 7100 is provided with a detachably attachable cap, it is easy to re-seal the tubular container 7100 after it is opened.

When a hinge cap is provided as the cap, since the stiffness for a twist required of the body part 720 grabbed with a hand when the cap is opened can be reduced compared with when a cap screwed with the spout tube part 711 and rotated to open is provided, the laminated sheet 750 with a low stiffness is easy to adopt, which is a favorable point.

Figure 42:
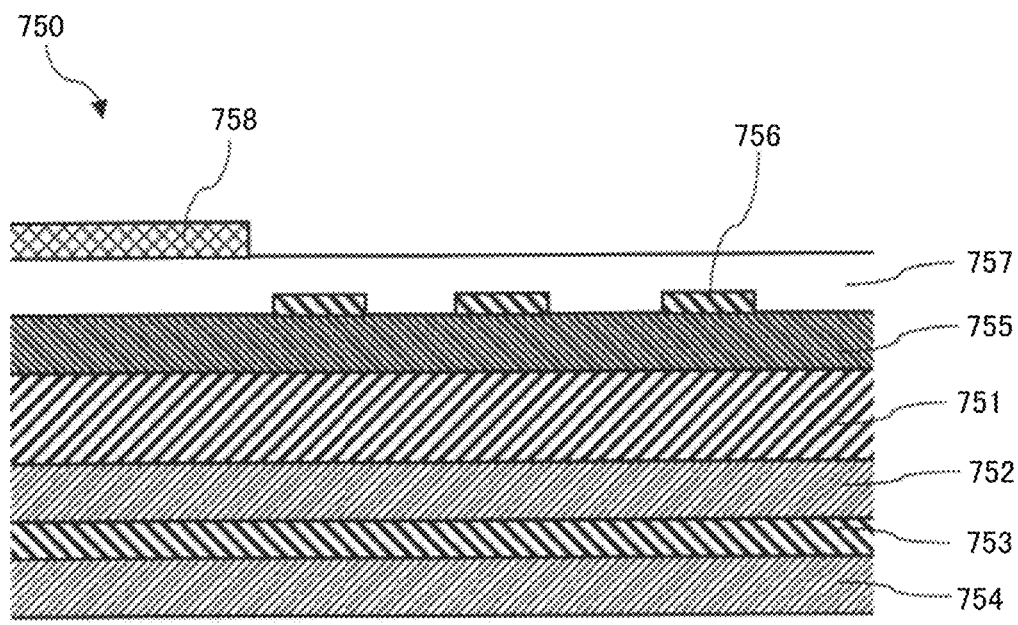
FIG. 42 is a cross-sectional view of a laminated sheet constituting the body part of the tubular container according to the seventh embodiment.

FIG. 42 is a cross-sectional view showing the layer configuration of the laminated sheet 750 constituting the body part 720 of the tubular container 7100 according to the present embodiment.

The body part 720 is constituted by the laminated sheet 750 including paper as the main material. The total thickness of the laminated sheet 750 is preferably not less than 30 μm and not more than 300 μm.

The laminated sheet 750 is a multilayer sheet where a base film layer 752, a barrier layer 753 and a sealant layer 754 are laminated in this order on one surface of a paper layer 751, a paper protection layer 755 is laminated on the other surface of the paper layer 751, an ink layer 756 and an overcoat varnish layer 757 are laminated on the paper protection layer 755 and these are pattern-coated with a heat sealing coat layer 758. Hereinafter, details of the layers will be described.

(Paper Layer)

The paper layer 751 is a structural layer that provides the tubular container 7100 with strength and stiffness. While the kind of the paper constituting the paper layer 751 is not specifically limited, it is preferable to use machine-glazed kraft paper or <ryotsuya> kraft paper because these have strength, bending resistance and printing aptitude. As the paper constituting the paper layer 751, waterproof paper or oil resistance paper may be used as required. The paper layer 751 is only necessarily paper containing not less than 50% of cellulose fiber, and may be mixed paper containing resin fiber as well as cellulose fiber.

The basis weight of the paper used for the paper layer 751 is thicker than 30 g/m² and thinner 300 g/m², and is preferably not less than 50 g/m² and not more than 250 g/m². When the basis weight of the paper used for the paper layer 751 is not more than 30 g/m², the first ruled line 724 and the second ruled line 725 cannot be beautifully formed on the body part 720, and when it is not less than 300 g/m², it is difficult to eliminate the level difference when the body part 720 is sealed to the peripheral edge part 713 of the flange part 712, so that leakage occurs.

(Base Film Layer)

The base film layer 752 is a layer that provides the laminated sheet 750 with heat resistance and physical strength. The base film layer 752 is also a layer serving as the base material of the barrier layer 753. While the material of the film constituting the base film layer 752 is not specifically limited, it is preferable to use a drawn film of polypropylene, polyester, polyamide or the like from the viewpoint of heat resistance and physical strength. However, the base film layer 752 may be formed of paper.

(Barrier Layer)

The barrier layer 753 is a functional layer that blocks oxygen, water vapor and the like to improve the preservability of the contents. The barrier layer 753 may be formed of at least one kind of the following: a vapor-deposited film of an inorganic compound such as nylon, silica or alumina; a metallized film of aluminum or the like; a metal foil of aluminum or the like; and a barrier-coating agent coated film containing a plate-like mineral and/or a barrier resin. As the barrier resin used for the barrier-coating agent, ethylene-vinylalcohol copolymer (EVOH), polyvinylidene chloride (PVDC) or the like may be used, and a binder resin other than the barrier resin is mixed in the barrier-coating agent as appropriate. The barrier layer 753 may be previously laminated on the base film layer 752 to form a barrier film or may be provided as a single layer film.

(Sealant Layer)

While the material of the sealant layer 754 is not specifically limited, it is preferably a thermoplastic resin such as polypropylene, polyethylene, cyclic polyolefin or polyester. For the sealant layer 754, a resin is used that has a softening temperature lower than that of the base film layer 752 by not less than 20 degrees C. It is undesirable if the softening temperature of the sealant layer 754 is not lower than that of the base film layer 752 by not less than 20 degrees C. because the base film layer 752 is softened at the time of sealing and this increases the possibility of occurrence of a pinhole. It is desirable that the softening temperature of the sealant layer 754 be lower than that of the base film layer 752 by not less than 40 degrees C.

While the thermoplastic resin used for the sealant layer 754 is only necessarily a resin having an adhesive property for the thermoplastic resin constituting the material of the spout part 710, it is preferably formed of the same material as the thermoplastic resin used for the spout part 710. By making the same the thermoplastic resin used for the sealant layer 754 and the thermoplastic resin used for the spout part 710, the sealing strength between the body part 720 and the spout part 710 can be improved.

(Paper Protection Layer)

The paper protection layer 755 is a layer for protecting the paper layer 751 constituting the laminated sheet 750 from the adhesion of the contents and dirt. While the material and formation method of the paper protection layer 755 are not specifically limited, the paper protection layer 755 may be laminated by extrusion coating with a thermoplastic resin or by coating with a coating agent such as a water resisting agent or an oilproof agent. The thickness of the paper protection layer 755 is preferably 0.2 to 50 µm, and is more preferably 1 to 20 µm. When the thickness of the paper protection layer 755 is less than 0.2 µm, a pinhole can occur in the paper protection layer 755 and there are cases where the protection of the paper layer 751 is insufficient. Moreover, it is undesirable if the thickness of the paper protection layer 755 exceeds 50 µm from the aspect of the amount of use of the resin and the manufacturing cost.

(Ink Layer, Overcoat Varnish Layer)

The ink layer 756 is a layer formed by printing for providing various displays, and the overcoat varnish layer 757 is a layer for providing wear resistance and the like. The order of lamination of the ink layer 756 and the overcoat varnish layer 757 may be reverse to that of FIG. 42. Moreover, the overcoat varnish layer 757 may serve also as the paper protection layer 755.

(Heat Sealing Coat Layer)

The heat sealing coat layer 758 is a layer for providing the outer surface of the laminated sheet 750 with heat sealability. In the present embodiment, the outer surface of the back bonded seal part 726 is sealed to the outer surface of the body part 720 by the heat sealing coat layer 758 with which the outer surface of the laminated sheet 750 is pattern-coated (partially coated), and the outer surface of the other end 721 of the body part 720 on the peripheral edge part of the flange part 712 is sealed together by folding the pleats 723 formed on the other end 721 of the body part 720.

When the heat sealing coat layer 758 is partly provided on the surface of the laminated sheet 750, it is only necessary that the heat sealing coat layer 758 be provided at positions to be sealed, that is, the part where the outer surface of the back bonded seal part 726 and the outer surface of the body part 720 are in contact with each other and the parts where the pleats 723 formed on the other end 721 of the body part 720 are folded and the outer surface of the other end 721 of the body part 720 on the peripheral edge part of the flange part 712 is in contact with each other. Here, the heat sealing coat layer 758 may be provided on only one of the surfaces that are in contact with each other at the positions to be sealed.

The heat sealing coat layer 758 may be formed by applying a coating agent containing a thermoplastic resin such as acrylic polymer, polyolefin, polyvinyl acetate or polyester and drying it. The coating agent may be mixed with an inorganic material or the like for preventing blocking in addition to the thermoplastic resin.

The application amount of the coating agent for forming the heat sealing coat layer 758 is 0.2 to 40 g/m$^2$, and is preferably 3.0 to 30 g/m$^2$. When the application amount of the coating agent is less than 0.2 g/m$^2$, the bonding strength between the outer surface of the laminated sheet 750 is insufficient, so that a phenomenon occurs that the laminated sheet 750 on the parts of the back bonded seal part 726 and the pleats 723 welded to the outer surface of the other end 721 of the body part 720 springs up. On the other hand, when the application amount of the coating agent exceeds 40 g/m$^2$, the friction coefficient is increased, so that the machine aptitude for the processing machine such as a bag-making machine is decreased and blocking between the laminated sheets 750 readily occurs.

Although the heat sealing coat layer 758 may be provided on the entire surface of the laminated sheet 750, since this increases the friction coefficient of the surface of the laminated sheet 750, there are cases where the machine aptitude in the process of processing the body part 720 and succeeding processes is decreased. Therefore, from the aspect of the machine aptitude, it is more preferable to provide the heat sealing coat layer 758 on parts of the surface of the laminated sheet 750 by pattern-coating with the coating agent.

In the layer configuration of the laminated sheet 750 shown in FIG. 42, one or more of the base film layer 752, the barrier layer 753, the paper protection layer 755, the ink layer 756 and the overcoat varnish layer 757 may be omitted.

The method of manufacturing the tubular container 7100 includes a process of forming the body part 720 of the tubular container 7100 and a process of attaching the body part 720 to the spout part 710.

Next, a method of forming the body part 720 of the tubular container 7100 will be described.

For example, the body part 720 is successively processed while the laminated sheet 750 is conveyed by a conveyer. The laminated sheet 750 is wound around a plate-like jig that is substantially circular in transverse cross section, and belt-like parts including a pair of end edges, respectively, are placed one on another. Then, by using a guide that is inverted T-shaped in cross section, the belt-like parts including the pair of end edges, respectively, are raised and the inner surfaces thereof are made to face in such a manner that the palms are joined together with the guide in between. Then, by using a plate-like guide, the part where the inner surfaces of the laminated sheet 750 are joined in such a manner that the palms are joined together is bent approximately 90 degrees into a condition where three laminated sheets 750 are placed one on another. By performing sealing by using a seal bar under this condition, the inner surfaces of the laminated sheets 750 are welded to form the back bonded seal part 726, and at the same time, by the heat sealing coat layer 758, the body part 720 where the back bonded seal part 726 is welded to the outer surface of the body part 720 can be formed.

Next, a method of attaching the body part 720 to the spout part 710 will be described.

As the method of attaching the body part 720 to the spout part 710, the following processes may be included: a process of mounting the spout part 710 on an upper part of a mandrel; a process of inserting the body part 720 the length in the height direction of which is longer than the length in the height direction of the mandrel, into the mandrel; a process of fixing the body part 720 in a position where it protrudes from the mandrel by a length C; and a process of forming the first ruled line 724 and the second ruled line 725 on the body part 720.

For example, after the spout part 710 is mounted on the upper part of the mandrel, the body part 720 the length in the height direction of which is longer than the length in the height direction of the mandrel is inserted into the mandrel, and the body part 720 is fixed in the position where the body part 720 protrudes by a length C from the mandrel. Then, the first ruled line 724 and the second ruled line 725 are formed on the body part 720 with a female mold.

Regarding the formation of the first ruled line 724 and the second ruled line 725 on the body part 720, by performing hot pressing at a temperature of not more than the melting point of the body part 720, the first ruled line 724 and the second ruled line 725 can be formed on the body part 720. This method is also effective when a material having a dead holding property or a material with a high stiffness is used for the body part 720.

When a resin that softens by heating is used for the outermost layer of the laminated sheet 750 constituting the body part 720, the first ruled line 724 and the second ruled line 725 can also be formed by bringing the body part 720 into contact with a female mold to cause thermal shrinkage at the part of contact on the body part 720 without the use of a male mold in the above-mentioned hot pressing. By doing this, the pleats 23 are equally formed in the peripheral direction of the peripheral edge part 713 and the body part is beautifully formed, which enables the manufacture of the tubular container 7100 where the sealability of the part of attachment to the flange part 712 is readily stabilized.

Figure 43:
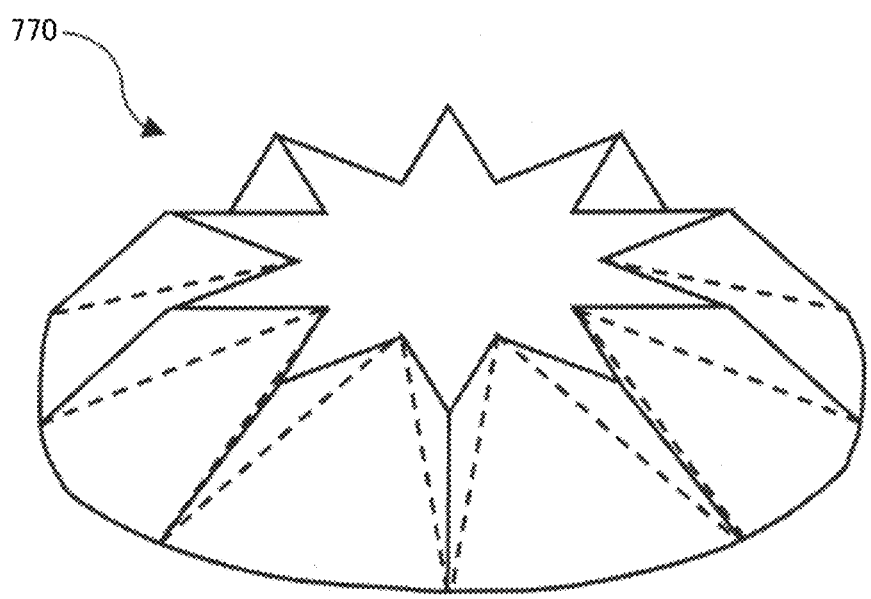
FIG. 43 is a front perspective view of an example of a mold for forming a first ruled line and a second ruled line on the body part of the tubular container according to the seventh embodiment.

FIG. 43 is a front perspective view of an example of a mold for forming the first ruled line 724 and the second ruled line 725 on the body part 720 of the tubular container 7100 according to the seventh embodiment.

For example, with the shape of the other end 721 of the body part 720 being male, a pyramid-shaped female mold 770 corresponding to the male shape and being star-shaped in transverse cross section as shown in FIG. 43 is used, whereby the first ruled line 724 and the second ruled line 725 can be formed on the other end 721 of the body part 720.

The first ruled line 724 and the second ruled line 725 may be formed under a condition where the laminated sheet 750 is a material roll or in a sleep state other than immediately before the welding between the body part 720 and peripheral edge part 713 as describe above. When the first ruled line 724 and the second ruled line 725 are formed in the condition where the laminated sheet 750 is a material roll, the ruled lines may be formed by using a male mold and a female mold.

After the first ruled line 724 and the second ruled line 725 are formed as described above, the other end 721 of the body part 720 is bent along the first ruled line 724 toward the center of the body part 720, as shown in FIG. 41B, the pleats 723 are formed that are folded along the mountain fold line 7251 and the valley fold lines 2521 and 2522 of the second ruled line 725 in the peripheral edge part 713 of the flange part 712 in such a manner that the inner surface of the laminated sheet 750 is in contact with each other, and as shown in FIG. 41C, for example, the pleats 723 are folded in one direction to the outer surface of the other end 721 of the body part 720 on the peripheral edge part 713 along the second valley fold line 2522. Then, the entire area of the other end 721 of the body part 720 is heated and pressurized by ring-shaped heating and pressure-bonding means from above the other end 721 of the body part 720, thereby welding the pleats 723 onto the peripheral edge part 713. As a concrete method of welding by the heating and pressure-bonding means, a method such as hot plate pressing, ultrasonic sealing, high frequency sealing or impulse sealing may be used. Moreover, the other end 721 of the body part 720 and the peripheral edge part 713 of the flange part 712 may be sealed by using a material such that the outer surfaces in contact with each other have a heat welding property. For example, a method may be used in which the sealant layer 754 containing polyethylene is provided on the innermost layer of the laminated sheet 750 constituting the body part 720, the spout part 710 is formed of a material containing polyethylene and these are thermally welded.

When the body part 720 is formed of the back bonded seal part 726 formed by joining the inner surface in such a manner that the palms are joined together and welding it, the back bonded seal part 726 is high in stiffness, the plates 723 are difficult to form, and sealability is inferior; therefore, as shown in FIGS. 40A and 40B, it is desirable that no pleats 723 are formed on the back bonded seal part 726. Since the difference in wall thickness is large between the right and left parts of the back bonded seal part 726 formed by joining the inner surface in such a manner that the palms are joined together and welding it, it is possible to avoid an extreme difference in wall thickness by intentionally forming the pleats 723.

The tubular container and the method of manufacturing the same according to the present invention are as follows:

[1] A tubular container including a body part that is closed at one end and a spout part attached to the other end of the body part,
  wherein the spout part has a flange part having a plate shape orthogonal to the height direction of the body part, and the shape of a peripheral edge part of the flange part viewed from the height direction of the body part is substantially circular,
  the body part includes paper the basis weight of which is thicker than 30 g/m² and thinner than 300 g/m²,
  the other end of the body part is attached to the surface, on the side opposite to the one end side of the body part, of the flange part in the peripheral edge part of the flange part, has the first ruled line and the second ruled line, is bent along the first ruled line and the second ruled line, and is attached to the peripheral edge part of the flange part while pleats are formed that are folded to the outer surface of the other end of the body part on the peripheral edge part of the flange part,
  the first ruled line is a mountain fold line, and formed in the peripheral direction of the body part for bending toward the center of the body part and attachment to the peripheral edge part of the flange part,
  the second ruled line is formed, with one mountain line and two valley fold lines as one set, by equally forming two or more sets thereof in the peripheral direction of the flange part,
  the one mountain line is a line extending substantially perpendicularly to the first ruled line from the other end side edge of the body part to one point of the first ruled line,
  the two valley fold lines are lines extending symmetrically with respect to the one mountain fold line in a slanting direction from the other end side edge of the body part to the vertex of the first ruled line so as to form an isosceles triangle with the one point of the first ruled line as the vertex and the other end side edge of the body part as the base, and
  when the length of the outer periphery of the body part in the neighborhood of the peripheral edge part of the flange part is denoted by A, the diameter of the outer periphery of the body part in the neighborhood of the peripheral edge part of the flange part is denoted by B, the length of the line extending from the other end side edge of the body part to the first ruled line substantially perpendicularly to the first ruled line is denoted by C, the length of the base of the isosceles triangle at the other end side edge of the body part is denoted by D, the number of sets of the one mountain fold line and the two valley fold lines is denoted by E and the length of the circumference of the circle with a length (B−C×2) as the diameter is denoted by F, a relationship (A−F)/E=D is satisfied.

[2] The tubular container according to item [1], wherein the pleats are folded in one direction to the outer surface of the other end of the body part on the peripheral edge part of the flange part.

[3] A method of manufacturing the tubular container according to item [1] or [2], including:
  a process of mounting the spout part on an upper part of a mandrel;

a process of inserting, into the mandrel, the body part the length in the height direction of which is longer than the length in the height direction of the mandrel;

a process of fixing the body part in a position where the body part protrudes by a length C from the mandrel; and a process of forming the first ruled line and the second ruled line on the body part.

[4] The method of manufacturing the tubular container according to item [3], including a process of forming the first ruled line and the second ruled line on the body part by performing hot pressing at a temperature of not more than the melting point of the body part.

[5] The method of manufacturing the tubular container according to item [4], wherein the body part is formed of a laminated sheet where a resin that softens by heating is used for the outermost layer, and a process is included of forming the first ruled line and the second ruled line by bringing the body part into contact with a female mold to cause thermal shrinkage at the part of contact on the body part in the hot pressing.

Eighth Embodiment

The body part is formed by shaping a sheet constituting the body part into a tube and bonding both ends together. Available methods of bonding the sheet include: butt-seam sealing where the inner surface of the sheet is bonded together and welded; stick and tape sealing where a stuck part in which both ends of the sheet are stuck together is sealed with a tape material; and envelope sealing where the inner and outer surfaces of the sheet are welded. However, with the butt-seam sealing, the bonded part protrudes from the body part, which impairs the appearance of the tube container.

The stick and tape sealing has a problem with durability because the strength of the stuck part is weak and this can cause paper peeling while the tube container is used. Further, the tape material requires a barrier layer for ensuring the barrier property of the tube container in addition to the sealant layer for welding to the innermost layer of the sheet constituting the body part, and has a problem in that components of the adhesive provided between the layers for bonding the barrier layer elutes from the end surface of the tape material into the body part.

Regarding the envelope sealing where the inner surface and the outer surface of the sheet are welded, although the strength of the bonded part is ensured, the adhesive contained in the sheet can elute into the tube container from the end surface of the sheet inside the body part, and further, the contents can enter the paper layer from the end surface of the sheet inside the body part and leak to the outside of the tube container.

The present embodiment provides a tube container that is excellent in aesthetics, durability and barrier property and where the tape material is provided with neither barrier layer nor adhesive and the elution of the adhesive component of the tape material and the sheet is suppressed.

Figure 44:
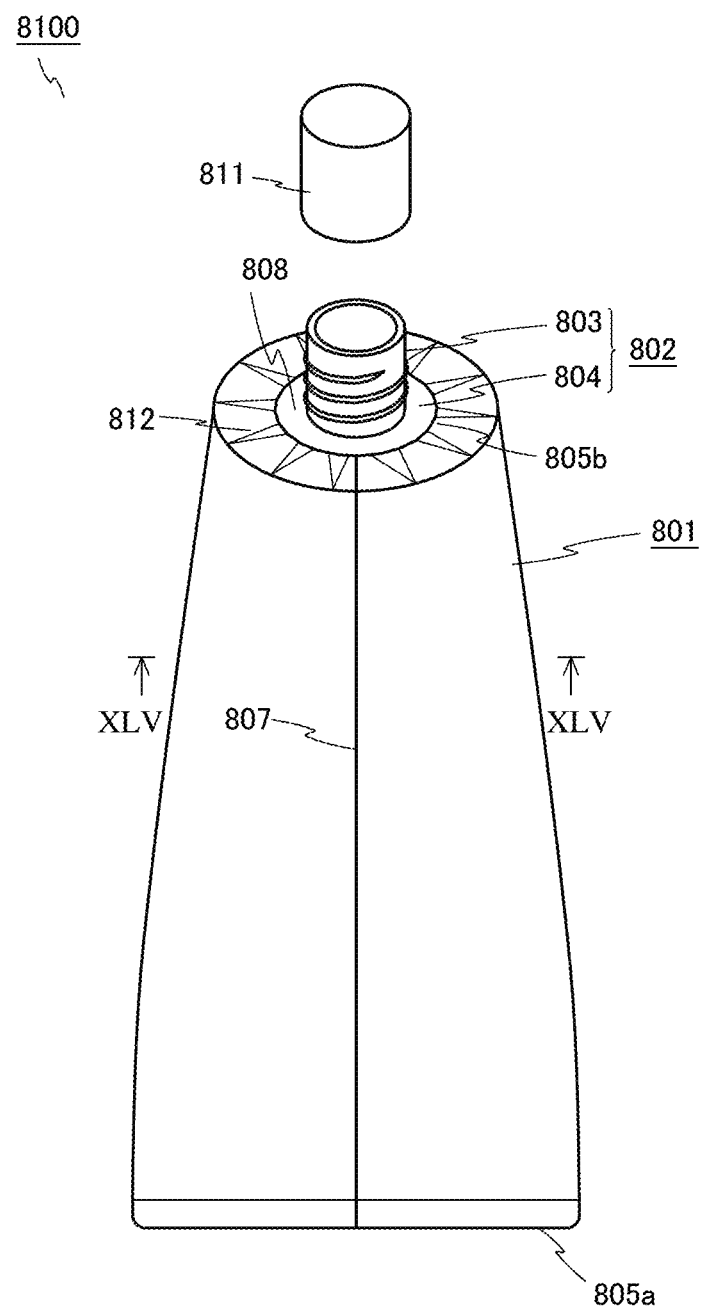
FIG. 44 is a front view showing a general structure of a tube container according to an eighth embodiment.
Figure 45:
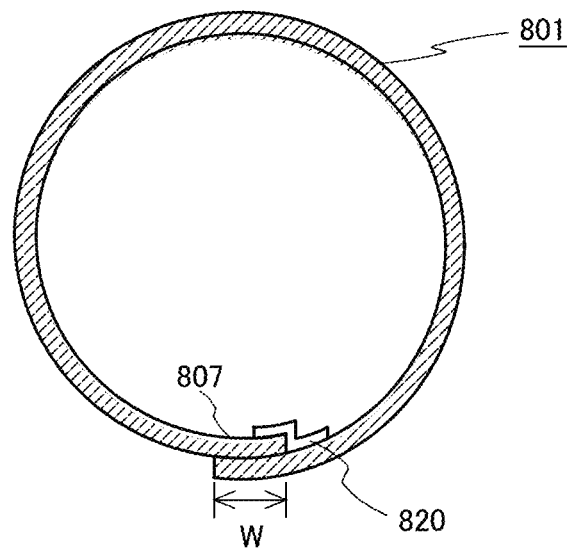
FIG. 45 is a cross-sectional view along line XLV-XLV shown in FIG. 44.
Figure 46:
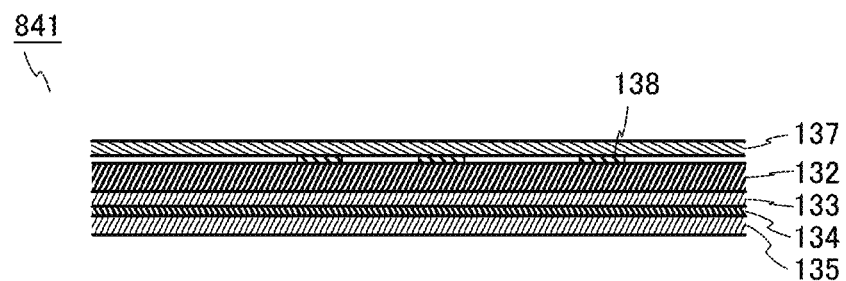
FIG. 46 is a cross-sectional view showing an example of the sheet constituting a body part of the tube container.

FIG. 44 is a front view showing a general structure of a tube container according to the embodiment, FIG. 45 is a cross-sectional view along line XLV-XLV shown in FIG. 44, and FIG. 46 is a cross-sectional view showing an example of a sheet constituting a body part of the tube container.

The tube container 8100 is provided with a tubular body part 801, a spout part 802 attached to the body part 801, and a tape material 820.

The body part 801 is a member for accommodating the contents, and is formed by rounding, into a tube, a sheet 841 having a pair of opposing end edges substantially parallel to each other. As the method of bonding both ends of the sheet 841, envelope sealing is used where the inner surface and the outer surface of the sheet 841 are bonded together with the tape material 820. One end part 805a of the body part 801 (the lower end in FIG. 1) is sealed to be closed. On the other hand, a part near the other end part 805b of the body part 801 (the upper end in FIG. 1) is sealed to an outer surface 808 of a flange part 804 described later, in a state of being folded. In the part where the body part 801 and the flange part 804 are welded, a plurality of pleats 812 formed by folding the sheet 841 constituting the body part 801 are formed. On the body part 801, an overlapping part 807 (back bonded part) is formed.

The overlapping part 807 is a part where to the outermost layer of a part within a predetermined range from one end edge of the sheet 841, the innermost layer of a part within a predetermined range from the other end edge is sealed. The width W of the overlapping part 807 in the circumferential direction of the body part 801 is 1.0 to 8.0 mm, and is preferably 1.0 to 3.0 mm. When the width of the overlapping part exceeds 8.0 mm, the overlapping part is so strong in stiffness that the pleats 812 protrude from the body part 801, which can impair appearance. When the width of the overlapping part 807 is less than 1.0 mm, the inner surface and the outer surface of the sheet 841 do not overlap because of variations in manufacture, so that the barrier property and durability of the tube container 8100 can be impaired.

The sheet 841 constituting the body part 801 of the tube container 8100 is a multilayer sheet where as shown in FIG. 46, the base film layer 133, the barrier layer 134 and the sealant layer 135 are laminated in this order on one surface side of the paper layer 132 and the ink layer 138 and the paper protection layer 137 are laminated on the other surface side of the paper layer 132. The order of lamination of the ink layer 138 and the paper protection layer 137 may be reverse, and an adhesive for bonding the layers may be used between the layers.

To the paper layer 132, the base film layer 133, the barrier layer 134, the sealant layer 135, the paper protection layer 137 and the ink layer 138, the configurations of the layers described in the first embodiment may be applied. The total thickness of the sheet 841 constituting the body part 801 and the content ratio of paper (pulp fiber) may be set within ranges similar to those of the first embodiment. One or more layers other than the paper layer 132 and the sealant layer 135 may be omitted from the sheet 841.

In the present embodiment, the basis weight of the paper used for the paper layer 132 is 30 to 300 g/m², and is preferably 50 to 150 g/m². Moreover, in the present embodiment, the sealant layer 135 is a layer provided for the welding between the tape material 820 and the body part 801 and the welding between the spout part 802 and the body part 801 in the overlapping part 807.

The paper protection layer 137 is a layer for protecting the paper layer 132 constituting the sheet 841 from the adhesion of the contents and dirt. While the material of the paper protection layer 137 is not specifically limited, by the paper protection layer 137 being formed of a material weldable to the sealant layer 135 of the body part 801, the sealant layer 135 and the paper protection layer 137 are completely welded in the overlapping part 807, the curling up of the overlapping part 807 can be suppressed, and the bather property and durability of the body part 801 can be enhanced. While the method of forming the paper protection layer 137 is not specifically limited, the paper protection layer 137 may be laminated by extrusion coating with a thermoplastic resin or by coating with a coating agent such as a water resisting agent or an oilproof agent. The thickness of the paper protection layer 137 is preferably 0.2 to 50 μm, and is more preferably 0.5 to 20 μm. When the thickness of the paper protection layer 137 is less than 0.2 μm, a pinhole can occur in the paper protection layer 137 and there are cases where the protection of the paper layer 132 is insufficient. Moreover, it is undesirable if the thickness of the paper protection layer 137 exceeds 50 μm from the aspect of the amount of use of the resin and the manufacturing cost. Even in a case where the paper protection layer 137 is not provided, there is no problem with the barrier property or the durability because the sealant layer 135 is falsely bonded to the surface of the paper layer 132 and further, the overlapping part 807 is reinforced by the tape material 820. However, as describe above, it is preferable to provide the paper protection layer 137 from the viewpoint of suppressing the curling up of the overlapping part 807 and further enhancing the barrier property and durability.

When the order of lamination of the ink layer 138 and the paper protection layer 137 is reverse to that in FIG. 46, an overcoat varnish layer may be laminated on the ink layer 138 to provide wear resistance.

(Tape Material)

The tape material 820 is formed of a film bondable to the sealant layer 135 and containing no adhesive, and is sealed to the inside of the body part 801 so as to cover the entire end edge of the sheet 841 situated on the innermost layer side of the body part 801. The tape material 820 is provided so that the center of the tape material 820 and the end edge of the sheet 841 situated on the innermost layer side substantially coincide with each other. While the material of the tape material 820 is not specifically limited, for example, the same material as that of the sealant layer 135 may be used. The tape material 820 may be a single layer or may have a structure where a plurality of layers are laminated as long as no adhesive is contained, for example, a single layer film formed of a resin having a heat sealability such as polyethylene or polypropylene, a coextrusion film of a resin having heat sealability, or a film where a resin having heat sealability is extrusion-laminated on another film.

Since the body part 801 of the tube container 8100 according to the present embodiment is formed by envelope sealing, the barrier property is ensured by the barrier layer 134 of the sheet 841. For this reason, it is unnecessary to bond the barrier layer to the tape material, and an adhesive for boding the barrier layer to the tape material is also unnecessary. As describe above, since the tape material 820 contains no adhesive, even when a tape material is used for bonding the body part 801, the elusion of the adhesive component of the tape material never occurs. Further, since the tape material 820 is provided so as to cover the end surface of the sheet 841 situated inside the body part 801, the end surface of the sheet 841 can be protected, so that the elution of the adhesive contained in the sheet 841 from the end surface into the tube container and the exudation of the contents of the tube container 8100 from the end surface to the paper layer 132 can be suppressed.

As described above, according to the present embodiment, the body part 801 is formed by envelope sealing where on the outermost layer of a part within a predetermined range from one end edge of the sheet 841, the innermost layer of a part within a predetermined range from the other end edge is placed. By doing this, the tube container 8100 can be provided that is high in the durability of the overlapping part 807, is high in aesthetics because the overlapping part 807 never protrudes from the body part 801, and is high in barrier property without the provision of a barrier layer on the tape material.

Moreover, even when envelop sealing is used for the formation of the body part 801, the tape material 820 protects the end surface of the sheet 841 situated inside the body part 801. Thereby, the elution of the adhesive contained in the sheet 841 from the end surface into the tube container and the exudation of the contents of the tube container 8100 from the end surface to the paper layer 132 can be suppressed.

Moreover, since the tape material 820 formed of a film containing no adhesive is used for the bonding by envelope sealing, the adhesive component of the tape material never elutes into the tube container.

Other Modifications

One or more of the following described in the above-described first embodiment may be applied to the second to eighth embodiments: the shape of the flange part of the spout part; the molding material and molding method of the spout part; the annular convex and concave parts provided on the flange part of the spout part; the dimensions of these convex and concave parts; the screw cap and the hinge cap detachably attachable to the spout tube part; the film that closes the spout tube part; and the partition wall and the pull ring provided for the spout tube part. The structures of the parts described in the first to eighth embodiments may be combined as appropriate, and the structure of a tube container as a combination of the embodiments is also embraced in the present disclosure.

EXAMPLES

Specific working examples of the present disclosure will now be described.

Examples and Comparative Examples for First Embodiment

Example 1-1

A transparent bather film (trade name: GL-RD by Toppan Inc.) having a thickness of 12 μm, and an unstretched polypropylene film (trade name: FHK2 by Futamura Chemical Co., Ltd.) having a thickness of 50 μm were attached in that order onto unbleached kraft paper (product of Oji Paper Co., Ltd.) having a basis weight of 100 g/m$^2$ by dry lamination using a two-pack curable urethane-based adhesive, to fabricate a sheet for formation of a body portion. The fabricated sheet was processed using a back bonded bag making machine to fabricate a 35 mm diameter×200 mm length tubular back bonded pouch (body portion).

The spout portion (spout) was fabricated by injection molding of a molding material including a blend of 49 mass % polypropylene and 51 mass % paper dust (trade name: MAPKA, product of Eco Research Institute Ltd.). The volume of the spout portion was 1.35 ml. On the outer surface of the flange portion of the spout portion, there were formed a raised portion with a height of 0.5 mm and a recessed portion with a depth of 0.3 mm adjacent to the outer side, in a concentric manner with the pouring cylinder portion.

A dedicated processing apparatus was used for heat welding of the body portion and spout portion to fabricate a tube container with a diameter of 35 mm.

Example 1-2

A tube container with a diameter of 35 mm was fabricated in the same manner as Example 1-1, except that the raised portion and recessed portion were not formed on the outer surface of the flange portion of the spout portion.

Example 1-3

A tube container with a diameter of 35 mm was fabricated in the same manner as Example 1-1, except that a transparent barrier film (trade name: GL-RD by Toppan Inc.) having a thickness of 12 µm, a stretched nylon film (trade name: ONBC by Unitika Ltd.) having a thickness of 15 µm and an unstretched polypropylene film (trade name: FHK2 by Futamura Chemical Co., Ltd.) having a thickness of 50 µm were attached in that order onto unbleached kraft paper (product of Oji Paper Co., Ltd.) having a basis weight of 120 g/m² by dry lamination using a two-pack curable urethane-based adhesive, to fabricate a sheet for formation of the body portion.

Example 1-4

A tube container with a diameter of 35 mm was fabricated in the same manner as Example 1-1, except that unbleached kraft paper (product of Oji Paper Co., Ltd.) having a basis weight of 120 g/m² was used.

Example 1-5

A tube container with a diameter of 35 mm was fabricated in the same manner as Example 1-1, except that the sheet for formation of the body portion was fabricated using unbleached kraft paper (product of Oji Paper Co., Ltd.) having a basis weight of 120 g/m², and the spout portion was fabricated by injection molding of a molding material including a blend of 70 mass % polypropylene and 30 mass % calcium carbonate.

Example 1-6

A tube container with a diameter of 35 mm was fabricated in the same manner as Example 1-1, except that the sheet for formation of the body portion was fabricated using unbleached kraft paper (product of Oji Paper Co., Ltd.) having a basis weight of 180 g/m².

Comparative Example 1-1

A transparent bather film (trade name: GL-RD by Toppan Inc.) having a thickness of 12 µm, a stretched nylon film (trade name: ONBC by Unitika Ltd.) having a thickness of 15 µm and an unstretched polypropylene film (trade name: FHK2 by Futamura Chemical Co., Ltd.) having a thickness of 100 µm were attached in that order by dry lamination using a two-pack curable urethane-based adhesive, to fabricate a sheet for formation of the body portion. The fabricated sheet was processed using a back bonded bag making machine to fabricate a 35 mm diameter×200 mm length tubular back bonded pouch (body portion).

The spout portion (spout) was fabricated by injection molding polypropylene (100 mass %). The volume of the spout portion was 1.35 ml. On the outer surface of the flange portion of the spout portion, there were formed a raised portion with a height of 0.5 mm and a recessed portion with a depth of 0.3 mm adjacent to the outer side, in a concentric manner with the pouring cylinder portion.

A dedicated processing apparatus was used for heat welding of the body portion and spout portion to fabricate a tube container with a diameter of 35 mm.

Comparative Example 1-2

A tube container with a diameter of 35 mm was fabricated in the same manner as Example 1-1, except that the sheet for formation of the body portion was fabricated using unbleached kraft paper (product of Oji Paper Co., Ltd.) having a basis weight of 250 g/m².

Comparative Example 1-3

A polyethylene film having a thickness of 60 µm, a polyethylene terephthalate film having a thickness of 12 µm, a polyethylene film having a thickness of 160 µm, a transparent barrier film (trade name: GL-RD by Toppan Inc.) having a thickness of 12 µm and a polyethylene film having a thickness of 100 µm were attached in that order by dry lamination using a two-pack curable urethane-based adhesive, to fabricate a sheet for formation of the body portion. The sheet was processed using a tubing machine for laminated tubes, to fabricate a tube container with a diameter of 35 mm. Using compression molding, the spout portion (shoulder portion) was molded of high-density polyethylene and simultaneously, the produced tube was welded to the spout portion, to fabricate the tube container with a diameter of 35 mm.

Comparative Example 1-4

A transparent bather film (trade name: GL-RD by Toppan Inc.) having a thickness of 12 µm, a stretched nylon film (trade name: ONBC by Unitika Ltd.) having a thickness of 15 µm and a linear low melting point polyethylene film (LLDPE, trade name: SE625A by Tamapoly Co., Ltd.) having a thickness of 60 µm were attached in that order by dry lamination using a two-pack curable urethane-based adhesive, to fabricate a film. The produced film and a spout produced by injection molding of high-density polyethylene were processed with a bag making machine equipped with a plug welder, to fabricate a gusset-type plug-equipped pouch.

The constructions of the containers of the Examples and Comparative Examples are shown in Table 1. The numerical values listed in the "Structure" column for the body portion in Table 1 are represented as paper basis weight (g/m²) or resin layer thickness (µm).

TABLE 1

| | Body portion Structure | Spout portion (Spout) | | | | | |
|---|---|---|---|---|---|---|---|
| | | Resin | Percentage (%) | Filler | Percentage (%) | Volume (ml) | Raised portion |
| Example1 | Paper 100/Barrier 12/CPP50 | PP | 49 | Paper dust | 51 | 1.35 | With |
| Example2 | Paper 100/Barrier 12/CPP50 | PP | 49 | Paper dust | 51 | 1.35 | Without |
| Example3 | Paper 120/Barrier 12/ONY15/CPP50 | PP | 49 | Paper dust | 51 | 1.35 | With |
| Example4 | Paper 120/Barrier 12/CPP50 | PP | 49 | Paper dust | 51 | 1.35 | With |
| Example5 | Paper 120/Barrier 12/CPP50 | PP | 60 | Calcium carbonate | 40 | 1.35 | With |
| Example6 | Paper 180/Barrier 12/CPP50 | PP | 49 | Paper dust | 51 | 1.35 | With |
| Comparative Example1 | Barrier 12/ONY15/CPP100 | PP | 100 | — | 0 | 1.35 | With |
| Comparative Example2 | Paper 250/Barrier 12/CPP50 | PP | 49 | Paper dust | 51 | 1.35 | With |
| Comparative Example3 | PE60/PET12/PE160/Barrier 12/PE100 (Laminated tube) | HDPE | 100 | — | 0 | 1.35 | — |
| Comparative Example4 | Barrier 12/ONY15/LLDPE60 (Plugged pouch) | HDPE | 100 | — | 0 | Not measured | With |

Table 2 shows the material compositions, resin masses used per container, body portion thicknesses, resin usage amounts, moldabilities, body portion self-support properties and overall evaluations for the containers of the Examples and Comparative Examples, respectively.

The resin usage amounts, moldabilities, body portion self-support properties and overall evaluations in Table 2 were determined on the following scales. The containers of Comparative Examples 1-3 and 1-4 differed in form from the containers of Examples 1-1 to 1-6, and therefore their moldabilities were not evaluated.

<Resin Usage Amount>
 ○: Highest mass ratio of paper in container mass
 x: Least high mass ratio of paper in container mass <Moldability>
 ◎: Processing of body portion with back bonded bag making machine and welding of body portion to spout portion were carried out without problem, and moldability was satisfactory.
 ○: Processing of body portion with back bonded bag making machine and welding of body portion to spout portion were carried out without problem and moldability was satisfactory, but due to poor takt, etc., productivity was somewhat inferior to "◎."
 x: Processing of body portion with back bonded bag making machine and welding of body portion to spout portion could not be carried out, or burning at welded sections occurred, creating problems for moldability.

<Self-Support>
 ○: Body portion was maintained without bending when the pouring cylinder portion of the container not filled with contents was pointed downwards.
 x: Not self-supporting.

<Overall Evaluation>
 ○: Resin usage amount, moldability and self-support property were all satisfactory (◎ or ○).
 x: Resin usage amount, moldability and self-support property were all poor (x).

TABLE 2

| | Material composition | | | Resin mass (g) | Body portion thickness (μm) | Resin usage amount | Moldability | Self-support | Overall evaluation |
|---|---|---|---|---|---|---|---|---|---|
| | Paper (%) | Resin (%) | Other (%) | | | | | | |
| Example1 | 46.1 | 42.1 | 11.8 | 2.3 | 180 | ○ | ◎ | ○ | ○ |
| Example2 | 46.1 | 42.1 | 11.8 | 2.3 | 180 | ○ | ◎ | ○ | ○ |
| Example3 | 47.2 | 42.7 | 10.1 | 2.8 | 215 | ○ | ◎ | ○ | ○ |
| Example4 | 50.7 | 38.5 | 10.8 | 2.3 | 200 | ○ | ◎ | ○ | ○ |
| Example5 | 44.5 | 43.0 | 12.6 | 3 | 200 | ○ | ◎ | ○ | ○ |
| Example6 | 59.8 | 30.8 | 9.4 | 2.3 | 260 | ○ | ○ | ○ | ○ |
| Comparative Example1 | 0 | 100 | 0 | 4.6 | 135 | X | ◎ | X | X |
| Comparative Example2 | 68.7 | 24.0 | 7.3 | 2.3 | 330 | ○ | X | — | X |
| Comparative Example3 | 0 | 100 | 0 | 9 | 350 | X | — | ○ | X |
| Comparative Example4 | 0 | 100 | 0 | 10 | 95 | X | — | X | X |

As shown in Table 2, all of the tube containers of Examples 1-1 to 1-6 had paper as the highest mass ratio of the container in its entirety and reduced resin usage amount, but by including paper with a basis weight of 30 to 200 g/m² in the sheet forming the body portion, stiffness was exhibited, thereby allowing the body portion to support itself even with a reduced amount of contents, and moldability with the processing apparatus was also satisfactory.

With the tube containers of Examples 1-1 and 1-3 to 1-6 which had raised portions and recessed portions in the flange portion of the spout portion, the body portions were more firmly welded to the flange portions, centered around the sections where the raised portions and recessed portions were provided, thereby producing greater seal strength for both, compared to Comparative Example 1-2 which did not have a raised portion and recessed portion.

In contrast, the tube container of Comparative Example 1-1 had the sheet forming the body portion constructed of a resin film, and it therefore had insufficient stiffness and did not allow self-support of the body portion when the contents were reduced. Also, since the body portion and spout portion were both formed of resin, it was not advantageous for reducing the resin usage amount.

In the tube container of Comparative Example 1-2, the paper included in the sheet forming the body portion was too thick, making it impossible to accomplish welding while back bonding the body portion or to weld the body portion to the spout portion. The tube container of Comparative Example 1-2 was unmoldable, and therefore the self-support property could not be evaluated.

The laminated tube of Comparative Example 1-3 had a large thickness of the laminated sheet of resin forming the body portion, and therefore the body portion could be self-supported with reduced contents, but more resin was used making it disadvantageous for reducing the resin usage amount.

The plug-equipped pouch of Comparative Example 1-4 had the sheet forming the body portion constructed of a resin film and therefore had insufficient stiffness, while it also lacked a container shape suitable for self-support and consequently did not allow self-support of the body portion when the contents were reduced. Also, since the body portion and spout portion were both formed of resin, it was not advantageous for reducing the resin usage amount.

Examples and Comparative Examples for Second Embodiment

Example 2-1

A transparent vapor deposition PET film (trade name: GL-ARH-F by Toppan Inc.) having a thickness of 12 μm, a biaxial stretched nylon film (ONBC by Unitika Ltd.) having a thickness of 15 μm, and a linear low melting point polyethylene film (LLDPE, trade name: SE620L by Tamapoly Co., Ltd.) having a thickness of 60 μm were attached in that order onto oil-resistant paper having a basis weight of 70 g/m² (product of Taiko Paper Mfg., Ltd.) using a two-pack curable dry laminate adhesive (trade name: TAKELAC (Registered trade mark) A626 and TAKENATE (Registered trade mark) A50 by Mitsui Chemicals, Inc.), to fabricate a sheet for construction of the body portion. The sheet was processed with a butt-seam sealing bag making machine, to fabricate a sleeve with a bag width of 55 mm, a length of 180 mm and a seal width of 8 mm.

Next, a transparent vapor deposition PET film (trade name: GL-ARH-F by Toppan Inc.) having a thickness of 12 μm and a linear low melting point polyethylene film (LL-DPE, trade name: SE620L by Tamapoly Co., Ltd.) having a thickness of 60 μm were attached in that order onto a surface on one side of cup base paper (product of Oji F-Tex Co., Ltd.) having a basis weight of 200 g/m² using a two-pack curable dry laminate adhesive (trade name: TAKELAC (Registered trade mark) A626 and TAKENATE (Registered trade mark) A50 by Mitsui Chemicals, Inc.). On a surface on the other side of the cup base paper, a film was formed of low melting point polyethylene (LDPE, trade name: L1850K by Asahi Kasei Corp.) to a thickness of 20 μm using an extruder, to fabricate a sheet for construction of a spout portion (cylinder portion and flat portion).

The sheet for construction of the spout portion was punched into a doughnut shape with an outer diameter of φ39 mm and an inner diameter of φ21 mm, a curling tool was used to curl the outer perimeter portion inward, and an ultrasonic sealing machine was used to compress the curl, fabricating a part for the flat portion having an outer diameter of 05 mm Separately, the sheet for construction of the spout portion was cut into an 88 mm width×40 mm length rectangle, the short side part was folded over to the opposite side (skived) and rolled into a tube shape, and the skived part was engaged and heat sealed to fabricate a tubular intermediate body with a diameter of φ21 mm. After fitting the above-described part for the flat portion into the tubular intermediate body, both ends of the tubular intermediate body were curled outward with a curl diameter of φ2 mm. One curl was compressed by ultrasonic sealing for integration with the member for the flat portion, to fabricate a paper spout portion (spout).

The spout portion was inserted into the above-described sleeve and the sleeve sheet was ultrasonically sealed while folding along the fold-over portion on the outer perimeter of the flat portion, mounting the body portion (sleeve) onto the flat portion of the spout portion.

A transparent vapor deposition PET film (trade name: GL-ARH-F by Toppan Inc.) having a thickness of 12 μm and an easy peel film (trade name: CF9501EA) by Toray Advanced Film Co., Ltd.) were attached using a two-pack curable dry laminate adhesive (trade name: TAKELAC (Registered trade mark) A626 and TAKENATE (Registered trade mark) A50 by Mitsui Chemicals, Inc.), to fabricate a top sealant. The top sealant was heat sealed to the open end of the cylinder portion of the spout portion to fabricate a paper tube container for Example 2-1.

Comparative Example 2-1

A laminated tube was fabricated using paper for the intermediate layer of the body portion, as Comparative Example 2-1.

Unbleached kraft paper (product of Oji Materia Co., Ltd.) having a basis weight of 50 g/m², a transparent vapor deposition PET film (trade name: GL-ARH-F by Toppan Inc.) having a thickness of 12 μm and a linear low melting point polyethylene film (LLDPE, trade name: SE620L by Tamapoly Co., Ltd.) having a thickness of 150 μm were attached in that order onto a surface on one side of a low melting point polyethylene film (LDPE, trade name: V-1 by Tamapoly Co., Ltd.) having a thickness of 130 μm using a two-pack curable dry laminate adhesive (trade name: TAKELAC (Registered trade mark) A626 and TAKENATE (Registered trade mark) A50 by Mitsui Chemicals, Inc.). Next, a surface on the other side of the LDPE film and a linear low melting point polyethylene film (LLDPE, trade name: SE620L by Tamapoly Co., Ltd.) having a thickness of 40 μm were sand laminated through polyethylene (SPE, trade name: L1850K by Asahi Kasei Corp.) having a thickness of 30 μm that had been extruded using an extruder, to fabricate a tubing supply roll.

A common laminated tube production apparatus was used to fabricate a sleeve (body portion) from the fabricated supply roll, and a shoulder portion was molded and integrated with the body portion by inline compression molding to fabricate a laminated tube for Comparative Example 2-1. The shoulder portion was molded using high-density polyethylene.

Comparative Example 2-2

A common resin laminated tube was fabricated as Comparative Example 2-2.

A biaxial stretched polyethylene terephthalate film (trade name: P60 by Toray Industries, Inc.) having a thickness of 12 μm, a transparent vapor deposition PET film (trade name: GL-ARH-F by Toppan Inc.) having a thickness of 12 μm and a linear low melting point polyethylene film (LLDPE, trade name: SE620L by Tamapoly Co., Ltd.) having a thickness of 150 μm were attached in that order onto a surface on one side of a low melting point polyethylene film (LDPE, trade name: V-1 by Tamapoly Co., Ltd.) having a thickness of 130 μm using a two-pack curable dry laminate adhesive (trade name: TAKELAC (Registered trade mark) A626 and TAKENATE (Registered trade mark) A50 by Mitsui Chemicals, Inc.). Next, a surface on the other side of the LDPE film and a linear low melting point polyethylene film (LLDPE, trade name: SE620L by Tamapoly Co., Ltd.) having a thickness of 40 μm were sand laminated through polyethylene (SPE, trade name: L1850K by Asahi Kasei Corp.) having a thickness of 30 μm that had been extruded using an extruder, to fabricate a tubing supply roll.

A common laminated tube production apparatus was used to fabricate a sleeve (body portion) from the fabricated supply roll, and a shoulder portion was molded and integrated with the body portion by inline compression molding to fabricate a laminated tube for Comparative Example 2-2. The shoulder portion was molded using high-density polyethylene.

Table 3 shows the paper ratios, presence or absence of barrier properties, opening unsealabilities, disposal properties and overall evaluations for the tube containers of Example 2-1 and Comparative Examples 2-1 and 2-2. The paper ratio in Table 3 is the mass ratio (mass %) of paper in the mass of the tube container in its entirety. The barrier property evaluation was assigned "⊚" if both the body portion and shoulder portion (spout portion) had a barrier property, and otherwise "x." The opening unsealability was assigned "⊚" if the top sealant was easy to unseal and otherwise "x", with "-" indicating that it was not evaluated. The recycling property was assigned "⊚" if it was recyclable as paper, and otherwise "x." The overall evaluation was assigned "○" if all of the evaluations of barrier property, opening unsealability and recycling property were "⊚", and otherwise "x."

TABLE 3

|  | Example Paper tube container | Comparative Example 1 Laminated tubeusing paper in intermediate layer of body portion | Comparative Example 2 Plastic laminated tube |
|---|---|---|---|
| Paper ratio (mass %) | 64.4% | 9.8% | 0% |
| Barrier property | ⊚ | X | X |

TABLE 3-continued

|  | Example Paper tube container | Comparative Example 1 Laminated tubeusing paper in intermediate layer of body portion | Comparative Example 2 Plastic laminated tube |
|---|---|---|---|
| Body portion | ○ | ○ | ○ |
| Shoulder portion (spout portion) | ○ | X | X |
| Opening unsealability | ⊚ | — | — |
| Recycling property | ⊚ | X | X |
| Overall evaluation | ○ | X | X |

As shown in Table 3, the paper tube container of Example 2-1 had a paper ratio exceeding 50% of the total mass of the container, and it was recyclable as paper. By using barrier films for the sheet for construction of the body portion and the sheet for construction of the spout portion, it was possible to impart barrier properties to both the body portion and spout portion. By sealing a top sealant including a laminated barrier film and easy peel film on the spout portion, it was possible to maintain the sealed state of the contents before unsealing, thus facilitating removal of the top sealant. The paper tube container of this Example therefore had excellent sealing performance while being constructed of a sheet composed mainly of paper.

The laminated tube of Comparative Example 2-1 had a paper layer on the intermediate layer of the sheet forming the body portion, and therefore the body portion appeared outwardly to be made of paper, but since the actual paper ratio was less than 10%, it was not possible to reduce the amount of plastic usage and it was necessary to dispose of it as a plastic container. The laminated tube of Comparative Example 2-2 had a plastic ratio of 100%, and consequently it was not possible to reduce the amount of plastic usage and it was necessary to dispose of it as a plastic container. The laminated tubes of Comparative Examples 2-1 and 2-2 had the shoulder portions formed of HDPE, and consequently the shoulder portions could not be imparted with a barrier property. Moreover, since the spout of the shoulder portion was not provided with a top sealant, the sealability before unsealing was poor compared to the paper container of Example 2-1.

Examples and Comparative Examples for Third Embodiment

Example 3-1

A transparent bather film (trade name: GL-RD by Toppan Inc.) having a thickness of 12 μm, and a linear low melting point polyethylene film (LLDPE, trade name: SE620A by Tamapoly Co., Ltd.) having a thickness of 50 μm were attached in that order onto unbleached kraft paper (product of Oji Paper Co., Ltd.) having a basis weight of 100 g/m² by dry lamination using a two-pack curable urethane-based adhesive. On the other surface of the paper, a printed ink layer and an overcoat varnish layer were formed, and a heat-weldable coating agent including a thermoplastic resin was pattern coated over the region where the back bonded seal portion and body portion overlapped, and the region which was to be folded when the body portion was sealed to the flange portion of the spout portion (hatched region in FIG. 16). The coating amount of the heat-weldable coating agent was 10 g/m². The sheet with the heat-weldable coating layer formed was processed using a back bonded bag making machine to fabricate a 35 mm diameter×200 mm length back bonded pouch (body portion).

The spout portion (spout) was fabricated by injection molding polyethylene.

A dedicated processing apparatus was used for heat welding of the body portion and spout portion to fabricate a tube container with a diameter of 35 mm.

Example 3-2

A tube container with a diameter of 35 mm was fabricated in the same manner as Example 3-1, except that the coating amount of the heat-weldable coating agent was 1 g/m².

Example 3-3

A tube container with a diameter of 35 mm was fabricated in the same manner as Example 3-1, except that the coating amount of the heat-weldable coating agent was 20 g/m².

Example 3-4

A tube container with a diameter of 35 mm was fabricated in the same manner as Example 3-1, except that the heat-weldable coating agent was coated over the entire sheet.

Comparative Example 3-1

A tube container with a diameter of 35 mm was fabricated in the same manner as Example 3-1, except that the heat-weldable coating agent was not coated.

Comparative Example 3-2

A tube container with a diameter of 35 mm was fabricated in the same manner as Example 3-1, except that the coating amount of the heat-weldable coating agent was 0.1 g/m².

Table 4 shows the paper basis weights, heat-weldable coating agent coating amounts and coating modes for each of the Examples and Comparative Examples, together with the bag-making suitability (machining compatibility), body portion stiffness and paper curling evaluation results.

For Table 4, the bag-making suitability (machining compatibility), body portion stiff feel and paper curling were evaluated on the following scales. The "-" symbols in Table 4 indicate that evaluation was not made.

<Bag-Making Suitability (Machining Compatibility)>
  ○: Satisfactory machining compatibility when processing body portion with bag making machine.
  Δ: Slight reduction in machining compatibility due to increased frictional coefficient, but not problematic.
  x: Excessively high frictional coefficient causing poor slidability and thus difficult processing with bag making machine.

<Body Portion Stiff Feel>
  ○: Improvement in stiff feel by back bonded seal portion was felt.
  x: Improvement in stiff feel by back bonded seal portion was not felt.

<Paper Curling>
  ⊚: No paper curling, integration of overlapped portions of sheet.
  ○: No paper curling but overlapped portions of sheet appeared slightly risen.
  x: Paper curling

TABLE 4

| | Paper basis weight (g/m²) | Heat-weldable coating agent | | Bag-making suitability | Body portion stiff feel | Paper curling | |
|---|---|---|---|---|---|---|---|
| | | Coating amount (g/m²) | Mode | | | Body portion | Shoulder portion |
| Example1 | 100 | 10 | Pattern | ○ | ⊚ | ⊚ | ⊚ |
| Example2 | 100 | 1 | Pattern | ○ | ⊚ | ○ | ○ |
| Example3 | 100 | 20 | Pattern | ○ | ⊚ | ⊚ | ⊚ |
| Example4 | 100 | 10 | Full coverage | Δ | ○ | ○ | ○ |
| Comparative Example1 | 100 | 0 | Without | ○ | X | X | X |
| Comparative Example2 | 100 | 0.1 | Pattern | ○ | X | X | X |

As shown in Table 4, the tube containers of Examples 3-1 to 3-4 had no paper curling at the back bonded seal portion and shoulder portion (the part of the body portion welded to the flange portion) of the body portion, and had a high aesthetic quality. By welding the back bonded seal portion to the body portion, the rigidity of the body portion was increased and the stiff feel of the body portion was felt higher. For Examples 3-1 to 3-4, the bag-making suitability during formation of the body portion was also satisfactory.

The tube container of Comparative Example 3-1 did not have a heat-weldable coating layer, and therefore the back bonded seal portion and shoulder portion (the part of the body portion welded to the flange portion) of the body portion both exhibited paper curling. Also, in the tube container of Comparative Example 3-2, the back bonded seal portion and shoulder portion (the part of the body portion welded to the flange portion) of the body portion both exhibited paper curling since the coating amount of the heat-weldable coating agent was too low. Therefore, the tube containers of Comparative Examples 3-1 and 3-2 were inferior to Examples 3-1 to 3-4 in terms of aesthetic quality. Moreover, since the back bonded seal portion was not welded to the body portion, the stiff feel of the body portion was also lower compared to Examples 3-1 to 3-4.

Examples and Comparative Examples for Fourth Embodiment

The present inventors conducted a test to confirm the state of curling of the sealed portion of the body portion for tube shape formation, the presence or absence of infiltration of contents into the paper layer, and state of liquid leakage from the welded part of the spout portion, using the tube-like containers of Examples 4-1 to 4-4 and Comparative Examples 4-1 and 4-2. Examples 4-1 to 4-4 and Comparative Examples 4-1 and 4-2 all composed of a body portion and a spout portion, with the structure and materials of the spout portion the same as the spout portion used in the tube-like container of the first embodiment described above. The method of mounting the spout portion onto the body portion and the method of bonding together the laminated sheets of the bottom portion for Examples 4-1 to 4-4 and Comparative Examples 4-1 and 4-2 were the same as for the tube-like container of the first embodiment described above.

The structures of the body portions of Examples 4-1 to 4-4 and Comparative Examples 4-1 and 4-2 will now be described.

Example 4-1

A linear low-density polyethylene resin (LLDPE) film (trade name: SE620A by Tamapoly Co., Ltd.) (50 μm) and an inorganic vapor deposition polyethylene terephthalate film (trade name: GL-RD, Toppan Inc.) (12 μm) were laminated in that order from the innermost layer side, and a dry laminating adhesive was used for dry lamination to fabricate an inner side laminated film. The adhesive used was a two-pack curable urethane-based adhesive (base compound A626/curing agent A5, product of Mitsui Chemicals, Inc.).

A low-density polyethylene resin (LDPE) film (trade name: LC600A by Japan Polyethylene Corporation) (15 μm) and a polyethylene terephthalate (PET) film (trade name: P60 by Toray Industries, Inc.) (12 μm) were laminated in that order from the outermost layer side, and formed by extruder lamination to fabricate an outer side laminated film.

The above-described inner side laminated film was attached by extruder lamination onto one surface of an unbleached kraft (unbleached light wrapping paper, product of Oji Materia Co., Ltd.) (70 g/m$^2$) while the above-described outer side laminated film was attached onto the opposite side, using SPE (trade name: NOVATEC LC600A, product of Japan Polyethylene Corporation) (15 μm), to complete a laminated sheet for formation of a body portion.

When laminating the unbleached kraft, inner side laminated film and outer side laminated film, unbleached kraft with a 110 mm width provided with multiple line stripes was attached between the entire surfaces of the inner side laminated film and outer side laminated film in the widthwise direction. With the unbleached kraft part at the center, it was slitted so as to form 8 mm parts of the film alone at both side parts. The method of forming the tube shape was the same as the method for formation of the tube shape for the body portion of the tube-like container of the first embodiment described above.

Example 4-2

A linear low-density polyethylene resin (LLDPE) film (trade name: SE620A by Tamapoly Co., Ltd.) (50 μm) and an inorganic vapor deposition polyethylene terephthalate film (trade name: GL-RD, Toppan Inc.) (12 μm) were laminated in that order from the innermost layer side, and a dry laminating adhesive was used for dry lamination to fabricate an inner side laminated film. The adhesive used was a two-pack curable urethane-based adhesive (base compound A626/curing agent A5, product of Mitsui Chemicals, Inc.).

The above-described inner side laminated film was attached by extruder lamination onto one surface of an unbleached kraft (unbleached light wrapping paper, product of Oji Materia Co., Ltd.) (70 g/m$^2$) using SPE (trade name: NOVATEC LC600A, product of Japan Polyethylene Corporation) (15 μm), while a monolayer of low-density polyethylene resin (LDPE) (trade name: LC600A, product of Japan Polyethylene Corporation) (15 μm) was attached in the same manner to the opposite side by extruder lamination, to complete a laminated sheet for formation of a body portion.

When laminating the unbleached kraft, inner side laminated film and low-density polyethylene resin (LDPE) monolayer, unbleached kraft with a 110 mm width provided with multiple line stripes was attached over the entire surface of the inner side laminated film and low-density polyethylene resin (LDPE) monolayer in the widthwise direction. With the unbleached kraft part at the center, it was slitted so as to form 8 mm parts of the film alone at both side parts. The method of forming the tube shape was the same as the method for formation of the tube shape in Example 4-1.

Example 4-3

A linear low-density polyethylene resin (LLDPE) film (trade name: SE620A by Tamapoly Co., Ltd.) (50 μm), an aluminum foil (7 μm) and a polyethylene terephthalate (PET) film (trade name: P60 by Toray Industries, Inc.) (12 μm) were laminated in that order from the innermost layer side, and a dry laminating adhesive was used for dry lamination to fabricate an inner side laminated film. The adhesive used was a two-pack curable urethane-based adhesive (base compound A626/curing agent A5, product of Mitsui Chemicals, Inc.).

The above-described inner side laminated film was attached by extruder lamination onto one surface of an unbleached kraft (unbleached light wrapping paper, product of Oji Materia Co., Ltd.) (70 g/m²) using SPE (trade name: NOVATEC LC600A, product of Japan Polyethylene Corporation) (15 μm), while a monolayer of low-density polyethylene resin (LDPE) (trade name: LC600A, product of Japan Polyethylene Corporation) (15 μm) was attached in the same manner to the opposite side by extruder lamination, to complete a laminated sheet for formation of a body portion.

When laminating the unbleached kraft, inner side laminated film and low-density polyethylene resin (LDPE) monolayer, unbleached kraft with a 110 mm width provided with multiple line stripes was attached over the entire surface of the inner side laminated film and low-density polyethylene resin (LDPE) monolayer in the widthwise direction. With the unbleached kraft part at the center, it was slitted so as to form 8 mm parts of the film alone at both side parts. The method of forming the tube shape was the same as the method for formation of the tube shape in Example 4-1.

Example 4-4

An EMAA resin (trade name: AN4228C by Dow-Mitsui Polychemicals Co., Ltd.) (50 μm) and an inorganic vapor deposition polyethylene terephthalate film (trade name: GL-RD by Toppan Inc.) (12 μm) were laminated in that order from the innermost layer side and attached by extruder lamination to fabricate an inner side laminated film.

The above-described inner side laminated film was attached by extruder lamination onto one surface of unbleached kraft (unbleached light wrapping paper by Oji Materia Co., Ltd.) (70 g/m²) using an EMAA resin (trade name: AN4228C by Dow-Mitsui Polychemicals Co., Ltd.) (15 μm), and an EMAA resin (trade name: AN4228C by Dow-Mitsui Polychemicals Co., Ltd.) (15 μm) was formed as a monolayer on the opposite side, to complete a laminated sheet for formation of a body portion.

When laminating the unbleached kraft, inner side laminated film and EMAA resin monolayer, unbleached kraft with a 110 mm width provided with multiple line stripes was attached over the entire surface of the inner side laminated film and EMAA resin monolayer in the widthwise direction. With the paper layer part at the center, it was slitted so as to form 8 mm parts of the film alone at both side parts. The method of forming the tube shape was the same as the method for formation of the tube shape in Example 4-1.

Comparative Example 4-1

A laminated sheet for formation of a body portion was completed by attachment with the same laminated structure as Example 4-1. When laminating the unbleached kraft, inner side laminated film and outer side laminated film, however, the unbleached kraft was attached to the inner side laminated film and outer side laminated film over the entire width in the widthwise direction, and the end surfaces of the unbleached kraft were exposed at both end edges of the body portion-forming blank with striped slits formed in the height direction of the body portion.

The method of forming the tube shape was the same as the method for formation of the tube shape in Example 4-1.

Comparative Example 4-2

The laminated structure of the laminated sheet forming the body portion and the structure of the body portion-forming blank with the end surfaces of the unbleached kraft exposed at both end edges of the body portion-forming blank were the same as in Comparative Example 4-1.

The method of forming the tube shape differed from Comparative Example 4-1 in that the tube shape was formed by a butt-seam sealing method in which the linear low-density polyethylene resin (LLDPE) films on the innermost layer were attached together.

(Test Method)

For the tube-like containers of Examples 4-1 to 4-4 and Comparative Examples 4-1 and 4-2, it was visually determined whether or not the sealed portion of the body portion for formation of the tube shape curved and the outer appearance was impaired.

For the tube-like containers of Examples 4-1 to 4-4 and Comparative Examples 4-1 and 4-2, butter was filled as the contents and stored at 40° C. for 2 weeks, and it was confirmed whether or not oil staining was produced in the unbleached kraft, i.e., paper.

The tube-like containers of Examples 4-1 to 4-4 and Comparative Examples 4-1 and 4-2 were subjected to ultrasonic welding under the same conditions as described below and liquid leakage from the spout portion was confirmed using a check liquid.

Conditions: Outgoing time: 0.3 sec, hold time: 0.3 sec, vibrational frequency: 30 kHz Liquid leakage from the spout portion was confirmed for 100 tube-like containers each from Examples 4-1 to 4-4 and Comparative Examples 4-1 and 4-2, and the number of tube-like containers with liquid leakage out of the 100 (leakage number/evaluated number) was confirmed.

(Test Results and Discussion)

The test results for the test methods described above are shown in Table 5.

In Table 5, the evaluation item "Body portion sealed portion curling" lists curling of the sealed portion of the body portion for formation of the tube shape, with "○" indicating satisfactory outer appearance due to absence of curling, and "x" indicating poor outer appearance due to presence of curling. The "paper layer" in the heading of the evaluation item "Infiltration of contents into paper layer" is unbleached kraft, with "○" indicating no infiltration of contents into the paper layer of the body portion and "x" indicating infiltration of contents into the paper layer of the body portion. In the evaluation item "Liquid leakage from welded part of spout portion", "○" indicates no cases with liquid leakage, and "x" indicates one or more cases with liquid leakage. For "Overall evaluation", "○" indicates satisfactory overall judgment for the respective evaluations described above, and "x" indicates unsatisfactory overall judgment for the respective evaluations described above.

The numerical values listed in the "Structure" column for the laminated sheet in Table 5 are represented as paper basis weight (g/m²), resin thickness (μm) or aluminum foil thickness (μm).

Examples 4-1 to 4-4 had satisfactory outer appearance without curling of the sealed portion of the body portion for formation of the tube shape, had no infiltration of contents into paper layer of the body portion (no oil staining), and also had no cases with liquid leakage at the welded portion of the spout portion among the 100 tube-like containers.

Comparative Example 4-1, on the other hand, while having no curling of the sealed portion of the body portion for formation of the tube shape, exhibited infiltration of contents into the paper layer of the body portion (oil staining), and had 10 cases with liquid leakage at the welded portion of the spout portion among the 100 tube-like containers. Comparative Example 4-2 had no infiltration of contents into the paper layer of the body portion (no oil staining), but had curling of the sealed portion of the body portion for formation of the tube shape, and had 30 cases with liquid leakage at the welded portion of the spout portion among the 100 tube-like containers.

These test results show that the tube-like containers using body portions that had parts including the parts of the film alone without exposing the end surfaces of the paper layer at both end edges of the slitted laminated sheet forming the body portion, and with the outermost layer and innermost layer surfaces at both end edges overlapping to form the tube shapes, had satisfactory outer appearance and prevented infiltration of contents into the paper layer, while also having satisfactory sealing properties.

with a peeling strength of 0.50 N/15 mm and a thickness of 30 μm (manufactured by DIC Corporation, product name: E3701T), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive, whereby a sheet for body part formation was formed so that the peeling strength between the unbleached kraft paper and the transparent bather film was 0.50 N/15 mm.

TABLE 5

| Laminated sheet | Structure | Example 1 LLDPE(50)/ Inorganic vapor deposited PET(12)/ SPE(15)/ Paper(70)/ SPE(15)/ PET(12)/ LDPE(15) | Example 2 LLDPE(50)/ Inorganic vapor deposited PET(12)/ SPE(15)/ Paper(70)/ LDPE(15) | Example 3 LLDPE(50)/ AL(7)/ PET(12)/ SPE(15)/ Paper(70)/ LDPE15 | Example 4 EMAA(50)/ Inorganic vapor deposited PET(12)/ PET(12)/ EMAA(15)/ Paper(70)/ EMAA(15) | Comparative Example 1 Same as Example 1 | Comparative Example 2 Same as Example 1 |
|---|---|---|---|---|---|---|---|
| Both end edges of blank for body portion formation | Edge surface of paper layer | Not exposed | Not exposed | Not exposed | Not exposed | Exposed | Exposed |
| Body portion | Tube shape forming method | Envelope-like sealing | Envelope-like sealing | Envelope-like sealing | Envelope-like sealing | Envelope-like sealing | Butt-seam sealing |
| Evaluation item | Body portion sealed portion curling | ○: No | ○: No | ○: No | ○: No | ○: No | x: Yes |
| | Infiltration of contents into paper layer | ○: No | ○: No | ○: No | ○: No | x: Yes | ○: No |
| | Liquid leakage from welded part of spout portion | ○ (0/100) | ○ (0/100) | ○ (0/100) | ○ (0/100) | x (10/100) | x (30/100) |
| Overall evaluation | | ○ | ○ | ○ | ○ | x | x |

As above, for the body portion of the tube-like container of the fourth embodiment, at both facing end edges of the body portion-forming blanks each made of a laminated sheet in which the innermost layer and outermost layer are thermoplastic resin layers and a paper layer is included in the intermediate layer, the end surfaces of the paper layer are not exposed. Since both end edges of the body portion-forming blank where the end surfaces of the paper layer are not exposed are overlapping to form the tube shape, the end surfaces of the paper layer are not exposed inside the body portion of the tube-like container, and the contents do not contact with the end surfaces of the paper layer. Furthermore, in the body portion of the tube-like container of the fourth embodiment, both facing end edges of the body portion-forming blanks are heat-sealed with the outermost layer and innermost layer surfaces overlapping. The outer appearance is therefore satisfactory since the sealed portion of the body portion does not have a thickness such as the thickness in the case of butt-seam sealing, for example.

Examples and Comparative Examples of the Fifth Embodiment

Example 5-1

On unbleached kraft paper with a basis weight of 100 g/m² (manufactured by Ohji Paper Co., Ltd.), an EP material The formed sheet was laminated with an ink layer and an overcoat varnish layer, and processed with a backlining back-making machine, thereby forming a backlining pouch (body part) with a diameter of 35 mm and a length of 180 mm.

The spout part was molded by injection molding by using a polyethylene resin.

By heat-welding the formed body part and spout part by using a dedicated processing device, a tube container with a diameter of 35 mm was formed.

Example 5-2

A tube container with a diameter of 35 mm was formed similarly to Example 5-1 except for the following: On unbleached kraft paper with a basis weight of 100 g/m² (manufactured by Ohji Paper Co., Ltd.), an EP material with a peeling strength of 1 N/15 mm and a thickness of 30 μm (manufactured by DIC Corporation, product name: E3701T), a PET film with a thickness of 12 μm (manufactured by Toray Industries, Inc., product name: E5100), an aluminum foil with a thickness of 9 μm (manufactured by Toyo Aluminum K.K.) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive, whereby a sheet for body part formation was formed so that the peeling strength between the unbleached kraft paper and the PET film was 1 N/15 mm.

Example 5-3

A tube container with a diameter of 35 mm was formed similarly to Example 5-1 except for the following: On unbleached kraft paper with a basis weight of 100 g/m² (manufactured by Ohji Paper Co., Ltd.), an EP material with a peeling strength of 3.1 N/15 mm and a thickness of 30 μm (manufactured by DIC Corporation, product name: E3701T), a drawn nylon film with a thickness of 15 μm (manufactured by Unitika Ltd., product name: ONBC), an aluminum foil with a thickness of 9 μm (manufactured by Toyo Aluminum K.K.) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive, whereby a sheet for body part formation was formed so that the peeling strength between the unbleached kraft paper and the drawn nylon film was 1 N/15 mm.

Example 5-4

A tube container with a diameter of 35 mm was formed similarly to Example 5-1 except for the following: On unbleached kraft paper with a basis weight of 100 g/m² (manufactured by Ohji Paper Co., Ltd.), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, pattern-coating with a silicon-based stripping varnish was provided between the unbleached kraft paper and the transparent barrier film so that the peeling strength between the unbleached kraft paper and the transparent barrier film was 0.70 N/15 mm, whereby a sheet for body part formation was formed.

Example 5-5

A tube container with a diameter of 35 mm was formed similarly to Example 5-1 except for the following: On unbleached kraft paper with a basis weight of 100 g/m² (manufactured by Ohji Paper Co., Ltd.), an aluminum foil with a thickness of 9 μm (manufactured by Toyo Aluminum K.K.), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, pattern-coating with a silicon-based stripping varnish was provided between the unbleached kraft paper and the aluminum foil so that the peeling strength between the unbleached kraft paper and the aluminum foil was 1.2 N/15 mm, whereby a sheet for body part formation was formed.

Example 5-6

A tube container with a diameter of 35 mm was formed similarly to Example 5-1 except for the following: On unbleached kraft paper with a basis weight of 100 g/m² (manufactured by Ohji Paper Co., Ltd.), an aluminum foil with a thickness of 9 μm (manufactured by Toyo Aluminum K.K.), a PET film with a thickness of 12 μm (manufactured by Toray Industries, Inc., product name: E5100) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, pattern-coating with a silicon-based stripping varnish was provided between the unbleached kraft paper and the aluminum foil so that the peeling strength between the unbleached kraft paper and AL was 2.5 N/15 mm, whereby a sheet for body part formation was formed.

Example 5-7

A tube container with a diameter of 35 mm was formed similarly to Example 5-1 except for the following: On unbleached oil resistant paper with a basis weight of 100 g/m² (manufactured by Taiko Paper Mfg. Ltd.), an aluminum foil with a thickness of 9 μm (manufactured by Toyo Aluminum K.K.), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, pattern-coating with a silicon-based stripping varnish was provided between the unbleached kraft paper and the aluminum foil so that the peeling strength between the unbleached kraft paper and the aluminum foil was 6 N/15 mm, whereby a sheet for body part formation was formed.

Example 5-8

A tube container with a diameter of 35 mm was formed similarly to Example 5-1 except for the following: On unbleached kraft paper with a basis weight of 100 g/m² (manufactured by Ohji Paper Co., Ltd.), a PET film with a thickness of 12 μm (manufactured by Toray Industries, Inc., product name: E5100), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, using a removable adhesive (manufactured by Toyochem Co., Ltd., product name: CYABINE SP-205), lamination was provided between the PET film and the transparent barrier film with an application amount of 10 g/m (dry) so that the peeling strength was 0.70 N/15 mm, whereby a sheet for body part formation was formed.

Example 5-9

A tube container with a diameter of 35 mm was formed similarly to Example 5-1 except for the following: On a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and the glossy surface of machine-glazed unbleached kraft paper with a smoothness of 20 to 300 seconds and a basis weight of 100 g/m² (manufactured by Ohji Paper Co., Ltd.) and the transparent barrier film were bonded with a polyolefin-based resin with a thickness of 5 to 100 μm so that the peeling strength between the unbleached kraft paper and the transparent barrier film was 1.4 N/15 mm, whereby a sheet for body part formation was formed.

Example 5-10

A tube container with a diameter of 35 mm was formed similarly to Example 5-1 except for the following: On a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and the glossy surface of unbleached oil resistant paper with a smoothness of 20 to 300 seconds and a basis weight of 100 g/m² (manufactured by Taiko Paper Mfg. Ltd.) and the transparent barrier film were bonded with a polyolefin-based resin with a thickness of 5 to 100 μm so that the peeling strength between the unbleached oil resistant paper and the transparent barrier film was 2.8 N/15 mm, whereby a sheet for body part formation was formed.

Comparative Example 5-1

On unbleached kraft paper with a basis weight of 100 g/m² (manufactured by Ohji Paper Co., Ltd.), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive. When this was done, the application amount between the unbleached kraft paper and the transparent barrier film was 2 g/m² (dry), and the application amount in other parts was 5 g/m² (dry). A tube container with a diameter of 35 mm was formed similarly to Example 5-1 except that a sheet for body part formation was formed while a process of providing an easy-to-peel property was omitted.

Comparative Example 5-2

On unbleached kraft paper with a basis weight of 100 g/m² (manufactured by Ohji Paper Co., Ltd.), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive. When this was done, the application amount between the unbleached kraft paper and the transparent barrier film was 7 g/m² (dry), and the application amount in other parts was 5 g/m² (dry). A tube container with a diameter of 35 mm was formed similarly to Example 5-1 except that a sheet for body part formation was formed while a process of providing an easy-to-peel property was omitted.

Comparative Example 5-3

A tube container with a diameter of 35 mm was formed similarly to Example 5-1 except for the following: On unbleached kraft paper with a basis weight of 100 g/m² (manufactured by Ohji Paper Co., Ltd.), an EP material with a peeling strength of 0.35 N/15 mm and a thickness of 30 μm (manufactured by DIC Corporation, product name: E3701T), a drawn nylon film with a thickness of 15 μm (manufactured by Unitika Ltd., product name: ONBC), an aluminum foil with a thickness of 9 μm (manufactured by Toyo Aluminum K.K.) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive so that the peeling strength between the unbleached kraft paper and the transparent barrier film was 0.35 N/15 mm, whereby a sheet for body part formation was formed.

Comparative Example 5-4

A tube container with a diameter of 35 mm was formed similarly to Example 5-1 except for the following: On unbleached kraft paper with a basis weight of 100 g/m² (manufactured by Ohji Paper Co., Ltd.), an aluminum foil with a thickness of 9 μm (manufactured by Toyo Aluminum K.K.), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, pattern-coating with a silicon-based stripping varnish was provided between the unbleached kraft paper and the aluminum foil so that the peeling strength between the unbleached kraft paper and the aluminum foil was 13 N/15 mm, whereby a sheet for body part formation was formed.

Comparative Example 5-5

A tube container with a diameter of 35 mm was formed similarly to Example 5-1 except for the following: On unbleached kraft paper with a basis weight of 100 g/m² (manufactured by Ohji Paper Co., Ltd.), a PET film with a thickness of 12 μm (manufactured by Toray Industries, Inc., product name: E5100), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive and at this time, using a removable adhesive (manufactured by Toyochem Co., Ltd., product name: CYABINE SP-205), lamination was provided between the PET film and the transparent barrier film with an application amount of 30 g/m (dry) so that the peeling strength was 12 N/15 mm, whereby a sheet for body part formation was formed.

Comparative Example 5-6

A tube container with a diameter of 35 mm was formed similarly to Example 5-1 except for the following: On a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LL-DPE, manufactured by Tamapoly Co., Ltd., product name: SE625N) were bonded together in this order by dry lamination by using a two-component curing type urethane-based adhesive and unbleached kraft paper with a smoothness of less than 5 to 20 seconds and a basis weight of 100 g/m$^2$ (manufactured by Ohji Paper Co., Ltd.) and the transparent bather film were bonded with a polyolefin-based resin with a thickness of 5 to 100 μm so that the peeling strength between the unbleached kraft paper and the transparent bather film was 0.35 N/15 mm, whereby a sheet for body part formation was formed.

On the tube containers formed in Examples 5-1 to 5-10 and comparative Examples 5-1 to 5-6, a crumple test, a drop test, a vibration test and a separation test were performed. In the crumple test, the tube containers were crumpled 100 times under a condition where they were filled with 100 mL of water, and the peeling conditions of the paper layers were checked. In the drop test, the tube containers were dropped ten times from a height of 1.5 m in such a manner that the positions thereof were random under a condition where they were filled with 100 mL of water, and the peeling conditions of the paper layers were checked. In the vibration test, the tube containers were vibrated for 15 minutes in the z-axis direction (the vertical direction and the axial direction of the containers) in such a manner that the amplitude and frequency of the vibrations provided to the tube containers were random, and the peeling conditions of the paper layers were checked. In the separation test, the paper layers were separated from the body parts, and it was determined whether or not the masses of the paper layers remaining on the base film layer side were not more than 5% of those of the paper layers before separation (paper remaining amounts were not more than 5%) or whether or not the masses of the base film layers remaining on the paper layer side were not more than 5% of those of the base film layers (the remaining amounts of resin were not more than 5%).

Table 6 shows the configuration, the easy-to-peel property provision method, the peeling strength, the evaluations of the tests and the general evaluation regarding the tube container according to each of the Examples and the Comparative Examples. The numerals shown in the body part configuration column of Table 6 indicate the basis weight (g/m$^2$) or the layer thickness (μm) of the paper.

The test results and the general evaluation in Table 6 were evaluated by the following criteria:
<Crumple Test, Drop Test, and Vibration Test>
+: No peeling occurred.
−: Peeling occurred.
<Separation Test>
+: The paper remaining amount or the resin remaining amount was not more than 5%.
−: The paper remaining amount or the resin remaining amount was more than 5%.
<General Evaluation>
++: The peeling strength was not less than 1 N/15 mm and not more than 3 N/15 mm and was particularly desirable, and the results of the crumple test, the drop test, the vibration test and the separation test were all good (were all +).
+: The peeling strength was not less than 0.5N/15 mm and less than 1 N/15 mm, and more than 3 N/15 mm and not more than 10 N/15 mm, and the results of the crumple test, the drop test, the vibration test and the separation test were all good (were all +).
−: The peeling strength was less than 0.5 N/15 mm or more than 10 N/15 mm, and any of the results of the crumple test, the drop test, the vibration test and the separation test was poor (was −).

TABLE 6

| | Structure | Easy-to-peel property provision | Peeling Strength | Crumple | Drop | Vibration | Separation | General Evaluation |
|---|---|---|---|---|---|---|---|---|
| Example 1 | Unbleached kraft100/EP30/Barrier12/ONY15/LLDPE50 | EP | 0.50 | + | + | + | + | + |
| Example 2 | Unbleached kraft100/EP30/PET12/AL9/LLDPE50 | EP | 1.0 | + | + | + | + | + + |
| Example 3 | Unbleached kraft100/EP30/ONY15/AL9/LLDPE50 | EP | 3.1 | + | + | + | + | + |
| Example 4 | Unbleached kraft100/Barrier12/ONY15/LLDPE50 | Pattern varnish | 0.70 | + | + | + | + | + |
| Example 5 | Unbleached kraft100/AL9/ONY15/LLDPE50 | Pattern varnish | 1.2 | + | + | + | + | + + |
| Example 6 | Unbleached kraft100/AL9/PET12/LLDPE50 | Pattern varnish | 2.5 | + | + | + | + | + + |
| Example 7 | Unbleached oil resistant100/AL9/ONY15/LLDPE50 | Pattern varnish | 6.0 | + | + | + | + | + |
| Example 8 | Unbleached kraft100/PET12/Barrier12/ONY15/LLDPE50 | Pseudo-adhesive | 0.70 | + | + | + | + | + |

TABLE 6-continued

|  | Structure | Easy-to-peel property provision | Peeling Strength | Crumple | Drop | Vibration | Separation | General Evaluation |
|---|---|---|---|---|---|---|---|---|
| Example 9 | Machine-glazed unbleached kraft100/Barrier12/ONY15/LLDPE50 | Smoothness | 1.4 | + | + | + | + | + + |
| Example 10 | Machine-glazed unbleached oil resistant100/Barrier12/ONY15/LLDPE50 | Smoothness | 2.8 | + | + | + | + | + + |
| Comparative Example 1 | Unbleached kraft100/Barrier12/ONY15/LLDPE50 | Not provided | 0.40 | − | + | + | + | − |
| Comparative Example 2 | Unbleached kraft100/Barrier12/ONY15/LLDPE50 | Not provided | 14 | + | + | + | − | − |
| Comparative Example 3 | Unbleached kraft100/EP30/ONY15/AL9/LLDPE50 | EP | 0.35 | − | + | + | + | − |
| Comparative Example 4 | Unbleached kraft100/AL9/ONY15/LLDPE50 | Pattern varnish | 13 | + | + | + | − | − |
| Comparative Example 5 | Unbleached kraft100/PET12/Barrier12/ONY15/LLDPE50 | Pseudo-adhesive | 12 | + | + | + | − | − |
| Comparative Example 6 | Unbleached kraft100/Barrier12/ONY15/LLDPE50 | Smoothness | 0.35 | − | + | + | + | − |

As shown in Table 6, regarding all of the tube containers according to Examples 5-1 to 5-10, no peeling of the paper layer occurred and durability was excellent in the crumple test, the drop test and the vibration test. Further, in the separation test, the paper remaining amount and the resin remaining amount were both not more than 5% and separativeness was also excellent. In particular, in Examples 5-2, 5-5, 5-6, 5-9 and 5-10, the peeling strength was not less than 1 N/15 mm and not more than 3 N/5 mm which is particularly desirable, and the balance between durability and separativeness was more excellent than Examples 5-1, 5-3, 5-4, 5-7 and 5-8 where the peeling strength was not less than 0.5 N/15 mm and less than 1 N/15 mm, and more than 3 N/15 mm and not more than 10 N/15 mm.

On the contrary, regarding the tube containers according to comparative Examples 5-1, 5-3 and 5-6, in the separation test, the paper remaining amount and the resin remaining amount were both not more than 5% and separativeness was excellent, and in the drop test and the vibration test, no peeling occurred. However, since the peeling strength was less than 0.5 N/15 mm, peeling of the paper layer occurred in the crumple test.

Regarding the tube containers according to comparative Examples 5-2, 5-4, 5-5, in the crumple test, the drop test and the vibration test, no paper peeling occurred and durability was excellent; however, since the peeling strength exceeded 10 N/15 mm, in the separation test, the paper remaining amount and the resin remaining amount both exceeded 5% and separativeness was inferior.

Examples and Comparative Examples of the Sixth Embodiment (Sheet Formation)

Sheets A to E were formed. Concrete forming methods will be described.

On unbleached kraft paper with a basis weight of 70 g/m² (manufactured by Ohji Paper Co., Ltd.), a transparent barrier film with a thickness of 12 μm (manufactured by Toppan Inc.), a drawn nylon film with a thickness of 15 μm (manufactured by Unitika Ltd.) and polyethylene with a thickness of 50 μm were bonded together in this order by dry lamination by using a two-component curing type urethane-based adhesive. Polyethylene with a thickness of 15 μm was laminated on the unbleached kraft paper, whereby the sheet A for body part formation was formed.

On unbleached kraft paper with a basis weight of 70 g/m² (manufactured by Ohji Paper Co., Ltd.), a transparent barrier film with a thickness of 12 μm (manufactured by Toppan Inc.), a drawn nylon film with a thickness of 15 μm (manufactured by Unitika Ltd.) and polyethylene with a thickness of 50 μm were bonded together in this order by dry lamination by using a two-component curing type urethane-based adhesive, whereby the sheet B for body part formation was formed.

On unbleached kraft paper with a basis weight of 120 g/m² (manufactured by Ohji Paper Co., Ltd.), a transparent barrier film with a thickness of 12 μm (manufactured by Toppan Inc.), a drawn nylon film with a thickness of 15 μm (manufactured by Unitika Ltd.) and polyethylene with a thickness of 50 μm were bonded together in this order by dry lamination by using a two-component curing type urethane-based adhesive, whereby the sheet C for body part formation was formed.

On unbleached kraft paper with a basis weight of 70 g/m² (manufactured by Ohji Paper Co., Ltd.), a transparent barrier film with a thickness of 12 μm (manufactured by Toppan Inc.), an aluminum foil with a thickness of 9 μm (manufactured by Toyo Aluminum K.K.), a drawn nylon film with a thickness of 15 μm (manufactured by Unitika Ltd.) and polyethylene with a thickness of 50 μm were bonded together in this order by dry lamination by using a two-component curing type urethane-based adhesive, whereby the sheet D for body part formation was formed.

A transparent barrier film with a thickness of 12 μm (manufactured by Toppan Inc.), a drawn nylon film with a thickness of 15 μm (manufactured by Unitika Ltd.) and polyethylene with a thickness of 100 μm were bonded together in this order by dry lamination by using a two-component curing type urethane-based adhesive, whereby the sheet E for body part formation was formed.

Table 7 shows the configurations of the formed sheets A to E. The numerals shown in the body part configuration column of Table 7 indicate the basis weight (g/m²) or the layer thickness (μm).

TABLE 7

| Sheet | | Structure |
|---|---|---|
| | A | PE15/Paper70/PET12/ONY15/PE50 |
| | B | Paper70/PET12/ONY15/PE50 |
| | C | Paper120/PET12/ONY15/PE50 |
| | D | Paper70/PET12/AL9/ONY15/PE50 |
| | E | PET12/ONY15/PE100 |

Example 6-1

Polyethylene with a thickness of 30 μm, a transparent barrier film with a thickness of 12 μm (manufactured by Toppan Inc.) and polyethylene (PE) with a thickness of 30 μm were laminated in this order, thereby forming an 8-mm-wide tape material where the base material was exposed from the end surface.

On each of the sheets A to E, with the formed tape material, the struck part in which both ends of the sheet were stuck together was welded from the inner surface of the sheet by using a seal bar that was wider (width 12 mm) than the tape material, thereby forming five kinds of body parts with a diameter of 35 mm and a length of 180.

The spout part was molded by injection molding by using a polyethylene resin. The cap was molded by injection molding by using a polypropylene resin.

The spout part was thermally welded to each of the formed five kinds of body parts by using a dedicated processing device, thereby forming five tube containers with an inside diameter of 35 mm.

Example 6-2

Five tube containers with an inside diameter of 35 mm were formed similarly to Example 6-1 except for the following: Polyethylene with a thickness of 50 μm, a transparent barrier film with a thickness of 12 μm (manufactured by Toppan Inc.) and polyethylene with a thickness of 50 μm were laminated in this order, thereby forming a tape material where the base material was exposed from the end surface.

Example 6-3

Five tube containers with an inside diameter of 35 mm were formed similarly to Example 6-1 except for the following: Polyethylene with a thickness of 30 μm, a transparent barrier film with a thickness of 12 μm (manufactured by Toppan Inc.) and polyethylene with a thickness of 70 μm were laminated in this order, thereby forming an 8-mm-wide tape material where the base material was exposed from the end surface.

Example 6-4

Five tube containers with an inside diameter of 35 mm were formed similarly to Example 6-1 except for the following: Polyethylene with a thickness of 70 μm, a transparent barrier film with a thickness of 12 μm (manufactured by Toppan Inc.) and polyethylene with a thickness of 30 μm were laminated in this order, thereby forming an 8-mm-wide tape material where the base material was exposed from the end surface.

Example 6-5

Five tube containers with an inside diameter of 35 mm were formed similarly to Example 6-1 except for the following: Polyethylene with a thickness of 10 μm, a transparent barrier film with a thickness of 12 μm (manufactured by Toppan Inc.) and polyethylene with a thickness of 10 μm were laminated in this order, thereby forming an 8-mm-wide tape material where the base material was exposed from the end surface.

Example 6-6

Five tube containers with an inside diameter of 35 mm were formed similarly to Example 6-1 except for the following: Ionomer with a thickness of 30 μm, an aluminum foil with a thickness of 9 μm (manufactured by Toyo Aluminum K.K.) and ionomer with a thickness of 40 μm were laminated in this order, thereby forming an 8-mm-wide tape material where the base material was exposed from the end surface.

Example 6-7

Five tube containers with an inside diameter of 35 mm were formed similarly to Example 6-1 except for the following: Ionomer with a thickness of 70 μm, an aluminum foil with a thickness of 9 μm (manufactured by Toyo Aluminum K.K.) and ionomer with a thickness of 70 μm were laminated in this order, thereby forming an 8-mm-wide tape material where the base material was exposed from the end surface.

Example 6-8

Five tube containers with an inside diameter of 35 mm were formed similarly to Example 6-1 except for the following: Polyethylene with a thickness of 30 μm, a transparent barrier film with a thickness of 25 μm (manufactured by Toppan Inc.) and polyethylene with a thickness of 30 μm were laminated in this order, thereby forming an 8-mm-wide tape material where the base material was exposed from the end surface.

Example 6-9

Five tube containers with an inner diameter of 35 mm were formed similarly to Example 6-1 except for the following: Polyethylene with a thickness of 30 μm, a transparent barrier film with a thickness of 12 μm (manufactured by Toppan Inc.) and polyethylene with a thickness of 30 μm were laminated in this order, thereby forming an 8-mm-wide tape material where the base material of the end surface was covered by ultrasonic slitting. The formed tape material was welded to each of the sheets A to E by using a seal bar narrower than the tape material, thereby forming five kinds of body parts with a diameter of 35 mm and a length of 180.

Example 6-10

Five tube containers with an inside diameter of 35 mm were formed similarly to Example 6-1 except for the following: Polyethylene with a thickness of 40 μm, drawn polypropylene with a thickness of 40 μm and polyethylene with a thickness of 40 μm were laminated in this order, thereby forming an 8-mm-wide tape material where the base material was exposed from the end surface.

Comparative Example 6-1

Five tube containers with an inside diameter of 35 mm were formed similarly to Example 6-1 except for the following: Polyethylene with a thickness of 9 μm, a transparent barrier film with a thickness of 12 μm (manufactured by Toppan Inc.) and polyethylene with a thickness of 9 μm were laminated in this order, thereby forming an 8-mm-wide tape material where the base material was exposed from the end surface.

Comparative Example 6-2

Five tube containers with an inside diameter of 35 mm were formed similarly to Example 6-1 except for the following: Polyethylene with a thickness of 7 μm, a transparent barrier film with a thickness of 12 μm (manufactured by Toppan Inc.) and polyethylene with a thickness of 7 μm were laminated in this order, thereby forming an 8-mm-wide tape material where the base material was exposed from the end surface.

Comparative Example 6-3

Five tube containers with an inside diameter of 35 mm were formed similarly to Example 6-1 except for the following: Polyethylene with a thickness of 4 μm, a transparent barrier film with a thickness of 12 μm (manufactured by Toppan Inc.) and polyethylene with a thickness of 70 μm were laminated in this order, thereby forming an 8-mm-wide tape material where the base material was exposed from the end surface.

Comparative Example 6-4

Five tube containers with an inside diameter of 35 mm were formed similarly to Example 6-1 except that an 8-mm-wide tape material was formed of polyethylene with a thickness of 100 μm.

Comparative Example 6-5

Five tube containers with an inside diameter of 35 mm were formed similarly to Example 6-1 except for the following: Polyethylene with a thickness of 30 μm, a transparent barrier film with a thickness of 12 μm (manufactured by Toppan Inc.) and polyethylene with a thickness of 30 μm were laminated in this order, thereby forming an 8-mm-wide tape material where the base material was exposed from the end surface.

Comparative Example 6-6

Five tube containers with an inside diameter of 35 mm were formed similarly to Example 6-1 except that the body part was formed by butt-seam sealing where the inner surfaces of the belt-like parts including a pair of end edges of each of the formed sheets A-E were joined in such a manner that the palms were joined together, and welded.

Comparative Example 6-7

Five tube containers with an inside diameter of 35 mm were formed similarly to Example 6-1 except for the following: Polyethylene with a thickness of 70 μm, a transparent barrier film with a thickness of 12 μm (manufactured by Toppan Inc.) and polyethylene with a thickness of 80 μm were laminated in this order, thereby forming an 8-mm-wide tape material where the base material was exposed from the end surface.

Comparative Example 6-8

Five tube containers with an inside diameter of 35 mm were formed similarly to Example 6-1 except for the following: Polyethylene with a thickness of 80 μm, a transparent barrier film with a thickness of 12 μm (manufactured by Toppan Inc.) and polyethylene with a thickness of 80 μm were laminated in this order, thereby forming an 8-mm-wide tape material where the base material was exposed from the end surface.

On each of the tube containers formed in Examples 6-1 to 6-10 and comparative Examples 6-1 to 6-8, an end surface protection evaluation, a moldability evaluation, a handleability evaluation and a chemical resistance evaluation were performed.

The end surface protection evaluation was performed by observing the end surface of the tape material with a microscope. When the base material was not exposed on the end surface of the tape material, end surface protection was evaluated to be present (◯ in Table 8), and when the base material was exposed, end surface protection was evaluated to be absent (x in Table 8).

In the moldability evaluation, when the tube containers were formed without any problem, moldability was evaluated to be good (◯ in Table 8), when the tube containers were formed substantially without any problem although they were somewhat difficult to mold, moldability was evaluated to be acceptable (Δ in Table 8), and when it was difficult or impossible to form the tube containers, moldability was evaluated to be poor (x in Table 8.

In the handleability test, interviews were conducted with 20 monitors about the usability when they actually used the tube containers. When 15 or more answered that handleability was good, handleability was evaluated to be good (◯ in Table 8), and when 14 or less answered that handleability was good, handleability was evaluated to be poor (x in Table 8).

In the chemical resistance evaluation, the formed tube containers were each filled with ethanol of a concentration of 50% and were stored for one month in an environment where the room temperature was 40 degrees C. and the humidity was 75%, and then, the presence or absence of interlayer peeling of the tape materials was checked. When there was no interlayer peeling, chemical resistance was evaluated to be good (◯ in Table 8), and when interlayer peeling occurred, chemical resistance was evaluated to be poor (x in Table 8).

When there was not any "x" in the results of the evaluation as to the presence or absence of surface protection, the moldability evaluation, the handleability evaluation and the chemical resistance evaluation, the evaluation result was "◯", and when there was "x" in any of the results, the evaluation result was "x".

Table 8 shows the configuration of the tape material, the seal bar width with respect to the tape material width, the presence or absence of end surface resin on the end surface of the tape material before welding, the results of the evaluations and the result of the general evaluation according to each of the Examples and the comparative Examples. The numerals shown in the tape material configuration column of Table 8 indicate the thicknesses (μm) of the layers.

TABLE 8

|  |  | Tape material structure | Seal bar width | End surface resin | Evaluation items | | | | |
|---|---|---|---|---|---|---|---|---|---|
|  |  |  |  |  | End surface protection | Moldability | Handleability | Chemical resistance | General Evaluation |
| Example | 1 | PE30/PET12/PE30 | Wide | Absent | ○ | ○ | ○ | ○ | ○ |
|  | 2 | PE50/PET12/PE50 | Wide | Absent | ○ | ○ | ○ | ○ | ○ |
|  | 3 | PE30/PET12/PE70 | Wide | Absent | ○ | ○ | ○ | ○ | ○ |
|  | 4 | PE70/PET12/PE30 | Wide | Absent | ○ | ○ | ○ | ○ | ○ |
|  | 5 | PE10/PET12/PE10 | Wide | Absent | ○ | Δ | ○ | ○ | ○ |
|  | 6 | Ionomer30/AL9/Ionomer 40 | Wide | Absent | ○ | ○ | ○ | ○ | ○ |
|  | 7 | Ionomer70/AL9/Ionomer 70 | Wide | Absent | ○ | ○ | ○ | ○ | ○ |
|  | 8 | PE30/PET25/PE30 | Wide | Absent | ○ | ○ | ○ | ○ | ○ |
|  | 9 | PE30/PET25/PE30 | Narrow | Present | ○ | ○ | ○ | ○ | ○ |
|  | 10 | PE40/OPP40/PE40 | Wide | Absent | ○ | ○ | ○ | ○ | ○ |
| Comparative Example | 1 | PE9/PET12/PE9 | Wide | Absent | X | X | ○ | X | X |
|  | 2 | PE7/PET12/PE7 | Wide | Absent | X | X | ○ | X | X |
|  | 3 | PE4/PET12/PE70 | Wide | Absent | ○ | X | ○ | ○ | X |
|  | 4 | PE100 | Wide | Absent | — | X | ○ | ○ | X |
|  | 5 | PE30/PET12/PE30 | Narrow | Absent | X | ○ | ○ | X | X |
|  | 6 | — | — | — | — | X | X | ○ | X |
|  | 7 | PE70/PET12/PE80 | Wide | Absent | ○ | X | ○ | ○ | X |
|  | 8 | PE80/PET12/PE80 | Wide | Absent | ○ | X | ○ | ○ | X |

Regarding the tube containers according to Examples 6-1 to 6-8 and 6-10, although the base material was exposed from the end surface of the tape material 620 under the condition before welding, since the thicknesses of the first resin layer 621 and the second resin layer 622 of the tape material 620 were both not less than 10 μm and not more than 70 μm under the condition before welding and the tape material 620 was welded by using a seal bar wider than the tape material 620, the end surface of the base material 623 was protected by the resin of the first resin layer 621 or the second resin layer 622 melted at the time of welding.

Regarding the tube container according to Example 6-5, although the amount of resin covering the end surface of the base material was small because the first resin layer 621 and the second resin layer 622 of the tape material were both as slightly thin as 10 μm, the tube containers were formed substantially without any problem.

Regarding the tape materials of the tube containers according to Examples 6-6 and 6-7, since the first resin layer 621 and the second resin layer 622 were ionomer and the base material 623 was an aluminum foil, a light shielding property as well as a barrier property could be provided to the tape material.

Moreover, regarding the tube container according to Example 6-9, since the thicknesses of the first resin layer 621 and the second resin layer 622 of the tape material 620 were both not less than 10 μm and not more than 70 μm under the condition before welding and the end surface of the base material 623 was covered with the end surface resin 624, the end surface of the base material 623 was protected even though the tape material 620 was welded by using a seal bar narrower than the tape material 620.

Regarding the tape material of the tube container according to comparative Example 6-1, since the first resin layer and the second resin layer were both as thin as 9 μm, the end surface of the base material was not easily covered and chemical resistance was low. In addition, adhesion failure with the body part readily occurred.

Regarding the tape material of the tube container according to comparative Example 6-2, since the thicknesses of the first resin layer and the second resin layer were both as low as 7 μm, the end surface of the base material was covered and chemical resistance was low. In addition, adhesion failure with the body part readily occurred.

Regarding the tape material of the tube container according to comparative Example 6-3, since the first resin layer was as thin as 4 μm, there were cases where film formation of the first resin layer was impossible, and welding to the body part was also difficult. However, since the second resin layer was as thick as 70 μm, the end surface of the base material was protected.

The tape material of the tube container according to comparative Example 6-4 was a single layer of polyethylene. For this reason, the tape material had no edge for drawing derived from a drawable base material, so that it was difficult to form a stable tube container.

Regarding the tape material of the tube container according to comparative Example 6-5, although the tape material where the base material was exposed from the end surface was used under the condition before welding, since the tape material was welded by using a seal bar narrower than the tape material, the end surface of the base material was not covered, and durability was also low.

Regarding the tube container according to comparative Example 6-6, since the body part was formed by butt-seam sealing, the butt-seam-sealed part protruding from the body part touched the hand while in use and handleability was poor. In addition, the butt-seam-sealed part was high in stiffness, it was difficult to form the tube container.

Regarding the tape material of the tube container according to comparative Example 6-7, since the first resin layer was as thick as 80 μm, the thickness of the tape material itself was increased, so that it was difficult to apply end sealing to the body part when the tube container was formed.

Regarding the tape material of the tube container according to comparative Example 6-8, since the first resin layer and the second resin layer were both as thick as 80 μm, the thickness of the tape material itself was increased, so that it was difficult to apply end sealing to the body part when the tube container was formed.

Examples and Comparative Examples of the Seventh Embodiment

Example 7-1

A tubular container according to Example 7-1 is a tubular container having the same structure as the tubular container 7100 of the above-described embodiment shown in FIGS. 37A, 37B, etc.

As the spout part, one formed by injection molding with a resin (PE) was used, and the layer configuration of the laminated sheet constituting the body part was as follows: from the outermost layer side having the outer peripheral surface of the body part, polyethylene (PE) (15 μm), paper (70 g), transparent vapor-deposited polyethylene terephthalate (PET) (12 μm), nylon (NY) (15 μm), and polyethylene (PE) (50 μm).

As the above-mentioned paper, one the basis weight of which was thicker than 30 g/m$^2$ and thinner than 300 g/m$^2$ was used.

The length (A) of the outer periphery of the body part in the neighborhood of the peripheral edge part of the flange part was approximately 110 mm, the diameter (B) of the outer periphery of the body part in the neighborhood of the peripheral edge part of the flange part was 35 mm, and the length (C) of the line extending from the other end side edge of the body part to the first ruled line substantially perpendicularly to the first ruled line was 5 mm. Therefore, the length of (B−C×2) was 25 mm, and the length (F) of the circumference of the circle having the 25 mm as the diameter was approximately 78.5 mm. The length of (A−F) was approximately 31.5 mm, the number (E) of sets of one mountain fold line and first and second valley fold lines on the left and right thereof was 10, and the length (D) of the base of the isosceles triangle at the other end side edge of the body part was (A−F)/E, that is, approximately 31.5/10 or approximately 3.2 mm.

The pleats were folded in one direction to the outer surface of the other end of the body part on the peripheral edge part of the flange part, and sealed to the outer surface of the other end of the body part. Moreover, the body part was formed by a back bonded seal part formed by being welded in a state of being joined in such a manner that the palms are joined together, and as shown in FIGS. 40A and 40B, no pleats were formed on the back bonded seal part and pleats were intentionally formed on the right and left parts of the back bonded seal part.

The method for attaching the body part to the spout part was as follows:

After the spout part was mounted on an upper part of a mandrel, the body part the length in the height direction of which was longer than the length in the height direction of the mandrel was inserted into the mandrel, and the body part 720 was fixed in a position where it protruded from the mandrel by a length C. Then, hot pressing was performed on the body part at a temperature of not more than the melting point of the body part by using a female mold, thereby forming the first ruled line and the second ruled line.

Moreover, by bringing the body part into contact with the female mold to cause thermal shrinkage at the part of contact on the body part in the hot pressing, the first ruled line and the second ruled line were formed.

With the shape of the other end of the body part being male, a pyramid-shaped female mold 770 corresponding to the male shape and being star-shaped in transverse cross section as shown in FIG. 43 was used to form the first ruled line and the second ruled line on the other end of the body part.

Example 7-2

The tubular container of Example 7-2 was different from the tubular container of Example 7-1 only in the layer configuration of the laminated sheet constituting the body part and was the same except for that.

The layer configuration of the laminated sheet constituting the body part of the tubular container of Example 7-2 was as follows: from the outermost layer side having the outer peripheral surface of the body part, paper (70 g), transparent vapor-deposited polyethylene terephthalate (PET) (12 μm), nylon (NY) (15 μm), and polyethylene (PE) (50 μm).

Example 7-3

The tubular container of Example 7-3 was different from the tubular container of Example 7-1 only in the layer configuration of the laminated sheet constituting the body part and was the same except for that.

The layer configuration of the laminated sheet constituting the body part of the tubular container of Example 7-3 was as follows: from the outermost layer side having the outer peripheral surface of the body part, paper (70 g), transparent vapor-deposited polyethylene terephthalate (PET) (12 μm), nylon (NY) (15 μm), and polyethylene (PE) (50 μm).

Comparative Example 7-1

The tubular container of comparative Example 7-1 was different from the tubular container of Example 7-1 only in the basis weight of the paper included in the body part and was the same except for that. As the paper included in the body part of the tubular container of comparative Example 7-1, paper with a basis weight of not more than 30 g/m$^2$ was used.

Comparative Example 7-2

The tubular container of comparative Example 7-1 was different from the tubular container of Example 7-2 only in the basis weight of the paper included in the body part and was the same except for that. As the paper included in the body part of the tubular container of comparative Example 7-2, paper with a basis weight of not less than 300 g/m$^2$ was used.

(Test Method)

Regarding the tubular containers of Examples 7-1 to 7-3 and comparative Examples 7-1 and 7-2, the appearance of the tubular container and the stabilizability of the sealability between the other end of the body part and the peripheral edge part of the flange part were checked.

(Test Results and Considerations)

In all of Examples 7-1 to 7-3, pleats were equally formed in the peripheral direction of the peripheral edge part, the body part was beautifully formed, the appearance of the tubular container was good, and the sealability between the other end of the body part and the peripheral edge part of the flange part was readily stabilized. Moreover, in Example 7-1 where polyethylene which is a resin that softens when heated was used for the outermost layer of the laminated sheet constituting the body part, the body part was formed more beautifully than in Examples 7-1 and 7-2, the appearance of the tubular container was good, and the sealability between the other end of the body part and the peripheral edge part of the flange part was readily stabilized.

On the contrary, in comparative Example 7-1, the first ruled line and the second ruled line were not beautifully formed, and in comparative Example 7-2, it was difficult to eliminate the level difference when the other end of the body part and the peripheral edge part of the flange part were sealed, and leakage occurred. Therefore, in both of comparative Examples 7-1 and 7-2, the appearance of the pleats formed part was poor, and the sealability between the other end of the body part and the peripheral edge part of the flange part were difficult to stabilize.

From the above test results, the following is apparent: In a tubular container where the first ruled line and the second ruled line are provided and the other end of the body part is attached to the peripheral edge part of the flange part while pleats are formed that are bent along the first ruled line and the second ruled line and folded to the outer surface of the other end of the body part on the peripheral edge part of the flange part, when the basis weight of the paper included in the body part is thicker than 30 g/m$^2$ and thinner than 300 g/m$^2$, the appearance of the tubular container is good and the sealability between the other end of the body part and the peripheral edge part of the flange part is readily stabilized.

As described above, in the tubular container according to the seventh embodiment, since the spout part has the plate-like flange part orthogonal to the height direction of the body part, space that enables the contents to remain is absent on the inner side and while the effect of suppressing the contents' remaining inside the container is produced, the following effects are further produced:

In the tubular container according to the seventh embodiment, the body part includes paper the basis weight of which is thicker than 30 g/m$^2$ and thinner than 300 g/m$^2$, and the body part has the first ruled line and the second ruled line. The shape of the peripheral edge part of the flange part viewed in the height direction of the body part is substantially circular, the first ruled line is a mountain fold line and formed in the peripheral direction of the body part for bending toward the center of the body part for the attachment to the peripheral edge part of the flange part, and the second ruled line is structured in such a manner that with one mountain fold line formed in a predetermined position and two valley fold lines symmetrical with respect to the one mountain fold line being one set, two or more sets thereof are equally formed in the peripheral edge part of the flange part. The other end of the body part is attached to the peripheral edge part of the flange part while pleats are formed that are bent along the first ruled line and the second ruled line and folded to the outer surface of the other end of the body part on the peripheral edge part of the flange part. Therefore, the pleats are equally formed in the peripheral direction of the body part, the body part is beautifully formed, the appearance is good, and the sealability between the flange part and the attachment part is readily stabilized.

Examples and Comparative Examples of the Eighth Embodiment

Example 8-1

On unbleached kraft paper with a basis weight of 120 g/m$^2$ (manufactured by Ohji Paper Co., Ltd.), a transparent barrier film with a thickness of 12 µm (manufactured by Toppan Inc., product name: GL-RD), a drawn nylon film with a thickness of 15 µm (manufactured by Unitika Ltd., product name: ONBC) and a linear low-melting-point polyethylene with a thickness of 50 µm (LLDPE, manufactured by Tamapoly Co., Ltd., product name: SE625N) were bonded together in this order by dry lamination by using a two-component curing type urethane-based adhesive. Ink was applied onto the unbleached kraft paper, and polyethylene (PE) was extruded thereon to thereby form a sheet for body part formation.

The formed sheet was processed by a back bonding bag-making machine so that the width of the overlapping part was 1.0 mm while a 4-mm-wide tape material was inserted, thereby forming a butt-seam-sealed pouch (body part) with a diameter of 35 mm and a length of 180 (175.1⌋1.50) mm. At this time, the center of the tape material and the end edge of the sheet situated inside the body part were made to substantially coincide with each other. The tape material used was one that was obtained by microslitting a single film of a linear low-melting-point polyethylene with a thickness of 50 µm (LLDPE, manufactured by Tamapoly Co., Ltd., product name: SE625N).

The spout part was molded by injection molding by using a polyethylene resin.

The formed body part and spout part were thermally welded by using a dedicated processing device, thereby forming a tube container with an inside diameter of 35 mm.

Example 8-3

On unbleached kraft paper with a basis weight of 100 g/m$^2$ (manufactured by Ohji Paper Co., Ltd.), an aluminum foil with a thickness of 9 µm (manufactured by Toyo Aluminum K.K.), a drawn nylon film with a thickness of 15 µm (manufactured by Unitika Ltd., product name: ONBC) and a linear low-melting-point polyethylene with a thickness of 50 µm (LLDPE, manufactured by Tamapoly Co., Ltd., product name: SE625N) were bonded together in this order by dry lamination by using a two-component curing type urethane-based adhesive. The width of the overlapping part was 3.0 mm, and the width of the tape material was 8.0 mm. Except for these, a tube container with an inside diameter of 35 mm was formed similarly to Example 8-1.

Example 8-3

On unbleached kraft paper with a basis weight of 150 g/m$^2$ (manufactured by Ohji Paper Co., Ltd.), a drawn nylon film with a thickness of 15 µm (manufactured by Unitika Ltd., product name: ONBC), an aluminum foil with a thickness of 9 µm (manufactured by Toyo Aluminum K.K.), and a linear low-melting-point polyethylene with a thickness of 50 µm (LLDPE, manufactured by Tamapoly Co., Ltd., product name: SE625N) were bonded together in this order by dry lamination by using a two-component curing type urethane-based adhesive. Ink was applied onto the unbleached kraft paper, and ethylene-methacrylic acid copolymer (EMAA) was extruded thereon to thereby form a sheet for body part formation. The width of the overlapping part was 5.0 mm, and the width of the tape material was 12.0 mm Except for these, a tube container with an inside diameter of 35 mm was formed similarly to Example 8-1.

Example 8-4

On unbleached kraft paper with a basis weight of 70 g/m$^2$ (manufactured by Ohji Paper Co., Ltd.), a transparent barrier film with a thickness of 12 µm (manufactured by Toppan Inc., product name: GL-RD), a drawn nylon film with a thickness of 15 µm (manufactured by Unitika Ltd., product name: ONBC) and a linear low-melting-point polyethylene with a thickness of 50 µm (LLDPE, manufactured by Tamapoly Co., Ltd., product name: SE625N) were bonded together in this order by dry lamination by using a two-component curing type urethane-based adhesive. Ink was applied onto the unbleached kraft paper, and ethylene-methacrylic acid copolymer was extruded thereon to thereby form a sheet for body part formation. The width of the overlapping part was 8.0 mm, and the width of the tape material was 15.0 mm. Except for these, a tube container with an inside diameter of 35 mm was formed similarly to Example 8-1.

Comparative Example 8-1

On unbleached kraft paper with a basis weight of 120 g/m² (manufactured by Ohji Paper Co., Ltd.), a transparent barrier film with a thickness of 12 μm (manufactured by Toppan Inc., product name: GL-RD), a drawn nylon film with a thickness of 15 μm (manufactured by Unitika Ltd., product name: ONBC) and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive. The width of the overlapping part was 0.0 mm, and the width of the tape material was 3.0 mm. Similarly to Example 8-1 except for these, a tube container with an inside diameter of 35 mm was formed.

Comparative Example 8-2

On unbleached kraft paper with a basis weight of 150 g/m² (manufactured by Ohji Paper Co., Ltd.), a drawn nylon film with a thickness of 15 μm (manufactured by Unitika Ltd., product name: ONBC), an aluminum foil with a thickness of 9 μm (manufactured by Toyo Aluminum K.K.), and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive. Ink was applied onto the unbleached kraft paper, and ethylene-methacrylic acid copolymer was extruded thereon to thereby form a sheet for body part formation. The width of the overlapping part was 3.0 mm, and the width of the tape material was 2.0 mm. Except for these, a tube container with an inside diameter of 35 mm was formed similarly to Example 8-1.

Comparative Example 8-3

On unbleached kraft paper with a basis weight of 100 g/m² (manufactured by Ohji Paper Co., Ltd.), an aluminum foil with a thickness of 9 μm (manufactured by Toyo Aluminum K.K.), a drawn nylon film with a thickness of 15 μm (manufactured by Unitika Ltd., product name: ONBC), and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive. The width of the overlapping part was 0.5 mm, and the width of the tape material was 15.0 mm. Except for these, a tube container with an inside diameter of 35 mm was formed similarly to Example 8-1.

Comparative Example 8-4

On unbleached kraft paper with a basis weight of 70 g/m² (manufactured by Ohji Paper Co., Ltd.), a transparent barrier film with a thickness of 12 μm (manufactured by Toppan Inc., product name: GL-RD), a drawn nylon film with a thickness of 15 μm (manufactured by Unitika Ltd., product name: ONBC), and a linear low-melting-point polyethylene with a thickness of 50 μm (LLDPE, manufactured by Tamapoly Co., Ltd., product name: SE625N) were bonded together in this order by dry lamination by using a two-component curing type urethane-based adhesive. Ink was applied onto the unbleached kraft paper, and ethylene-methacrylic acid copolymer was extruded thereon to thereby form a sheet for body part formation. The width of the overlapping part was 9.0 mm, and the width of the tape material was 16.0 mm. Except for these, a tube container with an inside diameter of 35 mm was formed similarly to Example 8-1.

Comparative Example 8-5

A transparent bather film with a thickness of 12 μm (manufactured by Toppan Inc., product name: GL-RD), a drawn nylon film with a thickness of 15 μm (manufactured by Unitika Ltd., product name: ONBC), and a linear low-melting-point polyethylene with a thickness of 100 μm (LLDPE, manufactured by Tamapoly Co., Ltd., product name: SE625N) were bonded together in this order by dry lamination by using a two-component curing type urethane-based adhesive, thereby forming a sheet for body part formation. The width of the overlapping part was 1.0 mm, and the width of the tape material was 8.0 mm. Except for these, a tube container with an inside diameter of 35 mm was formed similarly to Example 8-1.

On the tube containers formed in Examples 8-1 to 8-4 and comparative Examples 8-1 to 8-5, a barrier property evaluation, a vibration test, a drop test, a plug welding aptitude evaluation and a usability evaluation were performed.

In the bather property evaluation, methylene blue was used that changed its color from yellow to blue when it reacted with oxygen. Specifically, the tube containers were filled with agar gel containing methylene blue and were left at room temperature for three days, then, the body parts were sliced in rounds vertically to the direction in which the overlapping parts extended, and the presence or absence of the color change of the agar gel was checked.

In the drop test, the tube containers were dropped ten times from a height of 1.5 m in such a manner that the positions thereof were random under a condition where they were filled with 100 mL of water, and the presence or absence of container breakage was checked.

In the vibration test, the tube containers were vibrated for 15 minutes in the z-axis direction (the vertical direction and the axial direction of the containers) in such a manner that the amplitude and frequency of the vibrations provided to the tube containers were random, and the presence or absence of container breakage was checked (JIS Z 0200).

In the plug welding aptitude evaluation, in the process of thermally welding the body part and the spout part in Examples 8-1 to 8-4 and comparative Examples 8-1 to 8-5, the thermal welding was continuously performed on 200 tube containers, and the following were checked: the presence or absence of mis-detection by a testing machine caused because the body parts of the formed tube containers could not be molded into a true circle; and the presence or absence of adhesion failure between the body part and the spout part.

In the usability evaluation, interviews were conducted with 10 monitors about uncomfortableness and user-unfriendliness when they actually used the tube containers.

Table 9 shows the tube container configuration, the width of the overlapping part (overlapping width), the tape width, the results of the tests and the evaluations, and the result of the general evaluation according to each of the Examples and the comparative Examples. The numerals shown in the body part configuration column of Table 9 indicate the basis weights (g/m²) of the paper or the thicknesses (μm) of the layers.

The tests, the evaluations and the general evaluation in Table 9 were evaluated by the following criteria:

<Bather Property Evaluation>
◯: No color change of the agar gel occurred
x: Color change of the agar gel occurred <Drop Test, and Vibration Test>
◯: No container breakage occurred
x: Container breakage occurred <Plug Welding Aptitude Evaluation>
◯: The number of tube containers where mis-detection or adhesion failure occurred was less than 50%
x: The number of tube containers where mis-detection or adhesion failure occurred was not less than 50%

<Usability Evaluation>
◯: The number of persons who felt uncomfortableness or user-unfriendliness about usability was 0
x: The number of persons who felt uncomfortableness or user-unfriendliness about usability was 1 or more <General Evaluation>
◯: The evaluation results of the barrier property evaluation, the vibration test, the drop test, the plug welding aptitude evaluation and the usability evaluation were all good (◯)
x: Any of the evaluation results of the barrier property evaluation, the vibration test, the drop test, the plug welding aptitude evaluation and the usability evaluation was poor (x)

As shown in Table 9, regarding the tube containers according to Examples 8-1 to 8-4, since the overlapping widths were in the range of 1.0 to 8.0 mm and the tape widths were in the range of 4.0 to 15.0 mm, the results were good in all the tests and evaluations, the barrier property and the usability were excellent, and durability was also excellent as no container breakage or formation failure occurred.

Regarding comparative Example 8-1 having a structure where both ends of the sheet were stuck together, the barrier property and durability were inferior to the envelope-sealed tube containers, and in addition thereto, since the tape width was less than 4 mm, there are cases where space was formed in the bonded part because of variations in manufacture and the tape material was exposed. For this reason, the result of the plug welding aptitude evaluation was poor as mis-detection by the testing machine occurred and tape breakage occurred at the time of welding. Moreover, the results were poor in any of the tests and evaluations as the tube container where the tape material was exposed broke during use.

Regarding comparative Example 8-2, since the overlapping width was in the range of 1.0 to 8.0 mm, the result of the plug welding aptitude evaluation was good. However, since the tape width was less than 4 mm, the seal at the bonded part was insufficient because of variations in manufacture, and there were cases where the tube container broke during use. For this reason, the results of the barrier property evaluation, the vibration test, the drop test and the usability evaluation were poor.

Regarding comparative Example 8-3, since the tape width was in the range of 4.0 to 15.0 mm, the results of the vibration test, the drop test, the plug welding aptitude evaluation and the usability evaluation were good. However, since the overlapping width was less than 1.0 mm, boding was insufficient because of variations in manufacture, so that the result of the barrier property evaluation was poor.

Regarding comparative Example 8-4, since the overlapping width exceeded 8.0 mm and the tape width exceeded 15.0 mm, the results of the barrier property evaluation, the drop test and the vibration test were good. However, since the stiffness of the overlapping part was too high, the results of the plug welding aptitude evaluation and the usability evaluation were poor. The result of the plug welding aptitude evaluation was poor because the body part could not be molded into a true circle and mis-detection by the testing machine increased.

TABLE 9

| | | Structure | Overlapping width (mm) | Tape width (mm) | Barrier | Drop | Vibration | Plug welding | Usability | General evaluation |
|---|---|---|---|---|---|---|---|---|---|---|
| Example | 1 | PE/Unbleached kraft120/ PET12/ONY15/LLDPE50 | 1.0 | 4.0 | ◯ | ◯ | ◯ | ◯ | ◯ | ◯ |
| | 2 | PE/Unbleached kraft100/ AL9/ONY15/LLDPE50 | 3.0 | 8.0 | ◯ | ◯ | ◯ | ◯ | ◯ | ◯ |
| | 3 | EMAA/Unbleached kraft150/ ONY15/AL9/LLDPE50 | 5.0 | 12.0 | ◯ | ◯ | ◯ | ◯ | ◯ | ◯ |
| | 4 | EMAA/Unbleached kraft70/ PET12/ONY15/LLDPE50 | 8.0 | 15.0 | ◯ | ◯ | ◯ | ◯ | ◯ | ◯ |
| Comparative Example | 1 | PE/Unbleached kraft120/ PET12/ONY15/LLDPE50 | 0.0 | 3.0 | X | X | X | X | X | X |
| | 2 | EMAA/Unbleached kraft150/ ONY15/AL9/LLDPE50 | 3.0 | 2.0 | X | X | X | ◯ | X | X |
| | 3 | PE/Unbleached kraft100/ AL9/ONY15/LLDPE50 | 0.5 | 15.0 | X | ◯ | ◯ | ◯ | ◯ | X |
| | 4 | EMAA/Unbleached kraft70/ PET12/ONY15/LLDPE50 | 9.0 | 16.0 | ◯ | ◯ | ◯ | X | X | X |
| | 5 | PET12/ONY15/LLDPE100 | 1.0 | 8.0 | ◯ | ◯ | ◯ | X | X | X |

Regarding comparative Example 8-5, since the overlapping width was in the range of 1.0 to 8.0 mm and the tape width was in the range of 4.0 to 15.0 mm, the results were good in the barrier property evaluation, the drop test and the vibration test. However, since the stiffness of the body part of the tube container according to comparative Example 8-5 was supplemented by resin so that the tube container could stand on its own without the use of a paper layer, the sheet was thick compared with other Examples and Comparative Examples, so that the stiffness of the overlapping part was high. For this reason, welding between the body part and the spout part was difficult, and the result of the plug welding aptitude evaluation was poor. In addition, since the contents in the tube container was not easily squeezed, usability was poor, so that the result of the usability evaluation was also poor.

The tube container of the present disclosure can be used as a packaging material for pharmaceuticals, cosmetics. food products, etc.

Although the present invention has been described in detail above, the above description is merely an example of the present invention in all respects and does not intend to limit the scope thereof. It is needless to say that various improvements and modifications can be made without departing from the scope of the present invention.

What is claimed is:

1. A tube container comprising:
   a tube-like body portion that is closed at one end, and
   a spout portion mounted at the other end of the body portion, wherein
   the body portion is formed by a material composed mainly of paper,
   the body portion is formed using a body portion-forming blank made of a laminated sheet in which at least an outermost layer and innermost layer are thermoplastic resin layers,
   the laminated sheet includes:
   an inner side laminated film having the innermost layer and not including a paper,
   an outer side laminated film having the outermost layer and not including a paper, and
   a paper layer laminated between the inner side laminated film and the outer side laminated film,
   the inner side laminated film and the outer side laminated film are bonded with an adhesive layer such that an end surface of the paper layer is not exposed at least at both facing end edges of the body portion-forming blank and such that parts where the paper layer is not laminated between the inner side laminated film and the outer side laminated film are formed at both sides of the facing end edges of the body portion-forming blank,
   the both facing end edges of the body portion-forming blank have their outermost layer and innermost layer surfaces overlapping and heat-sealed,
   the laminated sheet has a thickness of 30 μm to 300 μm,
   the spout portion comprises a flat closed portion perpendicular to a height direction of the body portion the tube container, and
   the other end of the body portion of the tube container is bonded to a surface on a side of the body portion of the tube container of the closed portion that is opposite to the one end, at an peripheral portion of the closed portion.

2. The tube container according to claim 1, wherein the spout portion includes:
   a first cylinder portion having a cylindrical shape and having a flange at one end in an axial direction, and
   a flat portion having an annular flat shape with an opening of approximately the same shape as a cross-section of the first cylinder portion, and having a surface on one side sealed to the flange of the first cylinder portion while the first cylinder portion is inserted through the opening, and wherein
   a portion in a predetermined area from the other end of the body portion is sealed to a surface on the other side of the flat portion and
   the first cylinder portion, the flat portion and the body portion are made of sheets composed mainly of paper.

3. The tube container according to claim 2, wherein the first cylinder portion includes:
   a first bonded portion formed by rolling a rectangular first blank made of a sheet composed mainly of paper into a tube shape and overlapping and sealing a portion in a predetermined area from a pair of facing end edges, and
   the flange formed by curling outward a portion in a predetermined area from one end edge in an axial direction of the first blank rolled into a tube shape, and compressing it, and wherein
   the pair of end edges are folded inside the first bonded portion and sealed, with the one end edge in the axial direction being wrapped up and sealed inside the flange.

4. The tube container according to claim 3, wherein:
   the first cylinder portion further comprises an outer perimeter portion formed by curling outward an portion in a predetermined area from the other end edge in the axial direction of the first blank rolled into a tube shape, and then compressing it along an outer peripheral surface of the first cylinder portion, and wherein
   the other end edge in the axial direction is wrapped into the outer perimeter portion and sealed.

5. The tube container according to claim 2, wherein:
   a fold-over portion is formed in the flat portion by folding over an annular portion including an outer perimeter of a second blank made of a sheet composed mainly of paper, toward the other surface side, and
   the portion in the predetermined area from the other end of the body portion is sealed with an entire fold-over portion, and with a portion along an entire inner periphery of the fold-over portion on the surface on the other side of the flat portion.

6. The tube container according to claim 2, further comprising:
   cap that is made of a sheet composed mainly of paper and is attachable to the first cylinder portion, wherein the cap includes:
   a second cylinder portion with a cylindrical shape and
   a flat cap portion fitted inside the second cylinder portion and closing one end in an axial direction of the second cylinder portion,
   the second cylinder portion comprises:
   a second bonded portion formed by rolling a rectangular third blank made of a sheet composed mainly of paper into a tube shape and overlapping and sealing a portion in a predetermined area from a pair of facing end edges,
   a connector portion that is formed by curling inward a portion in a predetermined area from one end edge in an axial direction of the third blank rolled into a tube shape and then compressing it, and that is sealed to an outer perimeter of the cap portion that has been fitted into the second cylinder portion, and
   an inner perimeter portion that is formed by curling inward a portion in a predetermined area from the other end edge in the axial direction of the third blank rolled into a tube shape, and then compressing it along an inner peripheral surface of the second cylinder portion, and wherein
   the pair of end edges are folded in and sealed to the inner side of the second bonded portion, the one end edge in the axial direction is wrapped in and sealed to an inner side of the connector portion, and the other end edge in the axial direction is wrapped in and sealed to an inner side of the inner perimeter portion.

7. The tube container according to claim 1, wherein a barrier layer is laminated between the thermoplastic resin layer of the innermost layer and the paper layer.

8. The tube container according claim 1, wherein a basis weight of the paper layer is 3 g/m² to 300 g/m².

9. The tube container according claim 1, wherein the thermoplastic resin layer of the outermost layer is a sealant layer, and the sealant layer of the outermost layer has a thickness of 3 µm to 200 µm.

10. The tube container according to claim 1, which comprises a first adhesive layer and a second adhesive layer that sandwich the paper layer, the first adhesive layer and second adhesive layer having thicknesses of 5 µm to 100 µm each.

11. The tube container according to claim 1, wherein the body portion is formed by shaping, into a tube, a sheet having a pair of opposing end edges and bonding a tape material to parts of an inner surface of the sheet that are along the pair of end edges, respectively, the tape material has a belt-like base material, and both surfaces and end surfaces of the base material are covered with a resin.

12. The tube container according to claim 11, wherein the base material of the tape material is a layer having a barrier property.

13. The tube container according to claim 1, wherein the body portion includes a paper layer and a sealant layer that is an innermost layer, and is formed by rounding, into a tube, a sheet having a pair of opposing end edges,
- in the body portion, an overlapping part is formed where to an outermost layer of a part within a predetermined range from one of the end edges, an innermost layer of a part within a predetermined range from the other of the end edges is sealed, and
- a tape material, that is formed of a film bondable to the sealant layer and containing no adhesive, is sealed to the innermost layer of the sheet constituting the body portion so as to cover the one of the end edges.

14. The tube container according to claim 13, wherein the width of the overlapping part is not less than 1.0 mm and less than 8.0 mm.

15. The tube container according to claim 13, wherein the width of the tape material is not less than 4.0 mm and not more than 15.0 mm.

16. The tube container according to claim 13, wherein a paper protection layer formed of a resin having weldability to the sealant layer is provided on the outermost layer of the sheet.

* * * * *